US009336739B2

(12) United States Patent
Yamazaki et al.

(10) Patent No.: US 9,336,739 B2
(45) Date of Patent: May 10, 2016

(54) LIQUID CRYSTAL DISPLAY DEVICE

(75) Inventors: Shunpei Yamazaki, Setagaya (JP); Jun Koyama, Sagamihara (JP); Hiroyuki Miyake, Atsugi (JP); Kouhei Toyotaka, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 472 days.

(21) Appl. No.: 13/167,020

(22) Filed: Jun. 23, 2011

(65) Prior Publication Data

US 2012/0002127 A1 Jan. 5, 2012

(30) Foreign Application Priority Data

Jul. 2, 2010 (JP) ................................ 2010-152317

(51) Int. Cl.
*G09G 3/36* (2006.01)
*G02F 1/133* (2006.01)
(Continued)

(52) U.S. Cl.
CPC ............ *G09G 3/3688* (2013.01); *G09G 3/3677* (2013.01); *G02F 1/13318* (2013.01);
(Continued)

(58) Field of Classification Search
None
See application file for complete search history.

(56) References Cited

U.S. PATENT DOCUMENTS 5,070,409 A * 12/1991 Miyadera et al. ............. 348/790
5,731,856 A 3/1998 Kim et al.
(Continued)

FOREIGN PATENT DOCUMENTS

EP 1296174 A 3/2003
EP 1737044 A 12/2006
(Continued)

OTHER PUBLICATIONS

Fortunato.E et al., "Wide-Bandgap High-Mobility ZnO Thin-Film Transistors Produced at Room Temperature,", Appl. Phys. Lett. (Applied Physics Letters), Sep. 27, 2004, vol. 85, No. 13, pp. 2541-2543.
(Continued)

*Primary Examiner* — Kent Chang
*Assistant Examiner* — Nathan Brittingham
(74) *Attorney, Agent, or Firm* — Eric J. Robinson; Robinson Intellectual Property Law Office, P.C.

(57) ABSTRACT

An object is to provide a liquid crystal display device capable of image display according to an environment around the liquid crystal display device, e.g., in a bright environment or a dim environment. Another object is to provide a liquid crystal display device capable of displaying an image in both modes of a reflective mode in which external light is used as a light source and a transmissive mode in which a backlight is used. In order to achieve at least one of the above objects, a liquid crystal display device is provided with a region (a reflective region) where display is performed with reflection of incident light through a liquid crystal layer and a region (a transmissive region) where display is performed with transmission of light from a backlight and can switch the transmissive mode and the reflective mode. In the case where a full-color image is displayed, a pixel portion includes at least a first region and a second region, a plurality of lights of different hues are sequentially supplied to the first region according to a first order, and a plurality of lights of different hues are also sequentially supplied to the second region according to a second order which is different from the first order.

18 Claims, 31 Drawing Sheets

(51) Int. Cl.
G02F 1/1335 (2006.01)
G09G 3/34 (2006.01)

(52) U.S. Cl.
CPC ............... *G02F1/133514* (2013.01); *G02F 2001/133622* (2013.01); *G09G 3/3413* (2013.01); *G09G 2310/0235* (2013.01)

(56) References Cited

U.S. PATENT DOCUMENTS

| | | |
|---|---|---|
| 5,744,864 A | 4/1998 | Cillessen et al. |
| 6,294,274 B1 | 9/2001 | Kawazoe et al. |
| 6,448,951 B1 | 9/2002 | Sakaguchi et al. |
| 6,563,174 B2 | 5/2003 | Kawasaki et al. |
| 6,597,348 B1 | 7/2003 | Yamazaki et al. |
| 6,727,522 B1 | 4/2004 | Kawasaki et al. |
| 6,853,371 B2 * | 2/2005 | Miyajima et al. ............ 345/206 |
| 6,882,012 B2 | 4/2005 | Yamazaki et al. |
| 6,888,522 B1 * | 5/2005 | Shibata et al. .................. 345/87 |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,105,868 B2 | 9/2006 | Nause et al. |
| 7,145,536 B1 | 12/2006 | Yamazaki et al. |
| 7,193,593 B2 | 3/2007 | Koyama et al. |
| 7,211,825 B2 | 5/2007 | Shih et al. |
| 7,224,339 B2 | 5/2007 | Koyama et al. |
| 7,268,756 B2 | 9/2007 | Koyama et al. |
| 7,282,782 B2 | 10/2007 | Hoffman et al. |
| 7,286,108 B2 | 10/2007 | Tsuda et al. |
| 7,297,977 B2 | 11/2007 | Hoffman et al. |
| 7,298,358 B2 | 11/2007 | Honbo |
| 7,317,438 B2 | 1/2008 | Yamazaki et al. |
| 7,321,353 B2 | 1/2008 | Tsuda et al. |
| 7,323,356 B2 | 1/2008 | Hosono et al. |
| 7,385,224 B2 | 6/2008 | Ishii et al. |
| 7,385,579 B2 | 6/2008 | Satake |
| 7,402,506 B2 | 7/2008 | Levy et al. |
| 7,411,209 B2 | 8/2008 | Endo et al. |
| 7,425,937 B2 | 9/2008 | Inukai |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,674,650 B2 | 3/2010 | Akimoto et al. |
| 7,732,819 B2 | 6/2010 | Akimoto et al. |
| 7,791,571 B2 | 9/2010 | Ohtani et al. |
| 7,910,490 B2 | 3/2011 | Akimoto et al. |
| 7,924,276 B2 | 4/2011 | Tsuda et al. |
| 7,932,521 B2 | 4/2011 | Akimoto et al. |
| 8,013,339 B2 | 9/2011 | Shih et al. |
| 8,077,276 B2 | 12/2011 | Uchida |
| 8,274,077 B2 | 9/2012 | Akimoto et al. |
| 8,466,463 B2 | 6/2013 | Akimoto et al. |
| 8,629,069 B2 | 1/2014 | Akimoto et al. |
| 8,669,550 B2 | 3/2014 | Akimoto et al. |
| 8,790,959 B2 | 7/2014 | Akimoto et al. |
| 8,796,069 B2 | 8/2014 | Akimoto et al. |
| 2001/0046027 A1 | 11/2001 | Tai et al. |
| 2002/0015031 A1 * | 2/2002 | Fujita et al. .................. 345/204 |
| 2002/0056838 A1 | 5/2002 | Ogawa |
| 2002/0132454 A1 | 9/2002 | Ohtsu et al. |
| 2003/0189401 A1 | 10/2003 | Kido et al. |
| 2003/0218222 A1 | 11/2003 | Wager et al. |
| 2004/0038446 A1 | 2/2004 | Takeda et al. |
| 2004/0127038 A1 | 7/2004 | Carcia et al. |
| 2005/0012097 A1 | 1/2005 | Yamazaki |
| 2005/0017302 A1 | 1/2005 | Hoffman |
| 2005/0199959 A1 | 9/2005 | Chiang et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0279359 A1 | 12/2007 | Yoshida et al. |
| 2007/0279374 A1 | 12/2007 | Kimura et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0073653 A1 | 3/2008 | Iwasaki |
| 2008/0074592 A1 | 3/2008 | Araki et al. |
| 2008/0083950 A1 | 4/2008 | Pan et al. |
| 2008/0106191 A1 | 5/2008 | Kawase |
| 2008/0123000 A1 * | 5/2008 | Lin et al. .................. 349/33 |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0259099 A1 * | 10/2008 | Arai et al. .................. 345/690 |
| 2008/0296568 A1 | 12/2008 | Ryu et al. |
| 2008/0308805 A1 | 12/2008 | Akimoto et al. |
| 2009/0045397 A1 | 2/2009 | Iwasaki |
| 2009/0068773 A1 | 3/2009 | Lai et al. |
| 2009/0073325 A1 | 3/2009 | Kuwabara et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0250695 A1 * | 10/2009 | Tanaka et al. .................. 257/43 |
| 2009/0278122 A1 | 11/2009 | Hosono et al. |
| 2009/0280600 A1 | 11/2009 | Hosono et al. |
| 2009/0303170 A1 | 12/2009 | Chung et al. |
| 2009/0305461 A1 | 12/2009 | Akimoto et al. |
| 2009/0321737 A1 | 12/2009 | Isa et al. |
| 2010/0020276 A1 | 1/2010 | Jepsen |
| 2010/0065844 A1 | 3/2010 | Tokunaga |
| 2010/0079366 A1 | 4/2010 | Lin et al. |
| 2010/0084655 A1 * | 4/2010 | Iwasaki et al. .................. 257/43 |
| 2010/0092800 A1 | 4/2010 | Itagaki et al. |
| 2010/0109002 A1 | 5/2010 | Itagaki et al. |
| 2010/0133525 A1 * | 6/2010 | Arai et al. .................. 257/40 |
| 2010/0148177 A1 | 6/2010 | Koyama et al. |
| 2010/0182282 A1 | 7/2010 | Kurokawa et al. |
| 2011/0102476 A1 | 5/2011 | Chang |
| 2011/0104851 A1 | 5/2011 | Akimoto et al. |
| 2011/0121290 A1 | 5/2011 | Akimoto et al. |

(56) References Cited

U.S. PATENT DOCUMENTS

| | | | |
|---|---|---|---|
| 2011/0148832 | A1 | 6/2011 | Nie et al. |
| 2011/0157216 | A1 | 6/2011 | Yamazaki et al. |
| 2011/0157253 | A1 | 6/2011 | Yamazaki et al. |
| 2011/0242071 | A1 | 10/2011 | Koyama et al. |
| 2011/0249037 | A1 | 10/2011 | Koyama et al. |
| 2011/0249038 | A1 | 10/2011 | Yamazaki et al. |
| 2011/0285290 | A1 | 11/2011 | Griffin et al. |
| 2012/0001954 | A1 | 1/2012 | Yamazaki et al. |
| 2012/0001955 | A1 | 1/2012 | Yamazaki et al. |
| 2013/0082607 | A1* | 4/2013 | Gandhi et al. ................ 315/153 |

FOREIGN PATENT DOCUMENTS

| | | |
|---|---|---|
| EP | 1770788 A | 4/2007 |
| EP | 1995787 A | 11/2008 |
| EP | 1998373 A | 12/2008 |
| EP | 1998374 A | 12/2008 |
| EP | 1998375 A | 12/2008 |
| EP | 2226847 A | 9/2010 |
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |
| JP | 11-337904 A | 12/1999 |
| JP | 2000-044236 A | 2/2000 |
| JP | 2000-150900 A | 5/2000 |
| JP | 2002-014321 A | 1/2002 |
| JP | 2002-076356 A | 3/2002 |
| JP | 2002-289859 A | 10/2002 |
| JP | 2003-086000 A | 3/2003 |
| JP | 2003-086808 A | 3/2003 |
| JP | 2003-248463 A | 9/2003 |
| JP | 2004-103957 A | 4/2004 |
| JP | 2004-273614 A | 9/2004 |
| JP | 2004-273732 A | 9/2004 |
| JP | 2004-279669 A | 10/2004 |
| JP | 2005-091784 A | 4/2005 |
| JP | 2006-220685 A | 8/2006 |
| JP | 2007-123861 A | 5/2007 |
| JP | 2007-264211 A | 10/2007 |
| JP | 2009-042405 A | 2/2009 |
| TW | 200530993 | 9/2005 |
| TW | 200720780 | 6/2007 |
| TW | I320162 | 2/2010 |
| WO | WO-2004/114391 | 12/2004 |

OTHER PUBLICATIONS

Dembo.H et al., "RFCPUS on Glass and Plastic Substrates Fabricated by TFT Transfer Technology,", IEDM 05: Technical Digest of International Electron Devices Meeting, Dec. 5, 2005, pp. 1067-1069.

Ikeda.T et al., "Full-Functional System Liquid Crystal Display Using CG-Silicon Technology,", SID Digest '04 : SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors,", Nature, Nov. 25, 2004, vol. 432, pp. 488-492.

Park.J et al., "Improvements in the Device Characteristics of Amorphous Indium Gallium Zinc Oxide Thin-Film Transistors by Ar Plasma Treatment,", Appl. Phys. Lett. (Applied Physics Letters) , Jun. 26, 2007, vol. 90, No. 26, pp. 262106-1-262106-3.

Takahashi.M et al., "Theoretical Analysis of IGZO Transparent Amorphous Oxide Semiconductor,", IDW '08 : Proceedings of the 15th International Display Workshops, Dec. 3, 2008, pp. 1637-1640.

Hayashi.R et al., "42.1: Invited Paper: Improved Amorphous In—Ga—Zn—O TFTs,", SID Digest '08 : SID International Symposium Digest of Technical Papers, May 20, 2008, vol. 39, pp. 621-624.

Prins.M et al., "A Ferroelectric Transparent Thin-Film Transistor,", Appl. Phys. Lett. (Applied Physics Letters) , Jun. 17, 1996, vol. 68, No. 25, pp. 3650-3652.

Nakamura.M et al., "The phase relations in the In2O3—Ga2ZnO4—ZnO system at 1350° C.,", Journal of Solid State Chemistry, Aug. 1, 1991, vol. 93, No. 2, pp. 298-315.

Kimizuka.N. et al., "Syntheses and Single-Crystal Data of Homologous Compounds, In2O3(ZnO)m (m = 3, 4, and 5), InGaO3(ZnO)3, and Ga2O3(ZnO)m (m = 7,8,9, and 16) in the In2O3—ZnGa2O4—ZnO System,", Journal of Solid State Chemistry, Apr. 1, 1995, vol. 116, No. 1, pp. 170-178.

Nomura.K et al., "Thin-Film Transisitors Fabricated in Single-Crystalline Transparent Oxide Semiconductor,", Science, May 23, 2003, vol. 300, No. 5623, pp. 1269-1272.

Masuda.S et al., "Transparent thin film transistors using ZnO as an active channel layer and their electrical properties,", J. Appl. Phys. (Journal of Applied Physics) , Feb. 1, 2003, vol. 93, No. 3, pp. 1624-1630.

Asakuma.N. et al., "Crystallization and Reduction of Sol-Gel-Derived Zinc Oxide Films by Irradiation With Ultraviolet Lamp,", Journal of Sol-Gel Science and Technology, 2003, vol. 26, pp. 181-184.

Osada.T et al., "15.2: Development of Driver-Integrated Panel using Amorphous In—Ga—Zn—Oxide TFT,", SID Digest '09 : SID International Symposium Digest of Technical Papers, May 31, 2009, pp. 184-187.

Nomura.K et al., "Carrier transport in transparent oxide semiconductor with intrinsic structural randomness probed using single-crystalline InGaO3(ZnO)5 films,", Appl. Phys. Lett. (Applied Physics Letters) , Sep. 13, 2004, vol. 85, No. 11, pp. 1993-1995.

Li.C et al., "Modulated Structures of Homologous Compounds InMO3(ZnO)m (M=In,Ga; m=Integer) Described by Four-Dimensional Supersapce Group,", Journal of Solid State Chemistry, 1998, vol. 139, pp. 347-355.

Son.K et al., "42.4L: Late-News Paper: 4 Inch QVGA AMOLED Driven by the Threshold Voltage Controlled Amorphous GIZO (Ga2O3—In2O3—ZnO) TFT,", SID Digest '08 : SID International Symposium Digest of Technical Papers, May 20, 2008, vol. 39, pp. 633-636.

Lee.J et al., "World's Largest (15-Inch) XGA AMLCD Panel Using IGZO Oxide TFT,", SID Digest '08 : SID International Symposium Digest of Technical Papers, May 20, 2008, vol. 39, pp. 625-628.

Nowatari.H et al., "60.2: Intermediate Connector With Suppressed Voltage Loss for White Tandem OLEDS,", SID Digest '09 : SID International Symposium Digest of Technical Papers, May 31, 2009, vol. 40, pp. 899-902.

Kanno.H et al., "White Stacked Electrophosphorecent Organic Light-Emitting Devices Employing MOO3 as a Charge-Generation Layer,", Adv. Mater. (Advanced Materials), 2006, vol. 18, No. 3, pp. 339-342.

Tsuda.K et al., "Ultra Low Power Consumption Technologies for Mobile TFT-LCDs ,", IDW '02 : Proceedings of the 9th International Display Workshops, Dec. 4, 2002, pp. 295-298.

Van de Walle.C, "Hydrogen as a Cause of Doping in Zinc Oxide,", Phys. Rev. Lett. (Physical Review Letters), Jul. 31, 2000, vol. 85, No. 5, pp. 1012-1015.

Fung.T et al., "2-D Numerical Simulation of High Performance Amorphous In—Ga—Zn—O TFTs for Flat Panel Displays,", AM-FPD '08 Digest of Technical Papers, Jul. 2, 2008, pp. 251-252, The Japan Society of Applied Physics.

Jeong.J et al., "3.1: Distinguished Paper: 12.1-Inch WXGA AMOLED Display Driven by Indium—Gallium—Zinc Oxide TFTs Array,", SID Digest '08 : SID International Symposium Digest of Technical Papers, May 20, 2008, vol. 39, No. 1, pp. 1-4.

Park.J et al., "High performance amorphous oxide thin film transistors with self-aligned top-gate structure,", IEDM 09: Technical Digest of International Electron Devices Meeting, Dec. 7, 2009, pp. 191-194.

Kurokawa.Y et al., "UHF RFCPUS on Flexible and Glass Substrates for Secure RFID Systems,", Journal of Solid-State Circuits , 2008, vol. 43, No. 1, pp. 292-299.

(56) References Cited

OTHER PUBLICATIONS

Ohara.H et al., "Amorphous In—Ga—Zn—Oxide TFTs with Suppressed Variation for 4.0 inch QVGA AMOLED Display,", AM-FPD '09 Digest of Technical Papers, Jul. 1, 2009, pp. 227-230, The Japan Society of Applied Physics.

Coates.D et al., "Optical Studies of the Amorphous Liquid-Cholesteric Liquid Crystal Transition:The "Blue Phase",", Physics Letters, Sep. 10, 1973, vol. 45A, No. 2, pp. 115-116.

Cho.D et al., "21.2:Al and Sn-Doped Zinc Indium Oxide Thin Film Transistors for AMOLED Back Plane,", SID Digest '09 : SID International Symposium Digest of Technical Papers, May 31, 2009, pp. 280-283.

Lee.M et al., "15.4:Excellent Performance of Indium—Oxide-Based Thin-Film Transistors by DC Sputtering,", SID Digest '09 : SID International Symposium Digest of Technical Papers, May 31, 2009, pp. 191-193.

Jin.D et al., "65.2:Distinguished Paper:World-Largest (6.5") Flexible Full Color Top Emission AMOLED Display on Plastic Film and Its Bending Properties,", SID Digest '09 : SID International Symposium Digest of Technical Papers, May 31, 2009, pp. 983-985.

Sakata.J et al., "Development of 4.0-IN. AMOLED Display with Driver Circuit Using Amporphous In—Ga—Zn—Oxide TFTs,", IDW '09 : Proceedings of the 16th International Display Workshops, 2009, pp. 689-692.

Park.J et al., "Amorphous Indium—Gallium—Zinc Oxide TFTs and Their Application for Large Size AMOLED,", AM-FPD '08 Digest of Technical Papers, Jul. 2, 2008, pp. 275-278.

Park.S et al., "Challenge to Future Displays: Transparent AM-OLED Driven by PEALD Grown ZnO TFT,", IMID '07 Digest, 2007, pp. 1249-1252.

Godo.H et al., "Temperature Dependence of Characteristics and Electronic Structure for Amorphous In—Ga—Zn—Oxide TFT,", AM-FPD '09 Digest of Technical Papers, Jul. 1, 2009, pp. 41-44.

Osada.T et al., "Development of Driver-Integrated Panel Using Amorphous In—Ga—Zn—Oxide TFT,", AM-FPD '09 Digest of Technical Papers, Jul. 1, 2009, pp. 33-36.

Hirao.T et al., "Novel Top-Gate Zinc Oxide Thin-Film Transistors (ZnO TFTs) for AMLCDS,", Journal of the SID, 2007, vol. 15, No. 1, pp. 17-22.

Hosono.H, "68.3:Invited Paper:Transparent Amorphous Oxide Semiconductors for High Performance TFT,", SID Digest '07 : SID International Symposium Digest of Technical Papers, 2007, vol. 38, pp. 1830-1833.

Godo.H et al., "P-9:Numerical Analysis on Temperature Dependence of Characteristics of Amorphous In—Ga—Zn—Oxide TFT,", SID Digest '09 : SID International Symposium Digest of Technical Papers, May 31, 2009, pp. 1110-1112.

Ohara.H et al., "21.3:4.0 IN. QVGA AMOLED Display Using In—Ga—Zn—Oxide TFTs With a Novel Passivation Layer,", SID Digest '09 : SID International Symposium Digest of Technical Papers, May 31, 2009, pp. 284-287.

Miyasaka.M, "SUFTLA Flexible Microelectronics on Their Way to Business,", SID Digest '07 : SID International Symposium Digest of Technical Papers, 2007, vol. 38, pp. 1673-1676.

Chern.H et al., "An Analytical Model for the Above-Threshold Characteristics of Polysilicon Thin-Film Transistors,", IEEE Transactions on Electron Devices, Jul. 1, 1995, vol. 42, No. 7, pp. 1240-1246.

Kikuchi.H et al., "39.1:Invited Paper:Optically Isotropic Nano-Structured Liquid Crystal Composites for Display Applications,", SID Digest '09 : SID International Symposium Digest of Technical Papers, May 31, 2009, pp. 578-581.

Asaoka.Y et al., "29.1: Polarizer-Free Reflective LCD Combined With Ultra Low-Power Driving Technology,", SID Digest '09 : SID International Symposium Digest of Technical Papers, May 31, 2009, pp. 395-398.

Lee.H et al., "Current Status of, Challenges to, and Perspective View of AM-OLED ,", IDW '06 : Proceedings of the 13th International Display Workshops, Dec. 7, 2006, pp. 663-666.

Kikuchi.H et al., "62.2:Invited Paper:Fast Electro-Optical Switching in Polymer-Stabilized Liquid Crystalline Blue Phases for Display Application,", SID Digest '07 : SID International Symposium Digest of Technical Papers, 2007, vol. 38, pp. 1737-1740.

Nakamura.M, "Synthesis of Homologous Compound with New Long-Period Structure,", NIRIM Newsletter, Mar. 1, 1995, vol. 150, pp. 1-4.

Kikuchi.H et al., "Polymer-Stabilized Liquid Crystal Blue Phases,", Nature Materials, Sep. 2, 2002, vol. 1, pp. 64-68.

Kimizuka.N. et al., "Spinel,YBFE2O4, and YB2FE3O7 Types of Structures for Compounds in the In2O3 and Sc2O3—A2O3—BO Systems [A; Fe, Ga, or AL; B: Mg, Mn, Fe, Ni, Cu,or Zn] at Temperatures over 1000° C.,", Journal of Solid State Chemistry, 1985, vol. 60, pp. 382-384.

Kitzerow.H et al., "Observation of Blue Phases in Chiral Networks,", Liquid Crystals, 1993, vol. 14, No. 3, pp. 911-916.

Costello.M et al., "Electron Microscopy of a Cholesteric Liquid Crystal and Its Blue Phase,", Phys. Rev. A (Physical Review. A), May 1, 1984, vol. 29, No. 5, pp. 2957-2959.

Meiboom.S et al., "Theory of the Blue Phase of Cholesteric Liquid Crystals,", Phys. Rev. Lett. (Physical Review Letters), May 4, 1981, vol. 46. No. 18, pp. 1216-1219.

Park.Sang-Hee et al., "42.3: Transparent ZnO Thin Film Transistor for the Application of High Aperture Ratio Bottom Emission AM-OLED Display,", SID Digest '08 : SID International Symposium Digest of Technical Papers, May 20, 2008, vol. 39, pp. 629-632.

Orita.M et al., "Mechanism of Electrical Conductivity of Transparent InGaZnO4,", Phys. Rev. B (Physical Review. B), Jan. 15, 2000, vol. 61, No. 3, pp. 1811-1816.

Nomura.K et al., "Amorphous Oxide Semiconductors for High-Performance Flexible Thin-Film Transistors,", Jpn. J. Appl. Phys. (Japanese Journal of Applied Physics) , 2006, vol. 45, No. 5B, pp. 4303-4308.

Janotti.A et al., "Native Point Defects in ZnO,", Phys. Rev. B (Physical Review. B), Oct. 4, 2007, vol. 76, No. 16, pp. 165202-1-165202-22.

Park.J et al., "Electronic Transport Properties of Amorphous Indium—Gallium—Zinc Oxide Semiconductor Upon Exposure to Water,", Appl. Phys. Lett. (Applied Physics Letters) , 2008, vol. 92, pp. 072104-1-072104-3.

Hsieh.H et al., "P-29:Modeling of Amorphous Oxide Semiconductor Thin Film Transistors and Subgap Density of States,", SID Digest '08 : SID International Symposium Digest of Technical Papers, 2008, vol. 39, pp. 1277-1280.

Janotti.A et al., "Oxygen Vacancies In ZnO,", Appl. Phys. Lett. (Applied Physics Letters) , 2005, vol. 87, pp. 122102-1-122102-3.

Oba.F et al., "Defect energetics in ZnO: A hybrid Hartree-Fock density functional study,", Phys. Rev. B (Physical Review. B), 2008, vol. 77, pp. 245202-1-245202-6.

Orita.M et al., "Amorphous transparent conductive oxide InGaO3(ZnO)m (m<4):a Zn4s conductor,", Philosophical Magazine, 2001, vol. 81, No. 5, pp. 501-515.

Hosono.H et al., "Working hypothesis to explore novel wide band gap electrically conducting amorphous oxides and examples,", J. Non-Cryst. Solids (Journal of Non-Crystalline Solids), 1996, vol. 198-200, pp. 165-169.

Mo.Y et al., "Amorphous Oxide TFT Backplanes for Large Size AMOLED Displays,", IDW '08 : Proceedings of the 6th International Display Workshops, Dec. 3, 2008, pp. 581-584.

Kim.S et al., "High-Performance oxide thin film transistors passivated by various gas plasmas,", 214th ECS Meeting, 2008, No. 2317, ECS.

Clark.S et al., "First Principles Methods Using CASTEP,", Zeitschrift fur Kristallographie, 2005, vol. 220, pp. 567-570.

Lany.S et al., "Dopability, Intrinsic Conductivity, and Nonstoichiometry of Transparent Conducting Oxides,", Phys. Rev. Lett. (Physical Review Letters), Jan. 26, 2007, vol. 98, pp. 045501-1-045501-4.

Park.J et al., "Dry etching of ZnO films and plasma-induced damage to optical properties,", J. Vac. Sci. Technol. B (Journal of Vacuum Science & Technology B), Mar. 1, 2003, vol. 21, No. 2, pp. 800-803.

Oh.M et al., "Improving the Gate Stability of ZnO Thin-Film Transistors With Aluminum Oxide Dielectric Layers,"J. Electrochem. Soc. (Journal of the Electrochemical Society), 2008, vol. 155, No. 12, pp. H1009-H1014.

(56) References Cited

OTHER PUBLICATIONS

Ueno.K et al., "Field-Effect Transistor on SrTiO3 With Sputtered Al2O3 Gate Insulator,", Appl. Phys. Lett. (Applied Physics Letters), Sep. 1, 2003, vol. 83, No. 9, pp. 1755-1757.

Baron et al., "36.4: Can Motion Compensation Eliminate Color Breakup of Moving Objects in Field-Sequential Color Displays?" SID Digest '96: SID International Symposium Digest of Technical Papers, 1996, vol. 27, pp. 843-846.

Kurita et al., "Evaluation and Improvement of Picture Quality for Moving Images on Field-sequential Color Displays," IDW '00: Proceedings of the 17$^{th}$ International Display Workshops, 2000, pp. 69-72.

Taira et al., "A15" Field-Sequential Display without Color Break-Up using an AFLC Color Shutter," IDW '00: Proceedings of the 17$^{th}$ International Display Workshops, 2000, pp. 73-76.

Jarvenpaa, "7.2: Measuring Color Breakup of Stationary Images in Field-Sequential-Color Displays," SID Digest '04: SID International Symposium Digest of Technical Papers, 2004, vol. 35, pp. 82-85.

Taiwanese Office Action (Application No. 100122224) Dated Jan. 7, 2016.

* cited by examiner

FIG. 3

| | 301<br>full-color image display period | 302<br>monochrome moving image display period | 303<br>monochrome still image display period |
|---|---|---|---|
| driver circuit | operation | operation | no operation excluding writing |
| backlight | switching of hues | not emit | not emit |
| number of writing image signals | number of hues | once | once |

LIQUID CRYSTAL DISPLAY DEVICE

BACKGROUND OF THE INVENTION

1. Field of the Invention

The present invention relates to a liquid crystal display device and a method for driving the liquid crystal display device.

2. Description of the Related Art

It is known that liquid crystal display devices are roughly divided into two kinds of liquid crystal display devices: transmissive liquid crystal display devices and reflective liquid crystal display devices.

In a transmissive liquid crystal display device, a backlight such as a cold cathode fluorescent lamp is used, and a state in which light from the backlight is transmitted through a liquid crystal and output to the outside of the liquid crystal display device or a state in which light is not output is selected using optical modulation action of the liquid crystal, whereby bright and dark images are displayed. Further, those displays are combined to display an image.

In a reflective liquid crystal display device, a state in which external light, in other words, incident light is reflected at a pixel electrode and output to the outside of the device or a state in which incident light is not output to the outside of the device is selected using optical modulation action of a liquid crystal, whereby bright and dark images are displayed. Further, those displays are combined to display an image.

A color filter method and a field-sequential method are known as display methods of liquid crystal display devices. Liquid crystal display devices in which images are displayed by a field-sequential method are provided with a plurality of light sources exhibiting different colors (e.g., red (R), green (G), and blue (B)). A desired color is produced in such a manner that the plurality of light sources exhibiting different colors sequentially emit light and transmission of a light of each color is controlled in each pixel, so that color display is performed. That is, a field-sequential method is a method in which a desired color is realized with division of the display period into respective display periods for respective lights of colors.

Patent Document 1 discloses a liquid crystal display device in which images are displayed by a field-sequential method. Specifically, Patent Document 1 discloses a liquid crystal display device including pixels each include a transistor for controlling input of an image signal, a signal storage capacitor for holding the image signal, and a transistor for controlling transfer of electric charge from the signal storage capacitor to a display pixel capacitor. In the liquid crystal display device having this structure, writing of an image signal to the signal storage capacitor and display corresponding to electric charge held at the display pixel capacitor can be performed at the same time.

REFERENCE

Patent Document

[Patent Document 1] Japanese Published Patent Application No. 2009-042405

SUMMARY OF THE INVENTION

An object of one embodiment of the present invention is to provide a liquid crystal display device capable of image display according to an environment around the liquid crystal display device, e.g., in a bright environment or a dim environment.

Another object is to provide a liquid crystal display device capable of image display in both modes of a reflective mode in which external light is used as a light source and a transmissive mode in which a backlight is used.

One embodiment of the present invention is a liquid crystal display device which is provided with a region (a reflective region) where display is performed with reflection of incident light through a liquid crystal layer and a region (a transmissive region) where display is performed with transmission of light from a backlight and can switch the transmissive mode and the reflective mode. In the reflective mode, a first transistor connected to a first pixel electrode in the reflective region is driven; in the transmissive mode, a second transistor connected to a second pixel electrode in the transmissive region is driven. With separate operations of these two transistors, display regions of the reflective region and the transmissive region can be controlled independently.

Display in the transmissive region is performed by a novel field-sequential method in which image signal writing and lighting of the backlight are not performed on the entire surface of the pixel portion but are performed per unit region of the pixel portion. Note that as light sources of the backlight, a plurality of light-emitting diodes (LEDs) are used, with which lower power consumption than a cold cathode fluorescent lamp and adjustment of intensity of light can be realized.

The novel field-sequential method enables reduction of the phenomenon that a user sees display which is changed (degraded) from display based on original display data. Such a phenomenon is caused by lack of specific display data due to block of the display in a short time, such as a user's blink, and is referred to as a color break or color breakup.

One embodiment of the present invention disclosed in this specification includes a panel including a pixel portion and a driving circuit which controls input of image signals to the pixel portion; and a backlight. The backlight includes a plurality of light sources emitting lights of different hues. In addition, in one embodiment of the present invention, driving methods of the light sources are switched depending on whether a full-color image is displayed or a monochrome image is displayed.

When a full-color image is displayed, a transmissive mode utilizing the novel field-sequential method is set, and the pixel portion is divided into a plurality of regions and lighting of the light sources is controlled per region. Specifically, the pixel portion includes at least a first region and a second region, a plurality of lights of different hues are sequentially supplied to the first region according to a first order, and a plurality of lights of different hues are also sequentially supplied to the second region according to a second order which is different from the first order.

When a monochrome image is displayed, supply of light from the light sources is stopped and a reflective mode is set, so that a still image or a moving image is displayed by utilizing external light in the entire reflective region in the pixel portion or per region.

In one embodiment of the present invention, when the monochrome image is a still image, the driving frequency is lower than that in the case where the monochrome image is a moving image. Further, in one embodiment of the present invention, a liquid crystal element and an insulated gate field effect transistor whose off-state current is extremely low (hereinafter referred to simply as a transistor) for controlling holding of a voltage applied to the liquid crystal element are provided in a pixel portion of a liquid crystal display device in order to lower the driving frequency. With the use of the transistor whose off-state current is extremely low, the period in which a voltage applied to the liquid crystal element is held can be longer. Accordingly, for example, in the case where image signals each having the same image information are written to a pixel portion for some consecutive frame periods, like a still image, display of an image can be maintained even when the driving frequency is low, in other words, the number of writings of image signals for a certain period is reduced.

The above-described transistor includes, in a channel formation region, a semiconductor material having a wider band gap and a lower intrinsic carrier density than a silicon semiconductor. With a channel formation region including a semiconductor material having the above characteristics, a transistor whose off-state current is extremely low can be realized. As an example of such a semiconductor material, an oxide semiconductor having a band gap which is approximately three times as wide as that of silicon can be given. In contrast to a transistor formed using a normal semiconductor material, such as silicon or germanium, a transistor that has the above-described structure and is used as a switching element for holding a voltage applied to a liquid crystal element can effectively prevent leakage of electric charge from the liquid crystal element.

The above-described pixel portion includes a region where the transmittance of a liquid crystal layer is controlled according to a voltage of a full-color image signal that is input, a first transistor which controls holding of a voltage that is to be applied to the liquid crystal layer overlapping with the above-described region, a region where the reflectance of the liquid crystal layer is controlled according to a voltage of a monochrome image signal that is input, and a second transistor which controls holding of a voltage that is to be applied to the liquid crystal layer overlapping with the latter region. A channel formation region of each of the first and second transistors includes a semiconductor material having a wider band gap and a lower intrinsic carrier density than a silicon semiconductor, such as an oxide semiconductor.

Note that an oxide semiconductor (purified OS) in which oxygen deficiency is reduced by adding oxygen after reducing an impurity serving as an electron donor (donor), such as moisture or hydrogen, is an i-type semiconductor (an intrinsic semiconductor) or a substantially i-type semiconductor. Therefore, a transistor including the oxide semiconductor has a characteristic of an extremely low off-state current. Specifically, the oxide semiconductor has a hydrogen concentration of less than or equal to $5 \times 10^{19}/cm^3$, preferably less than or equal to $5 \times 10^{18}/cm^3$, more preferably less than or equal to $5 \times 10^{17}/cm^3$, still more preferably less than or equal to $1 \times 10^{16}/cm^3$, when the hydrogen concentration is measured by secondary ion mass spectrometry (SIMS). In addition, the oxide semiconductor film has a carrier density of less than $1 \times 10^{14}/cm^3$, preferably less than $1 \times 10^{12}/cm^3$, more preferably less than $1 \times 10^{11}/cm^3$, when the carrier density is measured by Hall effect measurement. Furthermore, the oxide semiconductor has a band gap of 2 eV or more, preferably 2.5 eV or more, more preferably 3 eV or more. With the use of the oxide semiconductor film in which the concentration of an impurity such as moisture or hydrogen is reduced and oxygen deficiency is reduced, the off-state current of the transistor can be reduced.

The analysis of the concentration of hydrogen in the oxide semiconductor film is described here. The concentrations of hydrogen in the oxide semiconductor film and a conductive film are measured by secondary ion mass spectrometry (SIMS). It is known that it is difficult to obtain data in the proximity of a surface of a sample or in the proximity of an interface between stacked films formed using different materials by the SIMS analysis in principle. Thus, in the case where distributions of the hydrogen concentrations of the films in thickness directions are analyzed by SIMS, an average value in a region where the films are provided, the value is not greatly changed, and almost the same value can be obtained are employed as the hydrogen concentration. Further, in the case where the thickness of the film is small, a region where almost the same value can be obtained cannot be found in some cases due to the influence of the hydrogen concentration of the films adjacent to each other. In this case, the maximum value or the minimum value of the hydrogen concentration in a region where the films are provided is employed as the hydrogen concentration in the film. Furthermore, in the case where a mountain-shaped peak having the maximum value and a valley-shaped peak having the minimum value do not exist in the region where the films are provided, the value of the inflection point is employed as the hydrogen concentration.

Specifically, various experiments can prove the low off-state current of the transistor whose active layer is the oxide semiconductor film in which an impurity such as moisture or hydrogen is reduced and oxygen deficiency is reduced by adding oxygen. For example, even with an element with a channel width of $1 \times 10^6$ µm and a channel length of 10 µm, in a range from 1 V to 10 V of voltage (drain voltage) between a source electrode and a drain electrode, it is possible that the off-state current (which is a drain current in the case where a voltage between a gate electrode and the source electrode is 0 V or less) is less than or equal to the measurement limit of a semiconductor parameter analyzer, that is, less than or equal to $1 \times 10^{-13}$ A. In this case, it can be found that an off-state current density corresponding to a value obtained by dividing the off-state current by the channel width of the transistor is less than or equal to 100 zA/µm. In addition, a capacitor and a transistor were connected to each other and an off-state current density was measured by using a circuit in which electric charge flowing into or from the capacitor was controlled by the transistor. In the measurement, the oxide semiconductor film was used for a channel formation region in the transistor, and the off-state current density of the transistor was measured from change in the amount of electric charge of the capacitor per unit time. As a result, it was found that in the case where the voltage between the source electrode and the drain electrode of the transistor was 3 V, a lower off-state current density of several tens yoctoampere per micrometer (yA/µm) was able to be obtained. Therefore, in a semiconductor device according to one embodiment of the present invention, the off-state current density of the transistor including the oxide semiconductor film as an active layer can be less than or equal to 100 yA/µm, preferably less than or equal to 10 yA/µm, or more preferably less than or equal to 1 yA/µm, depending on the voltage between the source electrode and drain electrode. Accordingly, the transistor including the oxide semiconductor film as an active layer has a much lower off-state current than a transistor including silicon having crystallinity.

Note that as the oxide semiconductor, it is possible to use an indium oxide; a tin oxide; a zinc oxide; a two-component metal oxide such as an In—Zn-based oxide, a Sn—Zn-based oxide, an Al—Zn-based oxide, a Zn—Mg-based oxide, a Sn—Mg-based oxide, an In—Mg-based oxide, or an In—Ga-based oxide; a three-component metal oxide such as an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, or an In—Lu—Zn-based oxide; a four-component metal oxide such as an In—Sn—Ga—Zn-based oxide semiconductor, an In—Hf—Ga—Zn-based oxide, an In—Al—Ga—Zn-based oxide, an In—Sn—Al—Zn-based oxide, an In—Sn—Hf—Zn-based oxide, or an In—Hf—Al—Zn-based oxide.

Note that, for example, an In—Ga—Zn-based oxide means an oxide containing In, Ga, and Zn, and there is no limitation on the composition ratio of In, Ga, and Zn. The In—Ga—Zn-based oxide may contain a metal element other than the In, Ga, and Zn.

Alternatively, a material represented by $InMO_3(ZnO)_m$ (m>0 is satisfied, and m is not an integer) may be used as an oxide semiconductor. Note that M represents one or more metal elements selected from Ga, Fe, Mn, and Co. Still alternatively, a material represented by $In_2SnO_5(ZnO)_n$ (n>0 is satisfied, and n is an integer) may be used as an oxide semiconductor.

With one embodiment of the present invention, it is possible to realize a liquid crystal display device capable of image display using a reflective mode utilizing external light as a light source and a transmissive mode utilizing a backlight according to an environment around the liquid crystal display device, e.g., in a bright environment or a dim environment. For example, a moving image is displayed using a transmissive mode, and a still image is displayed using a reflective mode.

With the use of a transistor whose off-state current is extremely low, a period during which a voltage applied to a liquid crystal element is held can be longer. Accordingly, for example, the driving frequency with which a still image is displayed can be lower than that with which a moving image is displayed. Therefore, a liquid crystal display device with reduced power consumption in displaying a still image can be realized.

BRIEF DESCRIPTION OF THE DRAWINGS

FIG. 3 schematically shows operations of a liquid crystal display device and a backlight.

FIGS. 23A, 23B, 23C1, 23C2, 23D1, 23D2, 23E1, and 23E2 are cross-sectional views illustrating methods for manufacturing liquid crystal display devices.

DETAILED DESCRIPTION OF THE INVENTION

Figure 1:
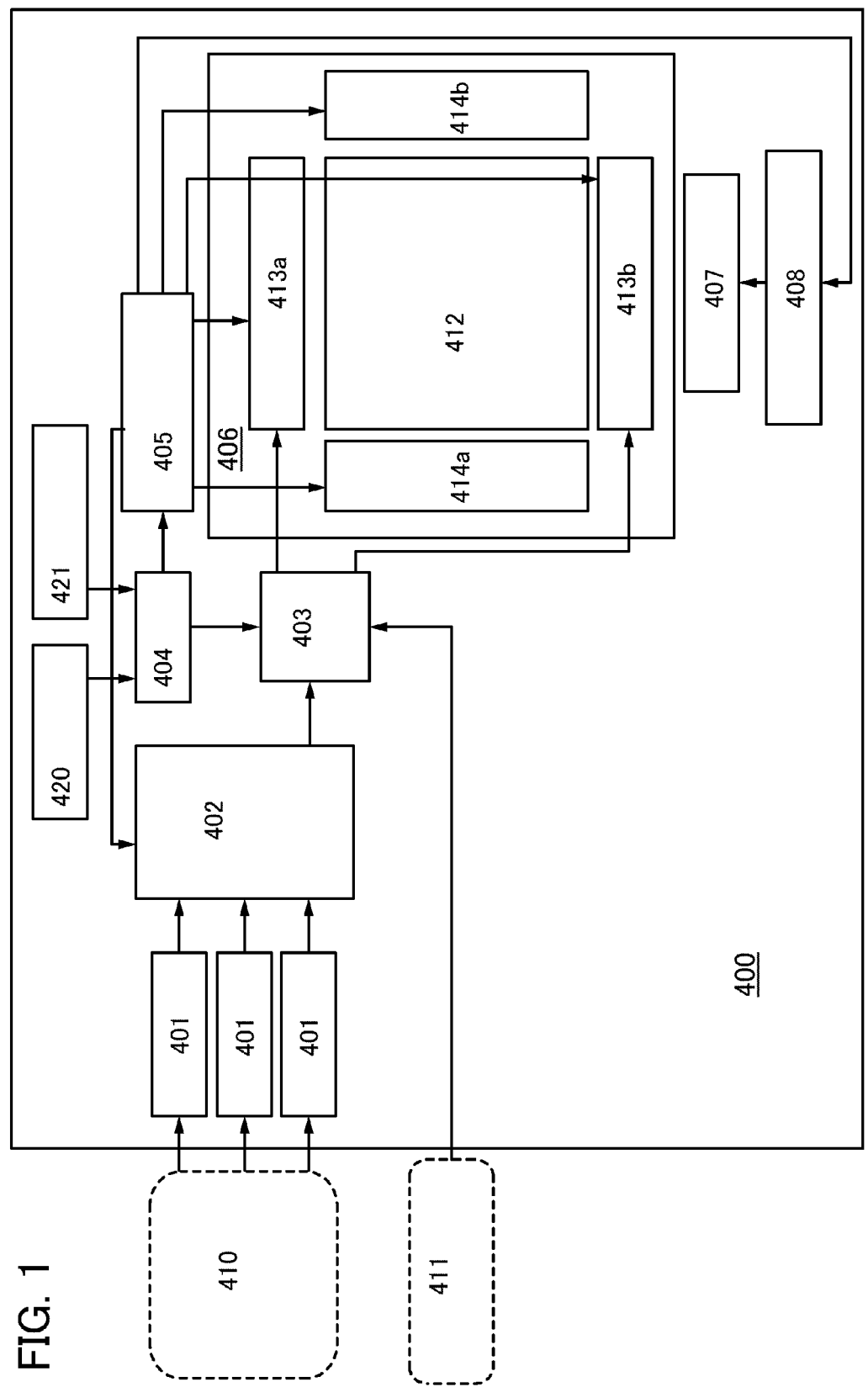
FIG. 1 is a block diagram showing a structure of a liquid crystal display device.

Hereinafter, embodiments of the present invention will be described in detail with reference to the accompanying drawings. However, the present invention is not limited to the description below, and it is easily understood by those skilled in the art that modes and details disclosed herein can be modified in various ways without departing from the spirit and the scope of the present invention. Therefore, the present invention is not construed as being limited to description of the embodiments.

(Embodiment 1)

In this embodiment, a liquid crystal display device including a still-image mode and a moving-image mode will be described with reference to FIG. 1. Note that in this specification, a mode performed in such a manner that a display device determines image signals input to the display device as a still image is described as a still-image mode, and a mode performed in such a manner that the display device determines image signals input to the display device as a moving image is described as a moving-image mode.

A liquid crystal display device 400 in this embodiment includes a plurality of image memories 401, an image data selection circuit 402, a selector 403, a CPU 404, a controller 405, a panel 406, a backlight 407, and a backlight control circuit 408.

Image data corresponding to a full-color image (full-color image data 410), which are input to the liquid crystal display device 400, are stored in the plurality of image memories 401. The full-color image data 410 include image data corresponding to their respective hues. The image data corresponding to the respective hues are stored in the respective image memories 401.

As the image memories 401, for example, memory circuits such as dynamic random access memories (DRAMs) or static random access memories (SRAMs) can be used.

The image data selection circuit 402 reads the full-color image data, which are stored in the plurality of image memories 401 and correspond to the respective hues, and sends the full-color image data to the selector 403 according to a command from the controller 405.

In addition, image data corresponding to a monochrome image (monochrome image data 411) are also input to the liquid crystal display device 400. Then, the monochrome image data 411 are input to the selector 403.

Note that an image displayed with color gradations by using a plurality of light sources of colors having different hues is a full-color image. In addition, an image displayed by using a reflective electrode with the light sources turned off is a monochrome image.

Although the structure in which the monochrome image data 411 are directly input to the selector 403 is employed in this embodiment, the structure of one embodiment of the present invention is not limited to this structure. The monochrome image data 411 may also be stored in the image memories 401 and then read by the image data selection circuit 402 similarly to the full-color image data 410. In that case, the selector 403 is included in the image data selection circuit 402.

Alternatively, the monochrome image data 411 may be formed by synthesizing the full-color image data 410 in the liquid crystal display device 400.

The CPU 404 controls the selector 403 and the controller 405 so that the operations of the selector 403 and the controller 405 are switched between full-color image display and monochrome image display.

Specifically, in the case of the full-color image display, the selector 403 selects the full-color image data 410 and supplies them to the panel 406 in accordance with a command from the CPU 404. In addition, the controller 405 supplies the panel 406 with a driving signal which is synchronized with the full-color image data 410 and/or a power supply potential which is to be used when the full-color image is displayed, in accordance with a command from the CPU 404.

In the case of the monochrome image display, the selector 403 selects the monochrome image data 411 and supplies them to the panel 406 in accordance with a command from the CPU 404. In addition, the controller 405 supplies the panel 406 with a driving signal which is synchronized with the monochrome image data 411 and/or a power supply potential which is to be used when the monochrome image is displayed, in accordance with a command from the CPU 404.

The panel 406 includes a pixel portion 412 in which each pixel includes a liquid crystal element, and driver circuits such as a first scan line driver circuit 414a, a first signal line driver circuit 413a, a second scan line driver circuit 414b, and a second signal line driver circuit 413b. The full-color image data 410 or the monochrome image data 411 from the selector 403 are supplied to the first signal line driver circuit 413a or the second signal line driver circuit 413b. In addition, the driving signals and/or the power supply potential from the controller 405 are/is supplied to the first scan line driver circuit 414a, the first signal line driver circuit 413a, the second scan line driver circuit 414b, and/or the second signal line driver circuit 413b.

Note that the driving signals include a signal line driver circuit start pulse signal (SSP1 or SSP2) and a signal line driver circuit clock signal (SCK1 or SCK2) which control the operation of the first signal line driver circuit 413a or the operation of the second signal line driver circuit 413b; a scan line driver circuit start pulse signal (GSP) and a scan line driver circuit clock signal (GCK) which control the operation of the first scan line driver circuit 414a or the operation of the second scan line driver circuit 414b; and the like.

A plurality of light sources which emit lights of different hues are provided in the backlight 407. The controller 405 controls driving of the light sources included in the backlight 407 through the backlight control circuit 408.

Note that switching between full-color image display and monochrome image display can be performed by hand. In that case, an input device 420 may be provided in the liquid crystal display device 400 so that the CPU 404 controls the switching in accordance with a signal from the input device 420. For example, a user controls switching between full-color image display and monochrome image display with the use of a switch or the like provided for the liquid crystal display device 400.

The liquid crystal display device 400 described in this embodiment may also include a photometric circuit 421. The photometric circuit 421 measures the brightness of an environment where the liquid crystal display device 400 is used. The CPU 404 may control the switching between full-color image display and monochrome image display in accordance with the brightness detected by the photometric circuit 421.

For example, in the case where the liquid crystal display device 400 in this embodiment is used in a dim environment, the CPU 404 may select full-color image display in accordance with a signal from the photometric circuit 421; in the case where the liquid crystal display device 400 is used in a bright environment, the CPU 404 may select monochrome image display in accordance with a signal from the photometric circuit 421. Note that a threshold value may be set in the photometric circuit 421 so that the backlight is turned on when the brightness of a usage environment becomes less than the threshold value.

Next, an example of a specific structure of the panel of the liquid crystal display device according to one embodiment of the present invention will be described.

Figure 2A:
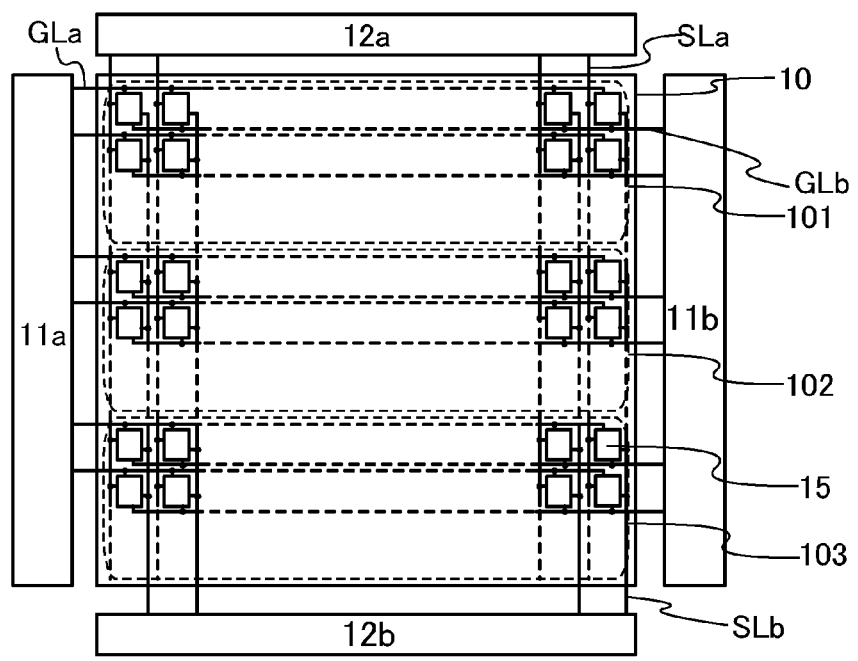
FIGS. 2A and 2B illustrate configurations of a panel and a pixel.

FIG. 2A illustrates a structural example of the liquid crystal display device. The liquid crystal display device illustrated in FIG. 2A includes a pixel portion 10, a first scan line driver circuit 11a, a second scan line driver circuit 11b, a first signal line driver circuit 12a, and a second signal line driver circuit 12b. In one embodiment of the present invention, the pixel portion 10 is divided into a plurality of regions. Specifically, the pixel portion 10 is divided into three regions (regions 101 to 103) in FIG. 2A. Each region includes a plurality of pixels 15 arranged in a matrix.

In addition, m scan lines GLa whose potentials are controlled by the first scan line driver circuit 11a and n signal lines SLa whose potentials are controlled by the first signal line driver circuit 12a are provided for the pixel portion 10. The m scan lines GLa are divided into a plurality of groups in accordance with the number of regions of the pixel portion 10. For example, the m scan lines GLa are divided into three groups because the pixel portion 10 is divided into three regions in FIG. 2A. The scan lines GLa in each group are connected to the plurality of pixels 15 in each corresponding region. Specifically, each scan line GLa is connected to n pixels 15 in each corresponding row among the plurality of pixels 15 arranged in a matrix in the corresponding region.

Regardless of the above regions, each of the signal lines SLa is connected to m pixels 15 in each corresponding column among the plurality of pixels 15 arranged in a matrix of m rows by n columns in the pixel portion 10.

Figure 2B:
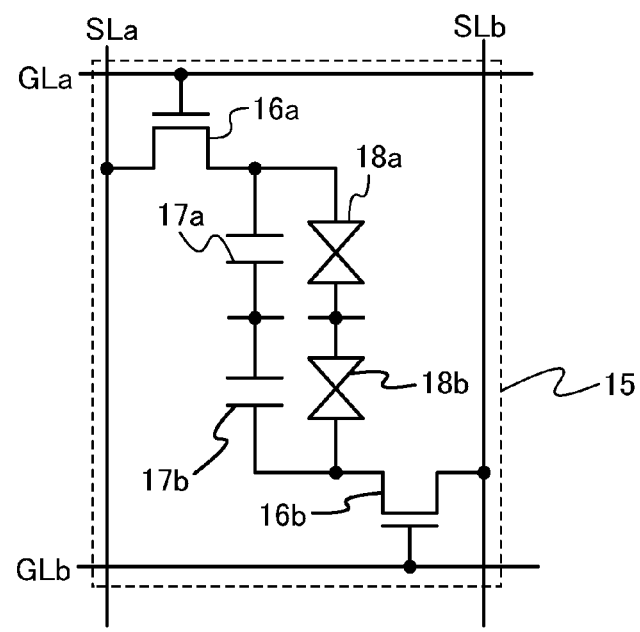

FIG. 2B illustrates an example of a circuit configuration of one of the pixels 15 included in the liquid crystal display device illustrated in FIG. 2A.

The pixel 15 is broadly divided into a transmissive region where a pixel electrode transmits light and a reflective region where a reflective electrode reflects incident light through a liquid crystal layer. The transmissive region includes a first pixel transistor 16a, a first liquid crystal element 18a, and a first capacitor 17a. A gate of the first pixel transistor 16a is connected to the first scan line GLa, a first terminal serving as one of a source and a drain of the first pixel transistor 16a is connected to the first signal line SLa, a second terminal serving as the other of the source and the drain of the first pixel transistor 16a is connected to one electrode of the first liquid crystal element 18a and a first electrode of the first capacitor 17a. The other electrode of the first liquid crystal element 18a is connected to a common electrode. A second electrode of the first capacitor 17a is connected to a capacitor line.

The reflective region includes a second pixel transistor 16b, a second liquid crystal element 18b, and a second capacitor 17b. A gate of the second pixel transistor 16b is connected to a second scan line GLb, a first terminal serving as one of a source and a drain of the second pixel transistor 16b is connected to a second signal line SLb, a second terminal serving as the other of the source and the drain of the second pixel transistor 16b is connected to one electrode of the second liquid crystal element 18b and a first electrode of the second capacitor 17b. The other electrode of the second liquid crystal element 18b is connected to the common electrode. A second electrode of the second capacitor 17b is connected to the capacitor line.

In FIGS. 2A and 2B, the first scan line GLa and the second scan line GLb are driven by the first scan line driver circuit 11a and the second scan line driver circuit 11b, respectively. Respective image signals are supplied to the first signal line SLa and the second signal line SLb by the first signal line driver circuit 12a and the second signal line driver circuit 12b, respectively. Grayscales and color gradations based on different image signals are controlled in the first liquid crystal element 18a in the transmissive region and the second liquid crystal element 18b in the reflective region.

Note that each of the first pixel transistor 16a and the second pixel transistor 16b is preferably a transistor including an oxide semiconductor layer. By using the transistor whose off-state current is extremely low as the second pixel transistor 16b, the period during which a voltage applied to the second liquid crystal element 18b is held can be longer. Accordingly, for example, in the case where image signals each having the same image information are written to the pixel portion 10 for some consecutive frame periods, like a still image, display of an image can be maintained even when the driving frequency is low, in other words, the number of writings of image signals to the pixel portion 10 for a certain period is reduced. For example, the above-described transistor in which an oxide semiconductor film which is highly purified and in which oxygen deficiency is reduced is used as an active layer is employed as the second pixel transistor 16b, whereby an interval between writings of image signals can be increased to 10 seconds or more, preferably 30 seconds or more, more preferably 1 minute or more. As the interval between writings of image signals is made longer, power consumption can be further reduced.

When an image is displayed by plural times of writings of image signals, human eyes see images which are switched plural times. Accordingly, such switching might cause eyestrain. With a structure where the number of writings of image signals is reduced as described in this embodiment, eyestrain can be alleviated.

In addition, the potential of an image signal can be held for a longer period, so that without the second capacitor 17b for holding a potential of an image signal connected to the second liquid crystal element 18b, the quality of the displayed image can be prevented from being lowered.

As each of the first pixel transistor 16a and the second pixel transistor 16b, a transistor including a compound semiconductor such as silicon carbide (SiC) or gallium nitride (GaN) may be used without limitation to a transistor including an oxide semiconductor layer as long as the semiconductor has a wider band gap and a lower intrinsic carrier density than a silicon semiconductor.

Each of the first liquid crystal element 18a and the second liquid crystal element 18b includes a pixel electrode, a counter electrode, and a liquid crystal layer including a liquid crystal to which a voltage between the pixel electrode and the counter electrode is applied.

As examples of a liquid crystal material used in a liquid crystal layer, the following can be given: a nematic liquid crystal, a cholesteric liquid crystal, a smectic liquid crystal, a discotic liquid crystal, a thermotropic liquid crystal, a lyotropic liquid crystal, a low-molecular liquid crystal, a polymer dispersed liquid crystal (PDLC), a ferroelectric liquid crystal, an anti-ferroelectric liquid crystal, a main-chain liquid crystal, a side-chain high-molecular liquid crystal, a banana-shaped liquid crystal, and the like.

Alternatively, a liquid crystal exhibiting a blue phase for which an alignment film is unnecessary may be used. A blue phase is one of liquid crystal phases, which is generated just before a cholesteric phase changes into an isotropic phase while temperature of a cholesteric liquid crystal is increased. Since the blue phase is only generated within a narrow range of temperatures, a chiral agent or an ultraviolet curable resin is added so that the temperature range is improved. The liquid crystal composition which includes a liquid crystal showing a blue phase and a chiral agent is preferable because it has a small response time of greater than or equal to 10 μsec and less than or equal to 100 μsec, has optical isotropy, which makes the alignment process unneeded, and has a small viewing angle dependence.

The following methods can be used for driving the liquid crystal, for example: a TN (twisted nematic) mode, an STN (super twisted nematic) mode, a VA (vertical alignment) mode, an MVA (multi-domain vertical alignment) mode, an IPS (in-plane-switching) mode, an OCB (optically compensated birefringence) mode, an ECB (electrically controlled birefringence) mode, an FLC (ferroelectric liquid crystal) mode, an AFLC (anti-ferroelectric liquid crystal) mode, a PDLC (polymer dispersed liquid crystal) mode, a PNLC (polymer network liquid crystal) mode, and a guest-host mode.

Note that the pixel 15 may further include another circuit element such as a transistor, a diode, a resistor, a capacitor, or an inductor as needed.

By inversion driving in which the polarity of the potential of an image signal is inverted using a potential of a counter electrode as a reference potential, deterioration of a liquid crystal called burn-in can be prevented. However, by the inversion driving, the change in the potential supplied to the signal line is increased at the time of changing the polarity of the image signal; thus, a potential difference between a source electrode and a drain electrode of the second pixel transistor 16b is increased. Accordingly, deterioration of characteristics of the second pixel transistor 16b, such as a shift in threshold voltage, is easily caused. In addition, in order to maintain a voltage held in the second liquid crystal element 18b, a low off-state current is required even when the potential difference between the source electrode and the drain electrode is large. In this embodiment, a semiconductor such as an oxide semiconductor is used for the second pixel transistor 16b; therefore, the pressure resistance of the second pixel transistor 16b can be increased and the off-state current can be made extremely low. Therefore, in contrast to a transistor formed using a semiconductor material such as silicon or germanium, the second pixel transistor 16b can be prevented from deteriorating and the voltage held in the second liquid crystal element 18b can be maintained effectively.

Next, an example of the operation of the panel together with the operation of the backlight will be described. FIG. 3 schematically shows operations of the liquid crystal display device and operations of the backlight. As shown in FIG. 3, the operations of the liquid crystal display device according to one embodiment of the present invention is roughly divided into an operation in a period in which a full-color image is displayed (a full-color image display period 301), an operation in a period in which a monochrome moving image is displayed (a monochrome moving image display period 302), and an operation in a period in which a monochrome still image is displayed (a monochrome still image display period 303).

In the full-color image display period 301, one frame period consists of a plurality of subframe periods. In each of the subframe periods, writings of image signals to the pixel portion is performed. While an image is being displayed, driving signals are successively supplied to the driver circuits such as the scan line driver circuits and the signal line driver circuits. Therefore, the driver circuits are operated in the full-color image display period 301. In addition, the hue of the light supplied to the pixel portion from the backlight is switched every subframe period. Image signals corresponding to their respective hues are sequentially written to the pixel portion. Then, the image signals corresponding to all of the hues are written in one frame period, whereby one image is formed. Accordingly, in the full-color image display period 301, the number of writings of the image signals to the pixel portion in one frame period is more than one and is determined by the number of the hues of the lights supplied from the backlight.

In the monochrome moving image display period 302, as in the full-color image display period 301, writings of image signals to the pixel portion is performed every frame period. While an image is being displayed, the driving signals are successively supplied to the driver circuits such as the scan line driver circuits and the signal line driver circuits. Therefore, the driver circuits are operated in the monochrome moving image display period 302. In the monochrome moving image display period 302, the hue of the light supplied to the pixel portion from the backlight is not switched every frame period, and a light of one hue is successively supplied to the pixel portion. One image can be formed by sequentially writing an image signal corresponding to one hue to the pixel portion in one frame period. Accordingly, in the monochrome moving image display period 302, the number of writings of the image signals to the pixel portion in one frame period is one.

In the monochrome still image display period 303, as in the full-color image display period 301, wirings of image signals to the pixel portion is performed every frame period. However, unlike the full-color image display period 301 and the monochrome moving image display period 302, the driving signals are supplied to the driver circuits during the writings of the image signals to the pixel portion, and after the writings are completed, the supply of the driving signals to the driver circuits is stopped. Therefore, the driver circuits are not operated in the monochrome still image display period 303 except during the writings of the image signals. In the monochrome still image display period 303, the backlight remains off. In addition, one image is formed by sequentially writing image signals to the pixel portion in one frame period. Accordingly, in the monochrome still image display period 303, the number of writings of the image signals to the pixel portion in one frame period is one.

Note that it is preferable that 60 or more frame periods be provided in one second in the monochrome moving image display period 302 in order to prevent a flicker of an image or the like from being perceived. In the monochrome still image display period 303, one frame period can be extremely prolonged to, for example, one minute or longer. When one frame period is long, the period in which the driver circuits are not operated can be long, so that power consumption of the liquid crystal display device can be reduced.

The liquid crystal display device according to one embodiment of the present invention does not need to be provided with a color filter. Therefore, the cost can be lower than that of a liquid crystal display device including a color filter.

Figure 4A:
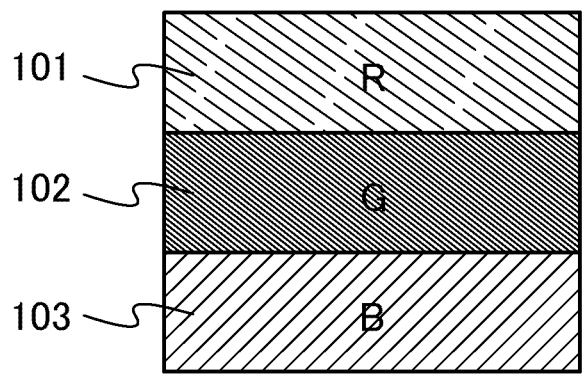
FIGS. 4A to 4C schematically illustrate an example of hues of light supplied to regions.
Figure 4B:
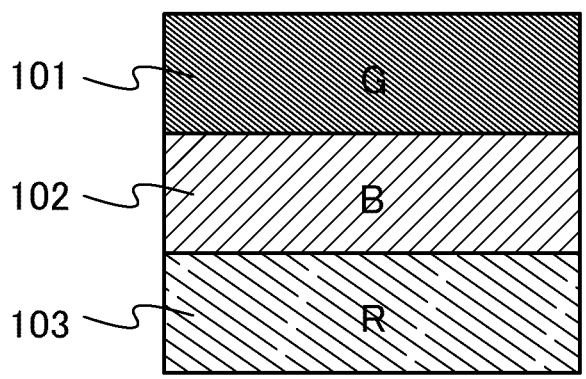
Figure 4C:
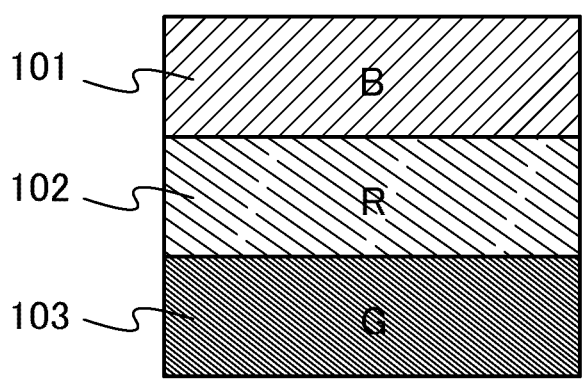

Note that a plurality of lights having different hues are sequentially supplied to each region of the pixel portion in one frame period in the full-color image display period 301. FIGS. 4A to 4C schematically illustrate an example of the hues of lights supplied to the regions. Note that FIGS. 4A to 4C illustrate the case where the pixel portion is divided into three regions as in FIG. 2A. Further, FIGS. 4A to 4C illustrate the case where the backlight supplies lights of red (R), blue (B), and green (G) to the pixel portion.

First, FIG. 4A shows the first subframe period in which a light of red (R) is supplied to the region 101, a light of green (G) is supplied to the region 102, and a light of blue (B) is supplied to the region 103. FIG. 4B shows the second subframe period in which a light of green (G) is supplied to the region 101, a light of blue (B) is supplied to the region 102, and a light of red (R) is supplied to the region 103. FIG. 4C shows the third subframe period, in which a light of blue (B) is supplied to the region 101, a light of red (R) is supplied to the region 102, and a light of green (G) is supplied to the region 103.

The completion of the above subframe periods corresponds to the completion of one frame period. In one frame period, each hue of lights supplied to the regions takes a round of the regions, with which a full-color image can be displayed. In the regions 101, 102, and 103, respectively, the hue of the supplied light is changed in the order of red (R), green (G), and blue (B); the hue of the supplied light is changed in the order of green (G), blue (B), and red (R); and the hue of the supplied light is changed in the order of blue (B), red (R), and green (G). In this manner, the plurality of lights having different hues are sequentially supplied to each of the regions in accordance with the order that is different between the regions.

Note that FIGS. 4A to 4C illustrate the example in which a light having one hue is supplied to one region in each subframe; however, one embodiment of the present invention is not limited to this example. For example, the hues of the lights supplied to the regions may be changed in order of completion of the writing of the image signal. In that case, a region supplied with the light of the hue does not necessarily correspond to the region formed by dividing the pixel portion.

Figure 5:
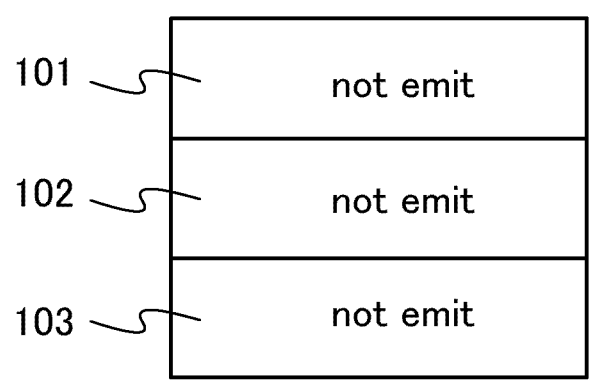
FIG. 5 schematically illustrates an example of turning off of light supplied to regions.

In the monochrome moving image display period 302 and the monochrome still image display period 303, all of the plurality of lights of different hues remain off. An example of turning off of the lights in each region is schematically shown in FIG. 5. Note that FIG. 5 shows an example in which the pixel portion is divided into three regions as in FIG. 2A. As shown in FIG. 5, all the light sources of the backlight are off in the regions 101, 102, and 103.

<Configuration Example of First Scan Line Driver Circuit 11a>

Figure 6:
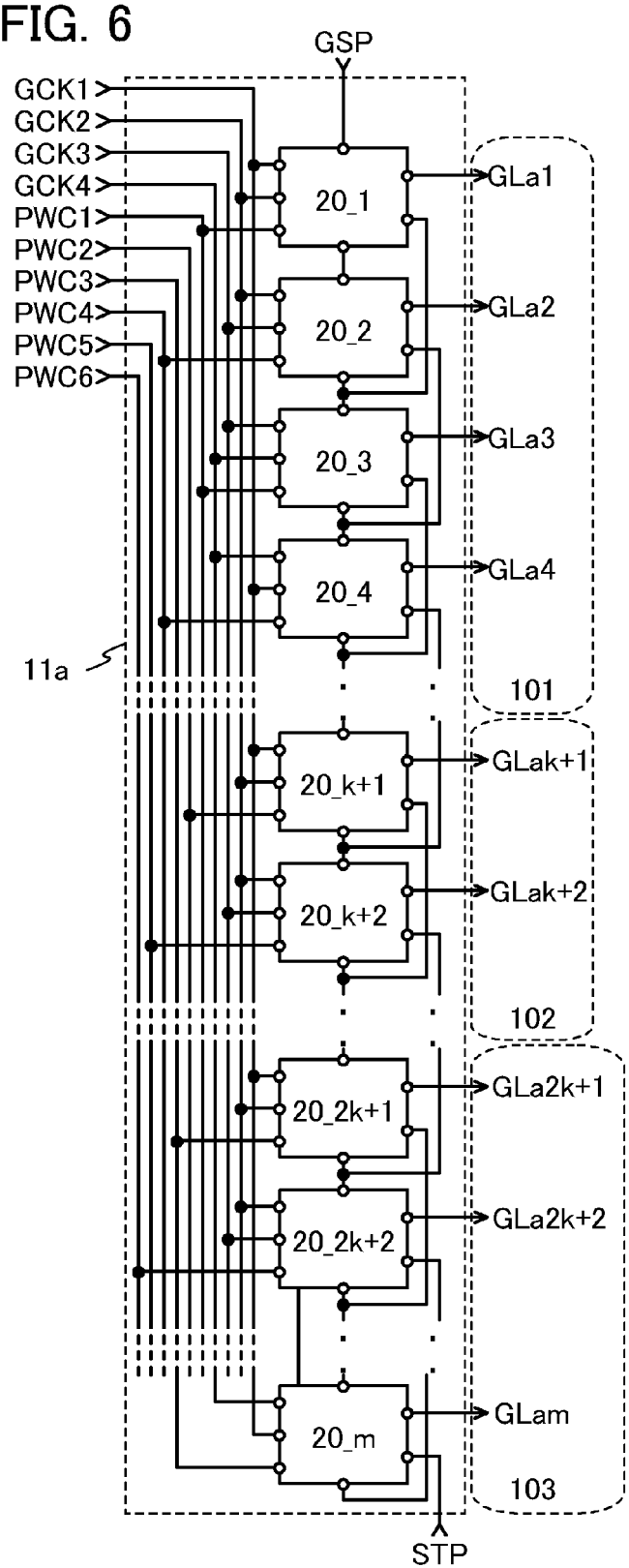
FIG. 6 illustrates a configuration of a scan line driver circuit.

FIG. 6 illustrates a configuration example of the first scan line driver circuit 11a illustrated in FIG. 2A. The first scan line driver circuit 11a in FIG. 6 includes first to m-th pulse output circuits 20_1 to 20_m. Selection signals are output from the first to m-th pulse output circuits 20_1 to 20_m and supplied to m first scan lines GLa (scan lines GLa1 to GLam).

A first scan line driver circuit first clock signal to a first scan line driver circuit fourth clock signal (GCK1 to GCK4), first to sixth pulse width control signals (PWC1 to PWC6), and the scan line driver circuit start pulse signal (GSP) are supplied as driving signals to the first scan line driver circuit 11a.

Note that FIG. 6 illustrates the case where the first to k-th pulse output circuits 20_1 to 20_k (k is a multiple of 4 and less than m/2) are connected to the scan lines GLa1 to GLak provided in the region 101, respectively. Further, the (k+1)-th to 2k-th pulse output circuits 20_k+1 to 20_2k are connected to the scan lines GLak+1 to GLa2k provided in the region 102, respectively. Further, the (2k+1)-th to m-th pulse output circuits 20_2k+1 to 20_m are connected to the scan lines GLa2k+1 to GLam provided in the region 103, respectively.

The first to m-th pulse output circuits 20_1 to 20_m begin to operate in response to the scan line driver circuit start pulse signal (GSP) that is input to the first pulse output circuit 20_1, and output selection signals whose pulses are sequentially shifted.

Circuits having the same configuration can be applied to the first to m-th pulse output circuits 20_1 to 20_m. A specific connection relation of the first to m-th pulse output circuits 20_1 to 20_m is described with reference to FIG. 7.

Figure 7:
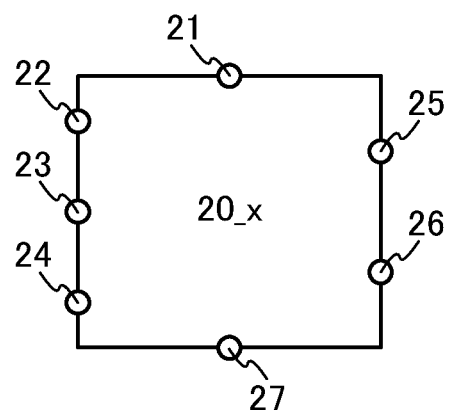
FIG. 7 schematically illustrates an x-th pulse output circuit 20_x.

FIG. 7 schematically illustrates the x-th pulse output circuit 20_x (x is a natural number less than or equal to m). Each of the first to m-th pulse output circuits 20_1 to 20_m has terminals 21 to 27. The terminals 21 to 24 and the terminal 26 are input terminals, and the terminals 25 and 27 are output terminals.

First, the terminal 21 is described. The terminal 21 of the first pulse output circuit 20_1 is connected to a wiring for supplying the first scan line driver circuit start pulse signal (GSP). The terminal 21 of each of the second to m-th pulse output circuits 20_2 to 20_m is connected to the terminal 27 of each corresponding previous-stage pulse output circuit.

Next, the terminal 22 is described. The terminal 22 of the (4a−3)-th pulse output circuit 20_(4a−3) (a is a natural number less than or equal to m/4) is connected to a wiring for supplying the first scan line driver circuit first clock signal (GCK1). The terminal 22 of the (4a−2)-th pulse output circuit 20_(4a−2) is connected to a wiring for supplying the first scan line driver circuit second clock signal (GCK2). The terminal 22 of the (4a−1)-th pulse output circuit 20_(4a−1) is connected to a wiring for supplying the first scan line driver circuit third clock signal (GCK3). The terminal 22 of the 4a-th pulse output circuit 20_4a is connected to a wiring for supplying the first scan line driver circuit fourth clock signal (GCK4).

Next, the terminal 23 is described. The terminal 23 of the (4a−3)-th pulse output circuit 20_(4a−3) is connected to the wiring for supplying the first scan line driver circuit second clock signal (GCK2). The terminal 23 of the (4a−2)-th pulse output circuit 20_(4a−2) is connected to the wiring for supplying the first scan line driver circuit third clock signal (GCK3). The terminal 23 of the (4a−1)-th pulse output circuit 20_(4a−1) is connected to the wiring for supplying the first scan line driver circuit fourth clock signal (GCK4). The terminal 23 of the 4a-th pulse output circuit 20_4a is connected to the wiring for supplying the first scan line driver circuit first clock signal (GCK1).

Next, the terminal 24 is described. The terminal 24 of the (2b−1)-th pulse output circuit 20_(2b−1) (b is a natural number less than or equal to k/2) is connected to a wiring for supplying the first pulse width control signal (PWC1). The terminal 24 of the 2b-th pulse output circuit 20_2b is connected to a wiring for supplying the fourth pulse width control signal (PWC4). The terminal 24 of the (2c−1)-th pulse output circuit 20_(2c−1) (c is a natural number greater than or equal to (k/2+1) and less than or equal to k) is connected to a wiring for supplying the second pulse width control signal (PWC2). The terminal 24 of the 2c-th pulse output circuit 20_2c is connected to a wiring for supplying the fifth pulse width control signal (PWC5). The terminal 24 of the (2d−1)-th pulse output circuit 20_(2d−1) (d is a natural number greater than or equal to (k+1) and less than or equal to m/2) is connected to a wiring for supplying the third pulse width control signal (PWC3). The terminal 24 of the 2d-th pulse output circuit 20_2d is connected to a wiring for supplying the sixth pulse width control signal (PWC6).

Then, the terminal 25 is described. The terminal 25 of the x-th pulse output circuit 20_x is connected to the scan line GLx in the x-th row.

Next, the terminal 26 is described. The terminal 26 of the y-th pulse output circuit 20_y (y is a natural number less than or equal to (m−1)) is connected to the terminal 27 of the (y+1)-th pulse output circuit 20_(y+1). The terminal 26 of the m-th pulse output circuit 20_m is electrically connected to a wiring for supplying a stop signal (STP) for the m-th pulse output circuit. In the case where a (m+1)-th pulse output circuit is provided, the stop signal (STP) for the m-th pulse output circuit corresponds to a signal output from the terminal 27 of the (m+1)-th pulse output circuit $20\_{(m+1)}$. Specifically, these signals can be supplied to the m-th pulse output circuit 20_m by providing the (m+1)-th pulse output circuit 20 (m+1) as a dummy circuit or by directly inputting these signals from the outside.

The connection relation of the terminal 27 in each of the pulse output circuits is described above. Therefore, the above description is to be referred to.

<Structure Example 1 of Pulse Output Circuit>

Figure 8A:
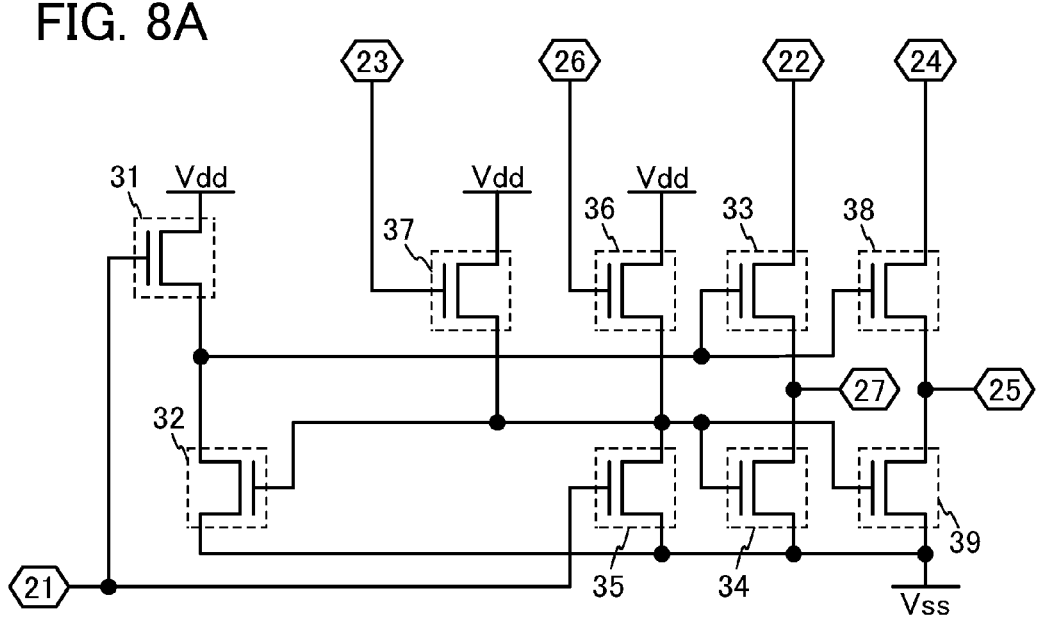
FIG. 8A illustrates a configuration of a pulse output circuit and FIGS. 8B and 8C are timing diagrams thereof.

Next, FIG. 8A illustrates an example of a specific configuration of the x-th pulse output circuit 20_x illustrated in FIG. 7. The pulse output circuit illustrated in FIG. 8A includes transistors 31 to 39.

A gate electrode of the transistor 31 is connected to the terminal 21. A first terminal of the transistor 31 is connected to a node supplied with a high power supply potential (Vdd). A second terminal of the transistor 31 is connected to a gate electrode of the transistor 33 and a gate electrode of the transistor 38.

A gate electrode of the transistor 32 is connected to a gate electrode of the transistor 34 and a gate electrode of the transistor 39. A first terminal of the transistor 32 is connected to a node supplied with a low power supply potential (Vss). A second terminal of the transistor 32 is connected to the gate electrode of the transistor 33 and the gate electrode of the transistor 38.

A first terminal of the transistor 33 is connected to the terminal 22. A second terminal of the transistor 33 is connected to the terminal 27.

A first terminal of the transistor 34 is connected to the node supplied with the low power supply potential (Vss). A second terminal of the transistor 34 is connected to the terminal 27.

A gate electrode of the transistor 35 is connected to the terminal 21. A first terminal of the transistor 35 is connected to the node supplied with the low power supply potential (Vss). A second terminal of the transistor 35 is connected to the gate electrode of the transistor 34 and the gate electrode of the transistor 39.

A gate electrode of the transistor 36 is connected to the terminal 26. A first terminal of the transistor 36 is connected to the node supplied with the high power supply potential (Vdd). A second terminal of the transistor 36 is connected to the gate electrode of the transistor 34 and the gate electrode of the transistor 39. Note that it is possible to employ a structure in which the first terminal of the transistor 36 is connected to a node supplied with a power supply potential (Vcc) which is higher than the low power supply potential (Vss) and lower than the high power supply potential (Vdd).

A gate electrode of the transistor 37 is connected to the terminal 23. A first terminal of the transistor 37 is connected to the node supplied with the high power supply potential (Vdd). A second terminal of the transistor 37 is connected to the gate electrode of the transistor 34 and the gate electrode of the transistor 39. Note that the first terminal of the transistor 37 may be connected to the node supplied with the power supply potential (Vcc).

A first terminal of the transistor 38 is connected to the terminal 24. A second terminal of the transistor 38 is connected to the terminal 25.

A first terminal of the transistor 39 is connected to the node supplied with the low power supply potential (Vss). A second terminal of the transistor 39 is connected to the terminal 25.

Figure 8B:
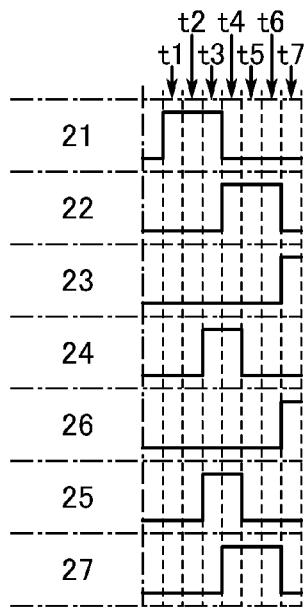

Next, FIG. 8B shows an example of a timing diagram of the pulse output circuit illustrated in FIG. 8A. Periods t1 to t7 shown in FIG. 8B have the same length of time. The length of each of the periods t1 to t7 corresponds to ½ of a pulse width of each of the first scan line driver circuit first clock signal to the first scan line driver circuit fourth clock signal (GCK1 to GCK4), and corresponds to ½ of a pulse width of each of the first to sixth pulse width control signals (PWC1 to PWC6).

In the pulse output circuit illustrated in FIG. 8A, a potential input to the terminal 21 is at a high level and potentials input to the terminal 22, the terminal 23, the terminal 24, and the terminal 26 are at a low level in the periods t1 and t2. Consequently, low-level potentials are output from the terminal 25 and the terminal 27.

Next, in the period t3, the potentials input to the terminal 21 and the terminal 24 are at a high level and the potentials input to the terminal 22, the terminal 23, and the terminal 26 are at a low level. Consequently, a high-level potential is output from the terminal 25 and a low-level potential is output from the terminal 27.

Subsequently, in the period t4, the potentials input to the terminal 22 and the terminal 24 are at a high level and the potentials input to the terminal 21, the terminal 23, and the terminal 26 are at a low level. Consequently, high-level potentials are output from the terminal 25 and the terminal 27.

In the periods t5 and t6, the potential input to the terminal 22 is at a high level and the potentials input to the terminal 21, the terminal 23, the terminal 24, and the terminal 26 are at a low level. Consequently, a low-level potential is output from the terminal 25 and a high-level potential is output from the terminal 27.

In the period t7, the potentials input to the terminal 23 and the terminal 26 are at a high level and the potentials input to the terminal 21, the terminal 22, and the terminal 24 are at a low level. Consequently, low-level potentials are output from the terminal 25 and the terminal 27.

Figure 8C:
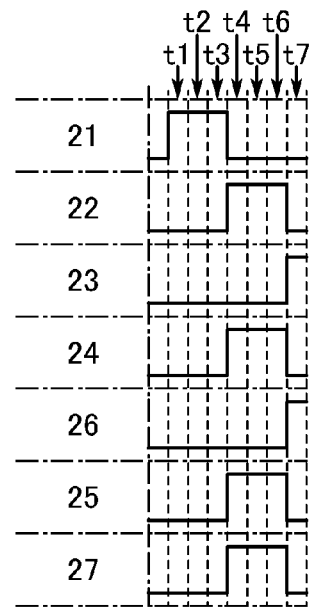

Next, FIG. 8C shows another example of the timing diagram of the pulse output circuit illustrated in FIG. 8A. Periods t1 to t7 in FIG. 8C have the same length of time. The length of each of the periods t1 to t7 corresponds to ⅓ of the pulse width of each of the first scan line driver circuit first clock signal to the first scan line driver circuit fourth clock signal (GCK1 to GCK4), and corresponds to ⅓ of the pulse width of each of the first to sixth pulse width control signals (PWC1 to PWC6).

In the pulse output circuit illustrated in FIG. 8A, the potential input to the terminal 21 is at a high level and the potentials input to the terminal 22, the terminal 23, the terminal 24, and the terminal 26 are at a low level in the periods t1 to t3. Consequently, low-level potentials are output from the terminal 25 and the terminal 27.

Then, in the periods t4 to t6, the potentials input to the terminal 22 and the terminal 24 are at a high level, and the potentials input to the terminal 21, the terminal 23, and the terminal 26 are at a low level. Consequently, high level potentials are output from the terminal 25 and the terminal 27.

<Operation Example of First Scan Line Driver Circuit in Full-Color Image Display Period 301>

Next, the operation of the first scan line driver circuit 11a in the full-color image display period 301 shown in FIG. 3 will be described, for example, using the first scan line driver circuit 11a described with reference to FIG. 6, FIG. 7, and FIG. 8A.

Figure 9:
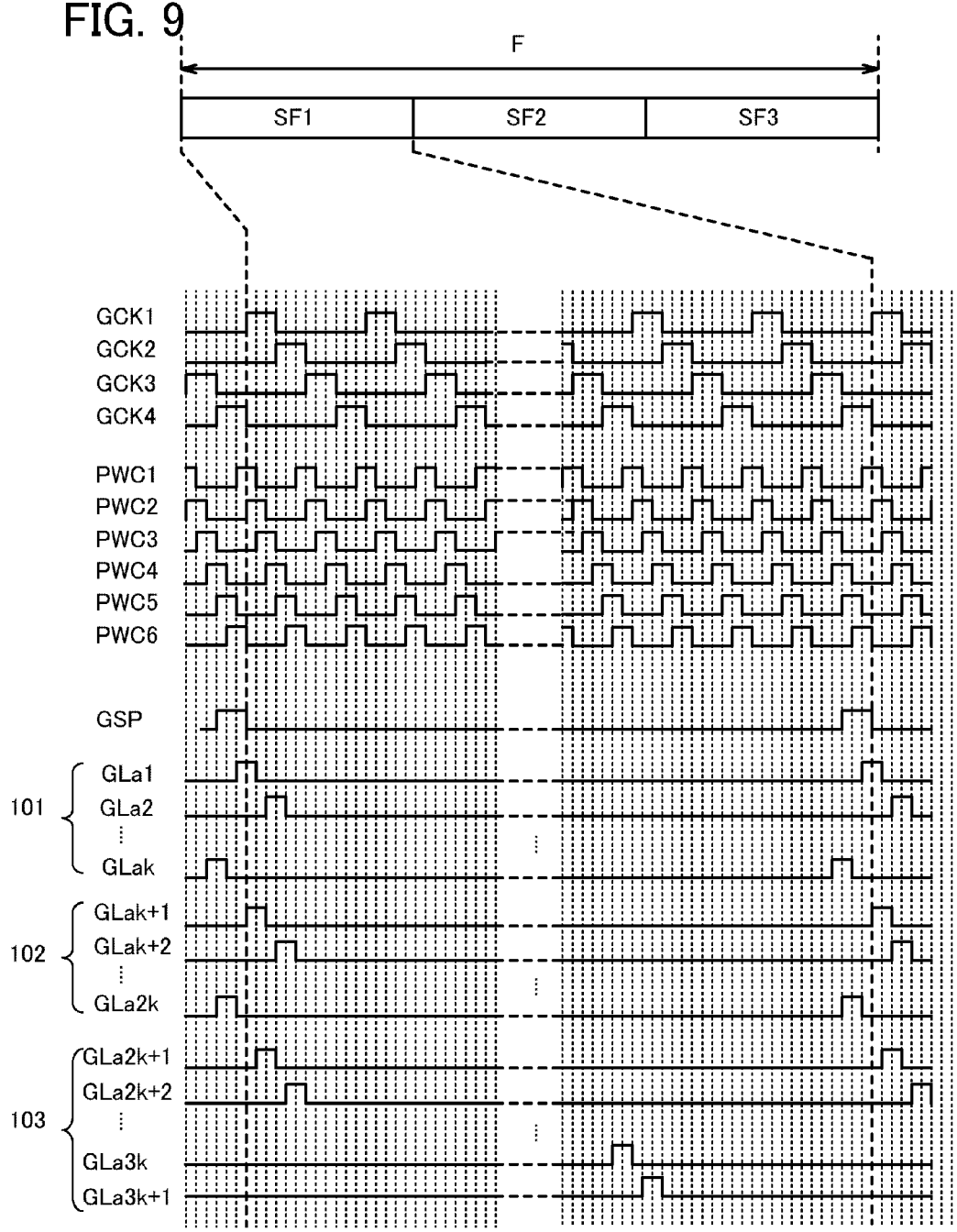
FIG. 9 is a timing diagram of a scan line driver circuit.

FIG. 9 shows an example of a timing diagram of the first scan line driver circuit 11a in the full-color image display period 301. A subframe period SF1, a subframe period SF2, and a subframe period SF3 are provided in one frame period in FIG. 9. In FIG. 9, a timing diagram of the subframe period SF1 is used as a typical example. Note that FIG. 9 shows the case of m=3k.

In FIG. 9, the scan lines GLa1 to GLak are connected to the pixels of the region 101, the scan lines GLak+1 to GLa2k are connected to the pixels of the region 102, the scan lines GLa2k+1 to GLa3k are connected to the pixels of the region 103.

The first scan line driver circuit first clock signal (GCK1) periodically repeats a high-level potential (the high power supply potential (Vdd)) and a low-level potential (the low power supply potential (Vss)), and has a duty ratio of 1/4. Further, the first scan line driver circuit second clock signal (GCK2) is a signal whose phase lags behind that of the first scan line driver circuit first clock signal (GCK1) by ¼ of its cycle, the first scan line driver circuit third clock signal (GCK3) is a signal whose phase lags behind that of the first scan line driver circuit first clock signal (GCK1) by ½ of its cycle, and the first scan line driver circuit fourth clock signal (GCK4) is a signal whose phase lags behind that of the first scan line driver circuit first clock signal (GCK1) by ¾ of its cycle.

The first pulse width control signal (PWC1) periodically repeats a high-level potential (the high power supply potential (Vdd)) and a low-level potential (the low power supply potential (Vss)), and has a duty ratio of 1/3. The second pulse width control signal (PWC2) is a signal whose phase lags behind the first pulse width control signal (PWC1) by ⅙ of its cycle, the third pulse width control signal (PWC3) is a signal whose phase lags behind the first pulse width control signal (PWC1) by ⅓ of its cycle, the fourth pulse width control signal (PWC4) is a signal whose phase lags behind the first pulse width control signal (PWC1) by ½ of its cycle, the fifth pulse width control signal (PWC5) is a signal whose phase lags behind the first pulse width control signal (PWC1) by ⅔ of its cycle, and the sixth pulse width control signal (PWC6) is a signal whose phase lags behind the first pulse width control signal (PWC1) by ⅚ of its cycle.

In FIG. 9, the ratio of the pulse width of each of the first scan line driver circuit first clock signal to the first scan line driver circuit fourth clock signal (GCK1 to GCK4) to the pulse width of each of the first to sixth pulse width control signals (PWC1 to PWC6) is 3:2.

Each of the subframe periods SF starts in response to falling of the potential of the pulse of the scan line driver circuit start pulse signal (GSP). The pulse width of the scan line driver circuit start pulse signal (GSP) is substantially the same as the pulse width of each of the first scan line driver circuit first clock signal to the first scan line driver circuit fourth clock signal (GCK1 to GCK4). The falling of the potential of the pulse of the scan line driver circuit start pulse signal (GSP) is synchronized with rising of the potential of the pulse of the first scan line driver circuit first clock signal (GCK1). The falling of the potential of the pulse of the scan line driver circuit start pulse signal (GSP) lags behind rising of the potential of the pulse of the first pulse width control signal (PWC1) by ⅙ of a cycle of the first pulse width control signal (PWC1).

The pulse output circuit illustrated in FIG. 8A is operated by the above signals in accordance with the timing diagram in FIG. 8B. Accordingly, as illustrated in FIG. 9, the selection signals whose pulses are sequentially shifted are supplied to the scan lines GLa1 to GLak for the region 101. Further, the pulses of the selection signals supplied to the scan lines GLa1 to GLak are each shifted by a period corresponding to ³⁄₂ of the pulse width. Note that the pulse width of each of the selection signals supplied to the scan lines GLa1 to GLak is substantially the same as the pulse width of each of the first to sixth pulse width control signals (PWC1 to PWC6).

As in the case of the region 101, selection signals whose pulses are sequentially shifted are supplied to the scan lines GLak+1 to GLa2k for the region 102. Further, the pulses of the selection signals supplied to the scan lines GLak+1 to GLa2k are each shifted by a period corresponding to ³⁄₂ of the pulse width. Note that the pulse width of each of the selection signals supplied to the scan lines GLak+1 to GLa2k is substantially the same as the pulse width of each of the first to sixth pulse width control signals (PWC1 to PWC6).

As in the case of the region 101, selection signals whose pulses are sequentially shifted are supplied to the scan lines GLa2k+1 to GLa3k for the region 103. Further, the phases of the pulses of the selection signals supplied to the scan lines GLa2k+1 to GLa3k are each shifted by ³⁄₂ of the pulse width. Note that the pulse width of each of the selection signal supplied to the scan lines GLa2k+1 to GLa3k is substantially the same as the pulse width of each of the first to sixth pulse width control signals (PWC1 to PWC6).

The phases of the pulses of the selection signals supplied to the scan lines GLa1, GLak+1, and GLa2k+1 are sequentially shifted by a period corresponding to ½ of the pulse width.

<Operation Example of Second Scan Line Driver Circuit in Monochrome Still Image Display Period 303>

Figure 10:
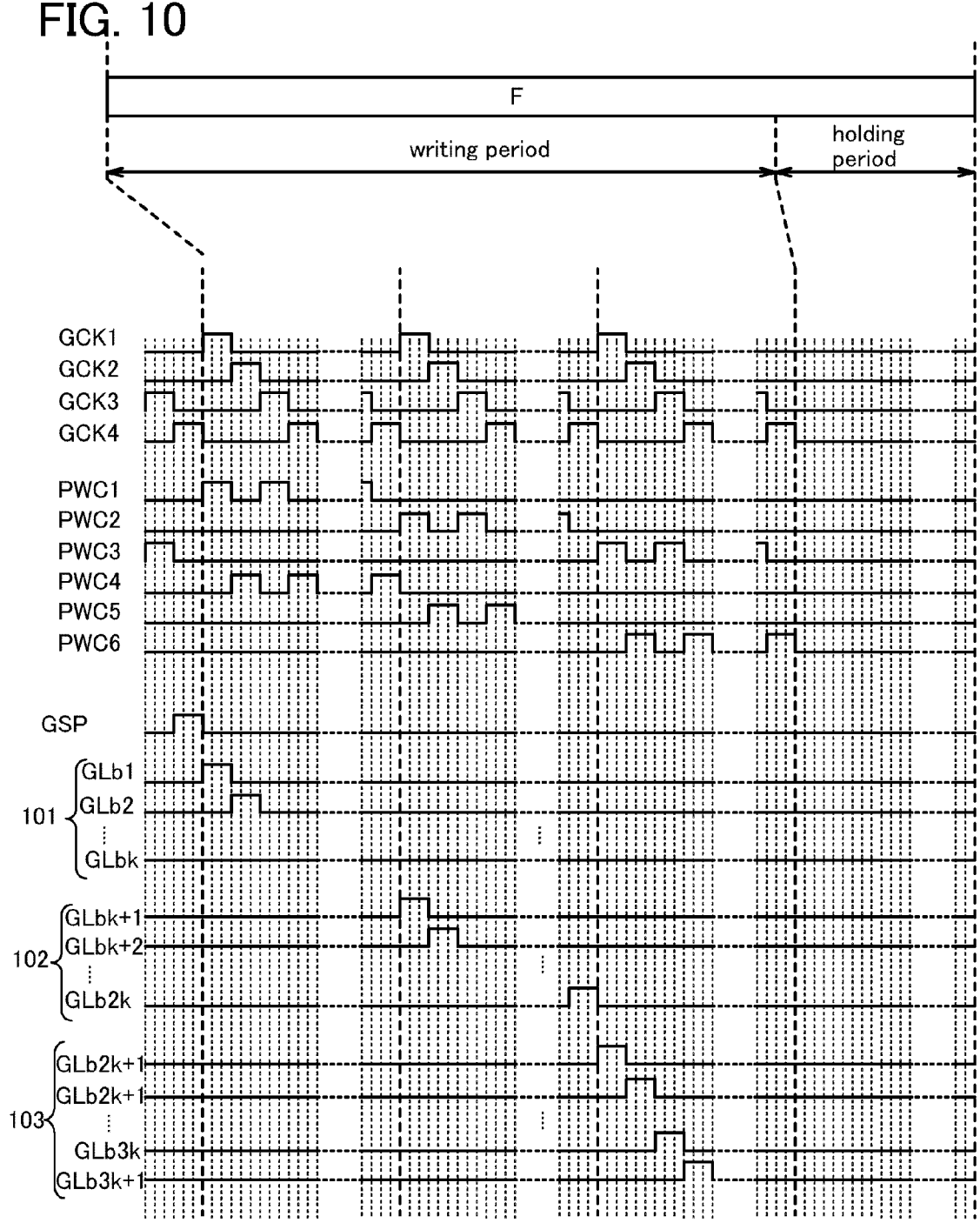
FIG. 10 is a timing diagram of a scan line driver circuit.

Next, the operation of the second scan line driver circuit 11b in the monochrome still image display period 303 shown in FIG. 3 will be described, for example, using the second scan line driver circuit 11b FIG. 10 shows an example of a timing diagram of the second scan line driver circuit 11b in the monochrome still image display period 303. In FIG. 10, a writing period in which writings of image signals to pixels are performed and a holding period in which the image signals are held are provided in one frame period.

A second scan line driver circuit first clock signal to a second scan line driver circuit fourth clock signal (GCK1 to GCK4) are the same signals as the first scan line driver circuit first clock signal to the first scan line driver circuit fourth clock signal (GCK1 to GCK4) in the case of FIG. 9.

The first pulse width control signal (PWC1) and the fourth pulse width control signal (PWC4) periodically repeat a high-level potential (the high power supply potential (Vdd)) and a low-level potential (the low power supply potential (Vss)) and have a duty ratio of 1/2 in the first ⅓ period of the writing period. Further, in the other periods in the writing period, the first pulse width control signal (PWC1) and the fourth pulse width control signal (PWC4) have the low-level potentials. The fourth pulse width control signal (PWC4) is a signal whose phase lags behind that of the first pulse width control signal (PWC1) by ½ of its cycle.

The second pulse width control signal (PWC2) and the fifth pulse width control signal (PWC5) periodically repeat a high-level potential (the high power supply potential (Vdd)) and a low-level potential (the low power supply potential (Vss)) and have a duty ratio of 1/2 in the middle ⅓ period of the writing period. In the other periods in the writing period, the second pulse width control signal (PWC2) and the fifth pulse width control signal (PWC5) have the low-level potentials. The fifth pulse width control signal (PWC5) is a signal whose phase lags behind the second pulse width control signal (PWC2) by ½ of its cycle.

The third pulse width control signal (PWC3) and the sixth pulse width control signal (PWC6) periodically repeat a high-level potential (the high power supply potential (Vdd)) and a low-level potential (the low power supply potential (Vss)) and have a duty ratio of 1/2 in the last ⅓ period of the writing period. In the other periods in the writing period, the third pulse width control signal (PWC3) and the sixth pulse width control signal (PWC6) have the low-level potentials. The sixth pulse width control signal (PWC6) is a signal whose phase lags behind the third pulse width control signal (PWC3) by ½ of its cycle.

In FIG. 10, the ratio of the pulse width of each of the second scan line driver circuit first clock signal to the second scan line driver circuit fourth clock signal (GCK1 to GCK4) with respect to the pulse width of each of the first to sixth pulse width control signals (PWC1 to PWC6) is 1:1.

A frame period F starts in response to falling of the potential of the pulse of the scan line driver circuit start pulse signal (GSP). The pulse width of the scan line driver circuit start pulse signal (GSP) is substantially the same as the pulse width of each of the second scan line driver circuit first clock signal to the second scan line driver circuit fourth clock signal (GCK1 to GCK4). The falling of the potential of the pulse of the scan line driver circuit start pulse signal (GSP) is synchronized with rising of the potential of the pulse of the second scan line driver circuit first clock signal (GCK1). In addition, the falling of the potential of the pulse of the scan line driver circuit start pulse signal (GSP) is synchronized with rising of the potential of a pulse of the first pulse width control signal (PWC1).

The pulse output circuit illustrated in FIG. 8A is operated by the above signals in accordance with the timing diagram in FIG. 8C. Accordingly, as shown in FIG. 10, the selection signals whose pulses are sequentially shifted are supplied to the scan lines GLb1 to GLbk for the region 101. Further, the phases of the pulses of the selection signals supplied to the scan lines GLb1 to GLbk are each shifted by a period corresponding to the pulse width. Note that the pulse width of each of the selection signals supplied to the scan lines GLb1 to GLk is substantially the same as the pulse width of each of the first to sixth pulse width control signals (PWC1 to PWC6).

After the selection signals whose pulses are sequentially shifted are supplied to all of the scan lines GLb1 to GLbk for the region 101, the selection signals whose pulses are sequentially shifted are also supplied to the scan lines GLbk+1 to GLb2k for the region 102. The phases of the pulses of the selection signals supplied to the scan lines GLbk+1 to GLb2k are each shifted by a period corresponding to the pulse width. Note that the pulse width of each of the selection signals supplied to the scan lines GLbk+1 to GLb2k is substantially the same as the pulse width of each of the first to sixth pulse width control signals (PWC1 to PWC6).

After the selection signals whose pulses are sequentially shifted are supplied to all of the scan lines GLbk+1 to GLb2k for the region 102, the selection signals whose pulses are sequentially shifted are also supplied to the scan lines GLb2k+1 to GLb3k for the region 103. Further, the phases of the pulses of the selection signals supplied to the scan lines GLb2k+1 to GLb3k are each shifted by a period corresponding to the pulse width. Note that the pulse width of each of the selection signals supplied to the scan lines GLb2k+1 to GLb3k is substantially the same as the pulse width of each of the first to sixth pulse width control signals (PWC1 to PWC6).

Next, in the holding period, supply of the driving signals and the power supply potentials to the second scan line driver circuit 11b is stopped. Specifically, first, supply of the scan line driver circuit start pulse signal (GSP) is stopped, whereby output of the selection signal from the pulse output circuit is stopped in the second scan line driver circuit 11b, and selection by the pulse in all of the scan lines connected to the second scan line driver circuit 11b is terminated. After that, supply of the power supply potential Vdd to the second scan line driver circuit 11b is stopped. Note that to stop input or to stop supply means, for example, to make a floating state of a wiring to which a signal or a potential is input, or to apply a low-level potential to a wiring to which a signal or a potential is input. By the above method, malfunction of the second scan line driver circuit 11b in stopping the operation of the second scan line driver circuit 11b can be prevented. In addition, supply of the second scan line driver circuit first clock signal to the second scan line driver circuit fourth clock signal (GCK1 to GCK4) and the first to sixth pulse width control signals (PWC1 to PWC6) to the second scan line driver circuit 11b may be stopped.

By stopping the supply of the driving signals and the power supply potential to the second scan line driver circuit 11b, low-level potentials are supplied to all of the scan lines GLb1 to GLbk, the scan lines GLbk+1 to GLb2k, and the scan lines GLb2k+1 to GLb3k.

Note that in the monochrome moving image display period 302, the operation of the second scan line driver circuit 11b in the writing period is the same as that in the monochrome still image display period 303.

<First Signal Line Driver Circuit 12a>

Figure 11A:
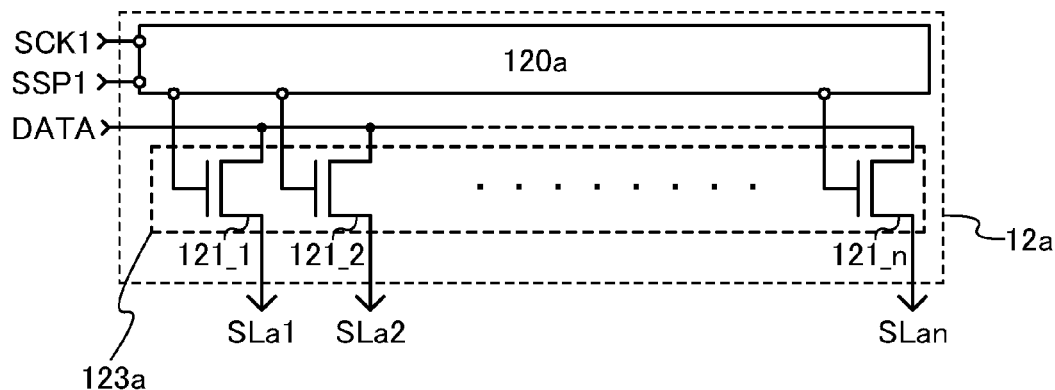
FIGS. 11A and 11B each illustrate a configuration of a signal line driver circuit.

FIG. 11A illustrates a configuration example of the first signal line driver circuit 12a included in the liquid crystal display device illustrated in FIG. 2A. The first signal line driver circuit 12a includes a shift register 120a having first to n-th output terminals and a switching element group 123a which controls supply of image signals (DATA) to the signal lines SLa1 to SLan.

Specifically, the switching element group 123a includes transistors 121_1 to 121_n. First terminals of the transistors 121_1 to 121_n are connected to a wiring for supplying the image signals (DATA). Second terminals of the transistors 121_1 to 121_n are connected to the signal lines SLa1 to SLan, respectively. Gate electrodes of the transistors 121_1 to 121_n are connected to the first to n-th output terminals of the shift register 120a, respectively.

The shift register 120a operates in accordance with a driving signal such as a signal line driver circuit start pulse signal (SSP1) and a signal line driver circuit clock signal (SCK1), and outputs signals whose pulses are sequentially shifted from the first to n-th output terminals. The signals are input to the gate electrodes of the transistors 121_1 to 121_n to turn on the transistors 121_1 to 121_n sequentially.

Figure 12A:
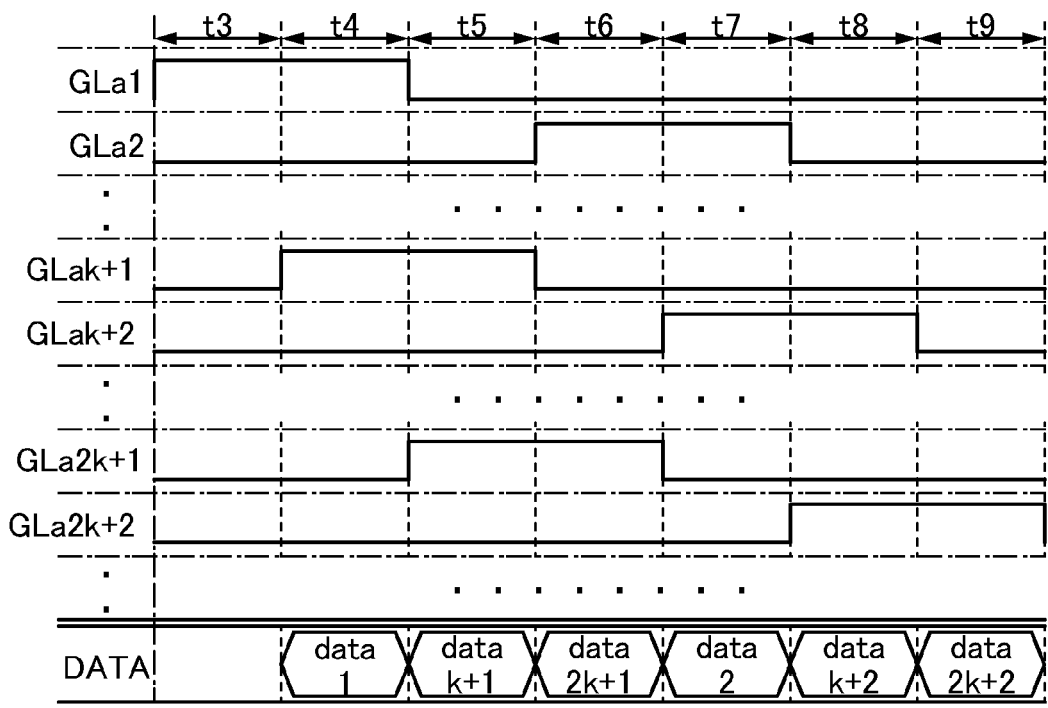
FIGS. 12A and 12B show examples of timing of image signals (DATA) supplied to signal lines.

FIG. 12A shows an example of the timing of image signals (DATA) supplied to the signal lines in the full-color image display period 301. As shown in FIG. 12A, in a period in which pulses of selections signals input to two scan lines overlap with each other, an image signal (DATA) for the scan line whose pulse appears first is sampled and input to the signal lines in the first signal line driver circuit 12a illustrated in FIG. 11A. Specifically, the pulse of the selection signal input to the scan line GLa1 and the pulse of the selection signal input to the scan line GLak+1 overlap with each other in a period t4 corresponding to ½ of the pulse width. Note that the pulse of the scan line GLa1 appears before the pulse of the scan line GLak+1. In the period in which the pulses overlap with each other, an image signal (data1) among the image signals (DATA) for the scan line GLa1 is sampled and input to the signal lines SLa1 to the SLan.

In a similar manner, in a period t5, an image signal (datak+1) for the scan line GLak+1 is sampled and input to the signal lines SLa1 to SLan. In a period t6, an image signal (data2k+1) for the scan line GLa2k+1 is sampled and input to the signal lines SLa1 to SLan. In a period t7, an image signal (data2) for the scan line GLa2 is sampled and input to the signal lines SLa1 to SLan. Also in a period t8 and subsequent periods, the same operation is repeated and image signals (DATA) are written to the pixel portion.

In other words, input of the image signals to the signal lines SLa1 to SLan is performed in the following order: pixels connected to the scan line GLas (s is a natural number less than k); pixels connected to the scan line GLa2k+s; and pixels connected to a scan line GLas+1.

Figure 12B:
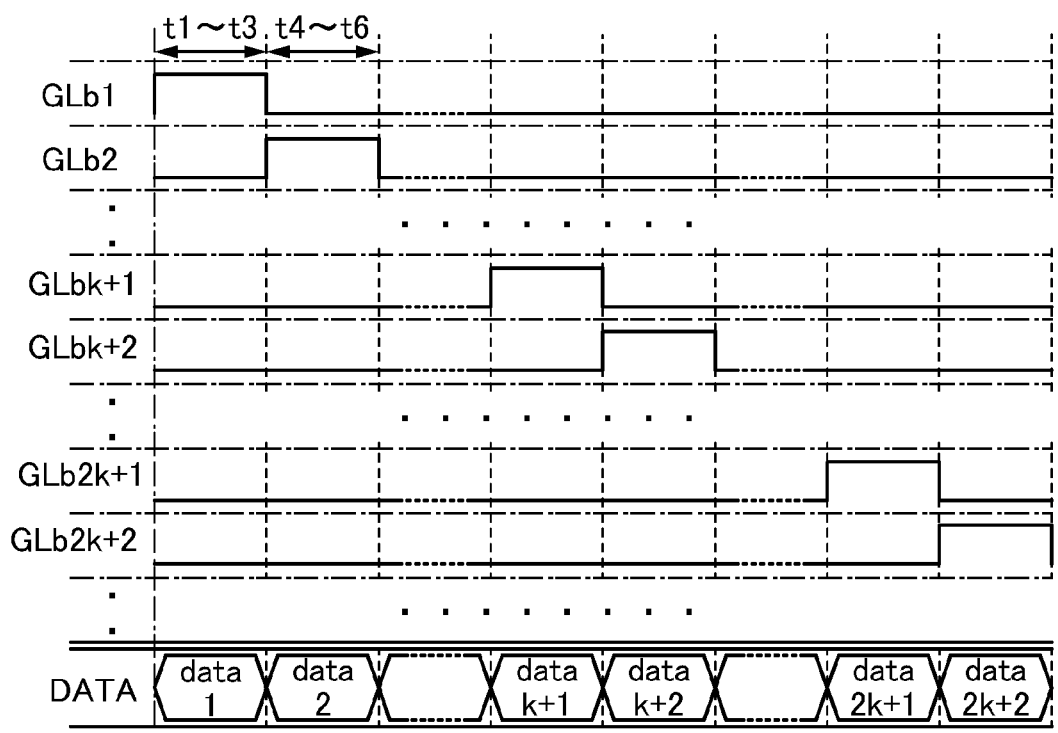

FIG. 12B shows an example of the timing of the image signals (DATA) supplied to the signal lines in the writing period provided in the monochrome moving image display period 302 and the monochrome still image display period 303.

<Second Signal Line Driver Circuit 12b>

Figure 11B:
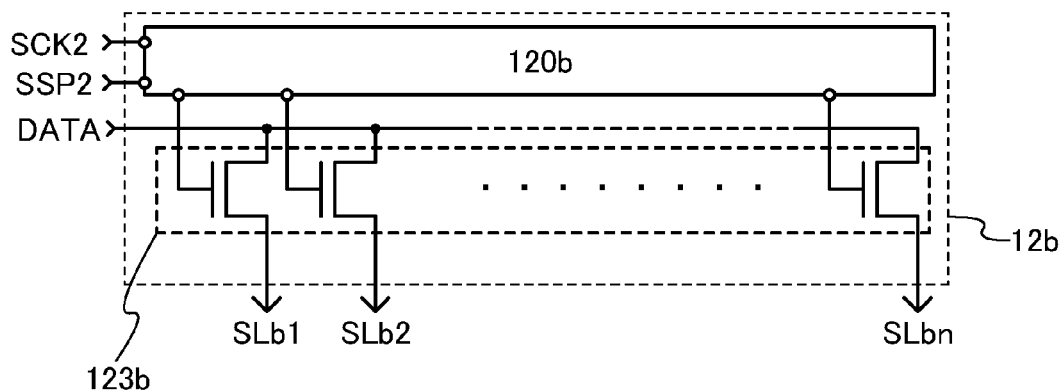

FIG. 11B illustrates a configuration example of the second signal line driver circuit 12b included in the liquid crystal display device shown in FIG. 2A. The second signal line driver circuit 12b includes a shift register 120b having first to n-th output terminals and a switching element group 123b which controls supply of image signals (DATA) to the signal lines SLb1 to SLbn.

Specifically, the switching element group 123b includes n transistors. A first terminal of each transistor is connected to a wiring for supplying the image signals (DATA). Second terminals of the transistors are connected to the signal lines SLb1 to SLbn, respectively. Gate electrodes of the transistors are connected to the first to n-th output terminals of the shift register 120b, respectively.

The shift register 120b operates in accordance with a driving signal such as a signal line driver circuit start pulse signal (SSP2) and a signal line driver circuit clock signal (SCK2), and outputs signals whose pulses are sequentially shifted from the first to n-th output terminals. The signals are input to the gate electrodes of the n transistors to turn on the n transistors sequentially.

As shown in FIG. 12B, in a period in which a pulse of a selection signal input to the scan line appears, the image signal (DATA) for the scan line is sampled and input to the signal lines in the second signal line driver circuit 12b illustrated in FIG. 11B. Specifically, in a period in which the pulse of the selection signal input to the scan line GLb1 appears, the image signal (data1) among the image signals (DATA) for the scan line GLb1 is sampled and input to the signal lines SLb1 to SLbn.

The same operation is repeated in all of the scan lines subsequent to the scan line GLb1, whereby image signals (DATA) are written to the pixel portion.

In the holding period in the monochrome still image display period 303, supply of the signal line driver circuit start pulse signal (SSP2) to the shift register 120b and supply of the image signals (DATA) to the second signal line driver circuit 12b are stopped. Specifically, first, the supply of the signal line driver circuit start pulse signal (SSP2) is stopped to stop sampling of an image signal in the second signal line driver circuit 12b. Then, the supply of the image signals and the supply of the power supply potentials to the second signal line driver circuit 12b are stopped. By the above method, malfunction of the second signal line driver circuit 12b in stopping operation of the second signal line driver circuit 12b can be prevented. In addition, supply of the signal line driver circuit clock signal (SCK2) to the second signal line driver circuit 12b may be stopped.

<Operation Example of Liquid Crystal Display Device>

Figure 13:
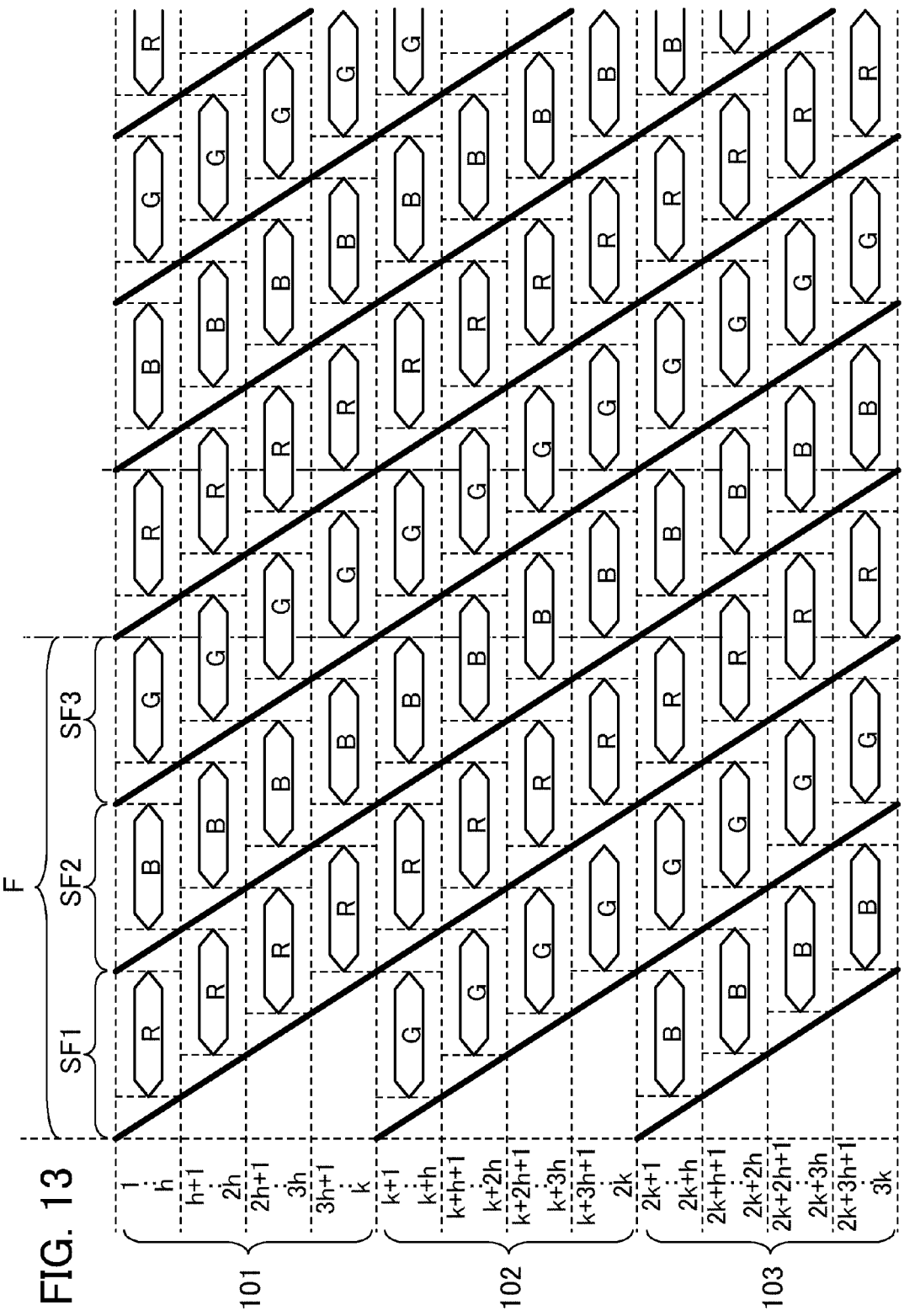
FIG. 13 shows timing of scanning of selection signals and timing of lighting of a backlight.

FIG. 13 shows the timing of scanning of the selection signals and the timing of lighting of the backlight in the full-color image display period 301 in the above-described liquid crystal display device. Note that in FIG. 13, the vertical axis represents the row in the pixel portion, and the horizontal axis represents time.

As shown in FIG. 13, in the liquid crystal display device described in this embodiment, a driving method in which a selection signal is supplied to the scan line GLa1 and then a selection signal is supplied to the scan line GLak+1, which is the k-th rows from the scan line GLa1, can be used in the full-color image display period 301. Therefore, the image signals can be supplied to the pixels in one subframe period SF in such a manner that n pixels connected to the scan line GLa1 to n pixels connected to the scan line GLak are sequentially selected, n pixels connected to the scan line GLak+1 to n pixels connected to the scan line GLa2k are sequentially selected, and n pixels connected to the scan line GLa2k+1 to n pixels connected to the scan line GLa3k are sequentially selected.

Specifically, in a first subframe period SF1 in FIG. 13, image signals for red (R) are written to the pixels connected to the scan lines GLa1 to GLak, and then a light of red (R) is supplied to the pixels connected to the scan lines GLa1 to GLak. With the above structure, an image for red (R) can be displayed in the region 101 of the pixel portion for the scan lines GLa1 to GLak.

Further, in the first subframe period SF1, image signals for green (G) are written in the pixels connected to the scan lines GLak+1 to GLa2k, and then a light of green (G) is supplied to the pixels connected to the scan lines GLak+1 to GLa2k. With the above structure, an image for green (G) can be displayed in the region 102 of the pixel portion for the scan lines GLak+1 to GLa2k.

Further, in the first subframe period SF1, image signals for blue (B) are written in the pixels connected to the scan lines GLa2k+1 to GLa3k, and then a light of blue (B) is supplied to the pixels connected to the scan lines GLa2k+1 to GLa3k. With the above structure, an image for blue (B) can be displayed in the region 103 of the pixel portion for the scan lines GLa2k+1 to GLa3k.

The same operation as in the first subframe period SF1 is repeated in a second subframe period SF2 and a third subframe period SF3. Note that in the second subframe period SF2, an image for blue (B) is displayed in the region 101 of the pixel portion for the scan lines GLa1 to GLak; an image for red (R) is displayed in the region 102 of the pixel portion for the scan lines GLak+1 to GLa2k; and an image for green (G) is displayed in the region 103 of the pixel portion for the scan lines GLa2k+1 to GLa3k. In the third subframe period SF3, an image for green (G) is displayed in the region 101 of the pixel portion for the scan lines GLa1 to GLak; an image for blue (B) is displayed in the region 102 of the pixel portion for the scan lines GLak+1 to GLa2k; and an image for red (R) is displayed in the region 103 of the pixel portion for the scan lines GLa2k+1 to GLa3k.

The first to third subframe periods SF1 to SF3 in all of the scan lines GLa are terminated, that is, one frame period is completed, whereby a full-color image can be displayed in the pixel portion.

Note that in one embodiment of the present invention, each of the regions may be further divided into regions. In the divided regions, lighting of the backlight may start sequentially in response to the termination of writings of image signals. For example, the following method may be employed: in the region 101, image signals for red (R) are written to the pixels connected to the scan lines GLa1 to GLah (h is a natural number less than or equal to k/4); and then, a light of red (R) is supplied to the pixels connected to the scan lines GLa1 to GLah while image signals for red (R) are written to the pixels connected to the scan lines GLah+1 to GLa2h.

Figure 14:
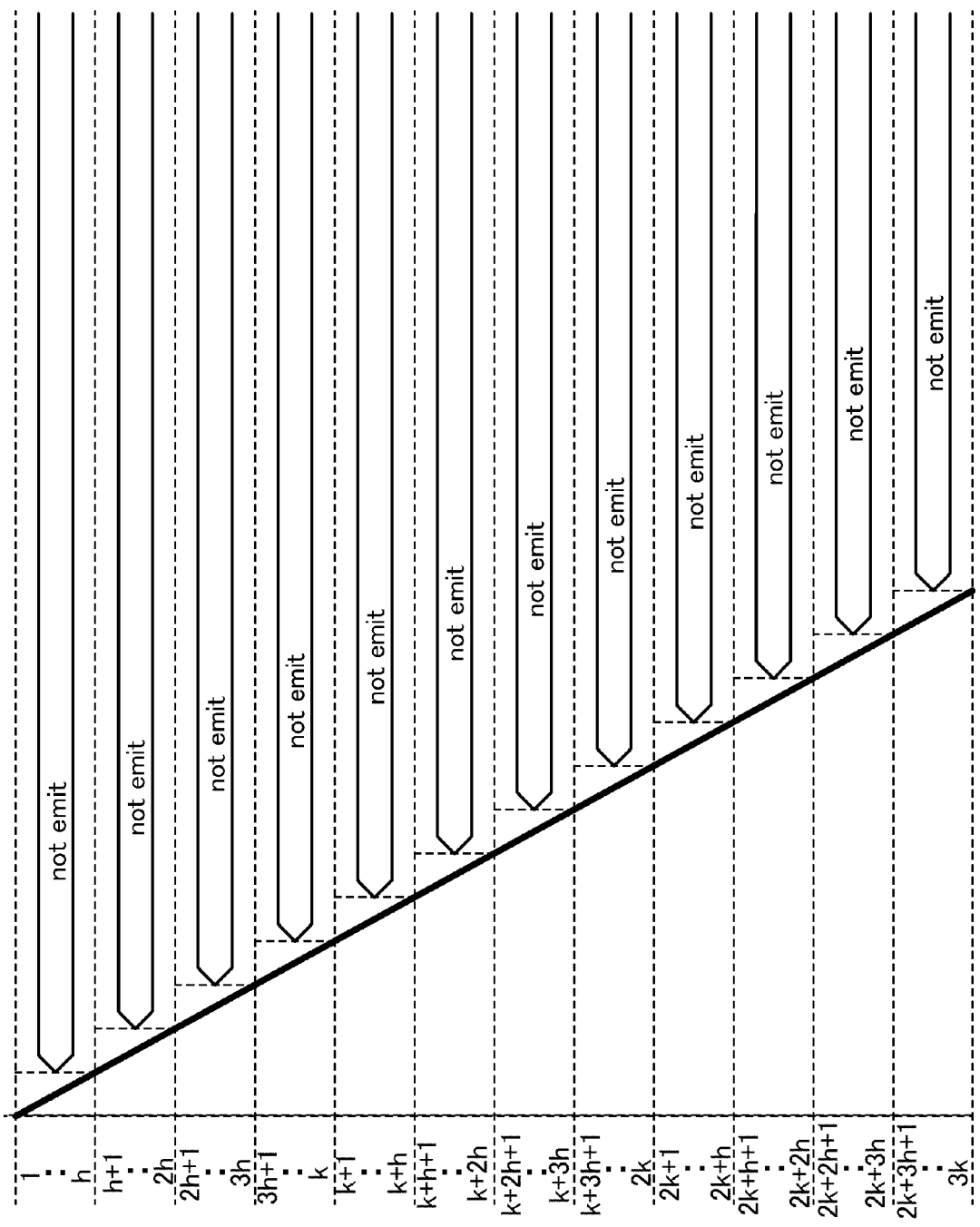
FIG. 14 shows timing of scanning of selection signals and timing of turning off of a backlight.

FIG. 14 shows the timing of scanning of the selection signals and the timing of turning off of the backlight in the monochrome still image display period 303 in the above-described liquid crystal display device. Note that in FIG. 14, the vertical axis represents the row in the pixel portion, and the horizontal axis represents time.

As shown in FIG. 14, the selection signals are sequentially supplied to the scan lines GLb1 to GLb3k in the monochrome still image display period 303 in the liquid crystal display device described in this embodiment.

Specifically, in FIG. 14, for example, after image signals are written to pixels connected to the scan line GLb1 to the scan line GLbh for the region 101, at the same time as writings of image signals to pixels connected to the scan line GLbh+1 to the scan line GLb2h, supply of light from the light sources to the pixels connected to the scan line GLb1 to the scan line GLbh is stopped. As a result, a monochrome image can be displayed in the pixel portion by utilizing external light.

Note that in the case of the monochrome moving image display period 302, after the above operations are performed in the pixels connected to the scan lines GLb1 to GLb3k, the same operation may be repeated again, so that a monochrome image is displayed in the pixel portion continually.

<Configuration Example 2 of Pulse Output Circuit>

Figure 19A:
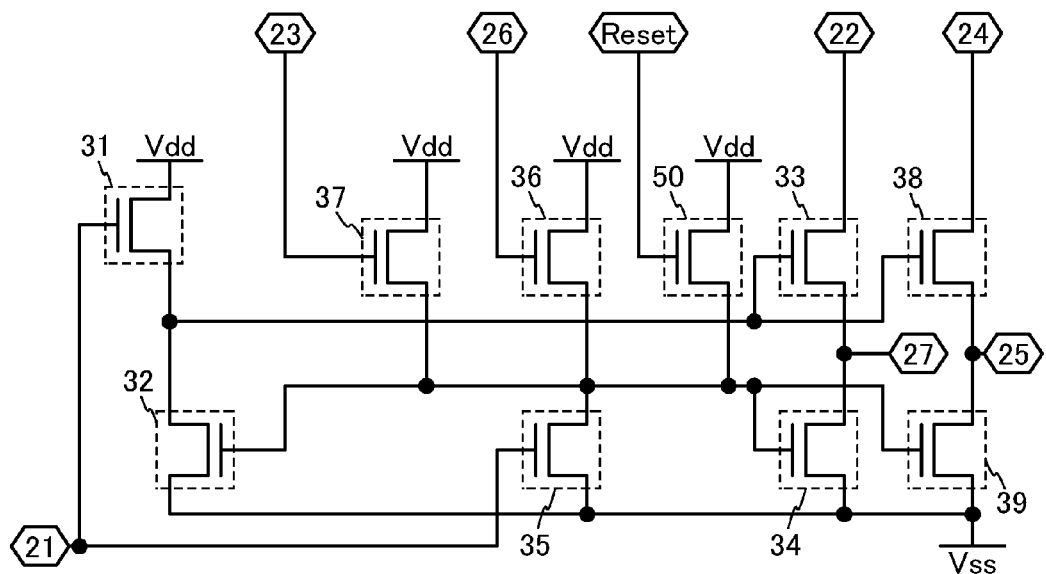
FIGS. 19A and 19B each illustrate a configuration of a pulse output circuit.

FIG. 19A illustrates another configuration example of the pulse output circuit. The pulse output circuit illustrated in FIG. 19A includes a transistor 50 in addition to the configuration of the pulse output circuit illustrated in FIG. 8A. A first terminal of the transistor 50 is connected to the node supplied with the high power supply potential. A second terminal of the transistor 50 is connected to the gate electrode of the transistor 32, the gate electrode of the transistor 34, and the gate electrode of the transistor 39. A gate electrode of the transistor 50 is connected to a reset terminal (Reset).

A high-level potential is input to the reset terminal in a period which follows the round of switching of hues of the backlight in the pixel portion; a low-level potential is input in the other periods. Note that the transistor 50 is turned on by input of a high-level potential. Thus, the potential of each node can be initialized in the period after the backlight is turned on, so that the malfunction can be prevented.

Note that in the case where the initialization is performed, it is necessary to provide an initialization period between periods in each of which an image is formed in the pixel portion. In addition, in the case where the backlight is turned off after one image is formed in the pixel portion, the initialization can be performed in the period in which the backlight is off.

Figure 19B:
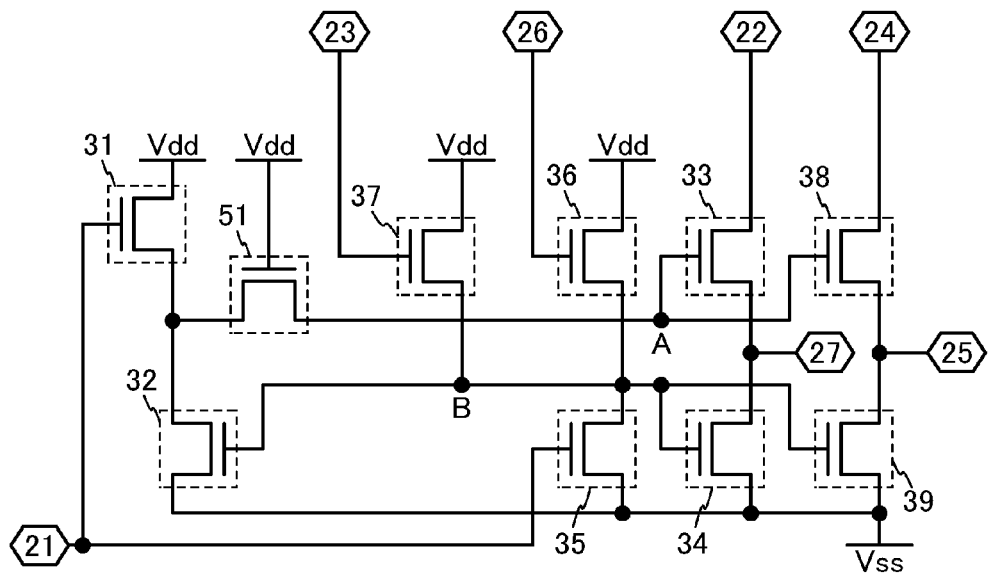

FIG. 19B illustrates another configuration example of the pulse output circuit. The pulse output circuit illustrated in FIG. 19B includes a transistor 51 in addition to the configuration of the pulse output circuit illustrated in FIG. 8A. A first terminal of the transistor 51 is connected to the second terminal of the transistor 31 and the second terminal of the transistor 32. A second terminal of the transistor 51 is connected to the gate electrode of the transistor 33 and the gate electrode of the transistor 38. A gate electrode of the transistor 51 is connected to the node supplied with the high power supply potential.

Note that the transistor 51 is off in the periods t1 to t6 shown in FIGS. 8B and 8C. Therefore, with the configuration including the transistor 51, the gate electrode of the transistor 33 and the gate electrode of the transistor 38 can be disconnected to the second terminal of the transistor 31 and the second terminal of the transistor 32 in the periods t1 to t6. Thus, a load at the time of the bootstrapping in the pulse output circuit can be reduced in the periods t1 to t6.

Figure 20A:
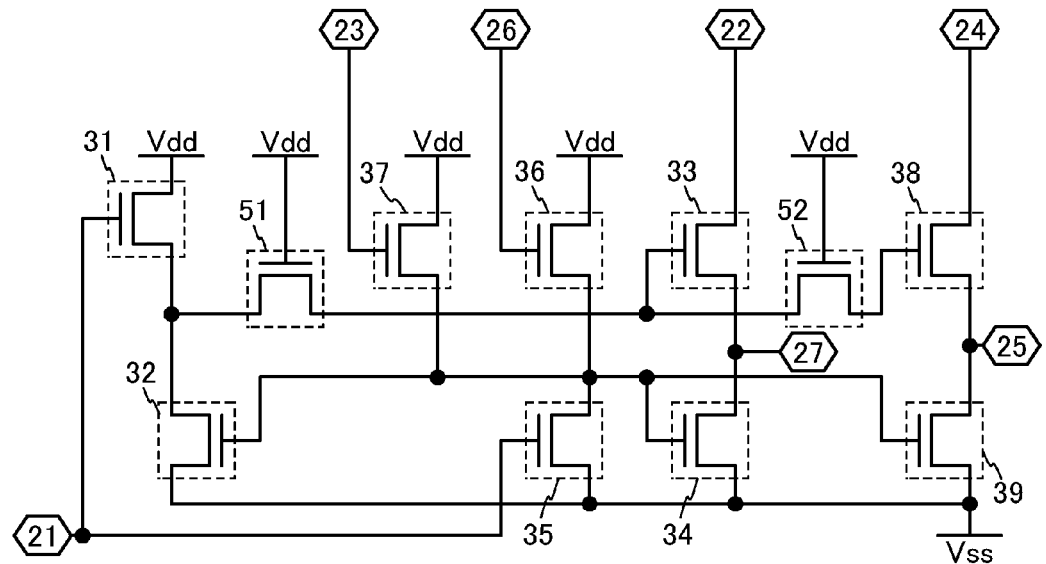
FIGS. 20A and 20B each illustrate a configuration of a pulse output circuit.

FIG. 20A illustrates another configuration example of the pulse output circuit. The pulse output circuit illustrated in FIG. 20A includes a transistor 52 in addition to the configuration of the pulse output circuit illustrated in FIG. 19B. A first terminal of the transistor 52 is connected to the gate electrode of the transistor 33 and the second terminal of the transistor 51. A second terminal of the transistor 52 is connected to the gate electrode of the transistor 38. A gate electrode of the transistor 52 is connected to the node supplied with the high power supply potential.

With the transistor 52, a load in the bootstrapping in the pulse output circuit can be reduced. In particular, the effect of reducing the load is enhanced in the case where the potential of a node connected to the gate electrode of the transistor 33 is increased simply by capacitive coupling of the source electrode and the gate electrode of the transistor 33 in the pulse output circuit.

Figure 20B:
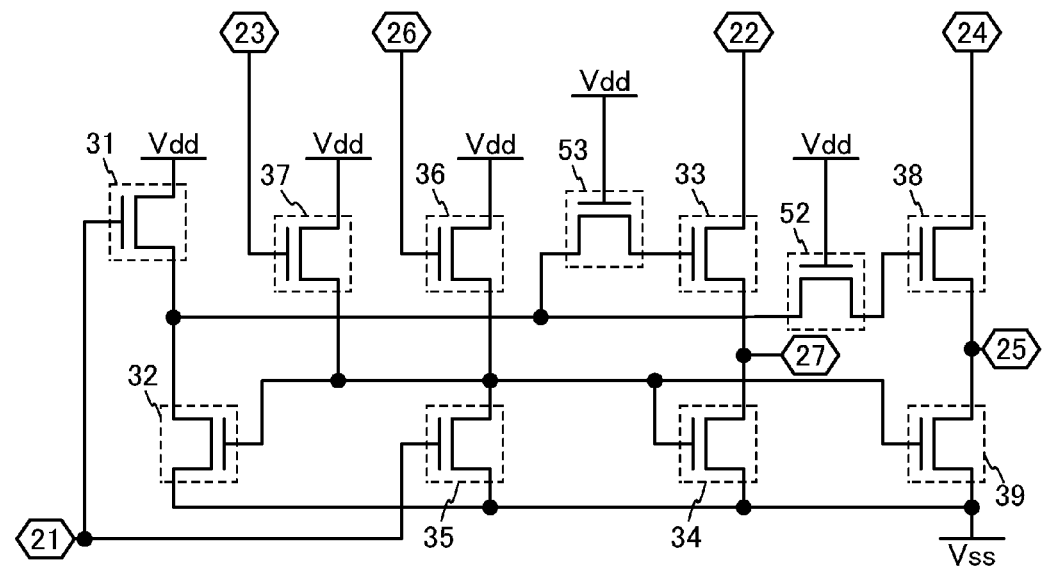

FIG. 20B illustrates another configuration example of the pulse output circuit. The pulse output circuit illustrated in FIG. 20B includes a transistor 53 in addition to the configuration of the pulse output circuit illustrated in FIG. 20A and does not include the transistor 51. A first terminal of the transistor 53 is connected to the second terminal of the transistor 31, the second terminal of the transistor 32, and the first terminal of the transistor 52. A second terminal of the transistor 53 is connected to the gate electrode of the transistor 33. A gate electrode of the transistor 53 is connected to the node supplied with the high power supply potential.

With the transistor 53, a load at the time of the bootstrapping in the pulse output circuit can be reduced. Further, an adverse effect of an irregular pulse generated in the pulse output circuit on the switching of the transistor 33 and the transistor 38 can be reduced.

As described in this embodiment, the liquid crystal display device according to one embodiment of the present invention performs color image display in such a manner that the pixel portion is divided into a plurality of regions and lights having different hues are sequentially supplied per region. At each time, the hues of the lights supplied to the adjacent regions can be different from each other. Accordingly, the images of different colors can be prevented from being perceived separately without being synthesized, and a color break, which is likely to occur when a moving image is displayed, can be prevented.

Note that in the case where a color image is displayed using a plurality of light sources having different hues, it is necessary to sequentially switch the plurality of light sources when light emission is performed unlike in the case where a light source of a single color and a color filter are used in combination. In addition, a frequency at which the light sources are switched needs be higher than a frame frequency in the case of using a single-color light source. For example, when the frame frequency in the case of using the single-color light source is 60 Hz, in the case where field-sequential driving is performed using light sources corresponding to colors of red, green, and blue, the frequency at which the light sources are switched is about three times as high as the frame frequency, i.e., 180 Hz. Accordingly, the driver circuits, which are operated in accordance with the frequency of the light sources, are operated at an extremely high frequency. Therefore, power consumption in the driver circuits tends to be higher than in the case of using the combination of the single-color light source and the color filter.

However, in one embodiment of the present invention, the transistor whose off-state current is extremely low is used, whereby the period in which a voltage applied to the liquid crystal element is held can be longer. Therefore, the driving frequency of a still image display can be lower than that of moving image display. Accordingly, it is possible to obtain a liquid crystal display device whose power consumption is reduced.

(Embodiment 2)

In this embodiment, an example of a liquid crystal display device according to one embodiment of the present invention, whose panel structure is different from that in Embodiment 1 will be described.

Figure 15:
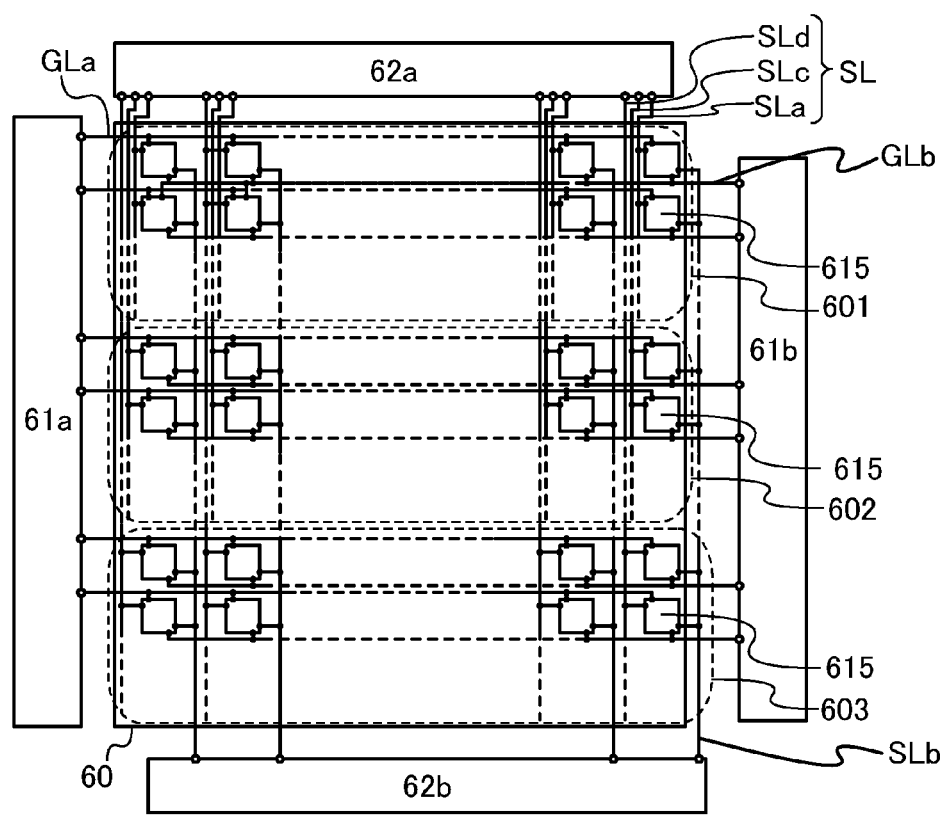
FIG. 15 illustrates a configuration of a panel.

FIG. 15 illustrates a structural example of a liquid crystal display device. The liquid crystal display device illustrated in FIG. 15 includes a pixel portion 60, a scan line driver circuit 61a, a scan line driver circuit 61b, a signal line driver circuit 62a, and a signal line driver circuit 62b. In one embodiment of the present invention, the pixel portion 60 is divided into a plurality of regions. Specifically, the pixel portion 60 is divided into three regions (regions 601 to 603) in FIG. 15. Each region includes a plurality of pixels 615 arranged in a matrix.

In addition, m scan lines GLa whose potentials are controlled by the scan line driver circuit 61a and 3×n signal lines SL whose potentials are controlled by the signal line driver circuit 62a are provided for the pixel portion 60. The m scan lines GLa are divided into a plurality of groups in accordance with the number of regions of the pixel portion 60. For example, the m scan lines GLa are divided into three groups because the pixel portion 60 is divided into three regions in FIG. 15. The scan lines GLa in each group are connected to the plurality of pixels 615 in each corresponding region. Specifically, each scan line GLa is connected to n pixels 615 in each corresponding row among the plurality of pixels 615 arranged in a matrix in each region.

In addition, the signal lines SL are divided into a plurality of groups in accordance with the number of regions of the pixel portion 60. For example, the 3×n signal lines SL are divided into three groups because the pixel portion 60 is divided into the three regions in FIG. 15. The signal lines SL in each group are connected to the plurality of pixels 615 in each corresponding region.

Specifically, in FIG. 15, the 3×n signal lines SL consist of n signal lines SLa, n signal lines SLc, and n signal lines SLd. Further, in FIG. 15, each of the n signal lines SLa is connected to the pixels 615 in each corresponding column among the plurality of pixels 615 arranged in a matrix in the region 601; each of the n signal lines SLc is connected to the pixels 615 in each corresponding column among the plurality of pixels 615 arranged in a matrix in the region 602; and each of the n signal lines SLd is connected to the pixels 615 in each corresponding column among the plurality of pixels 615 arranged in a matrix in the region 603.

<Configuration Example of Scan Line Driver Circuit 61a and Scan Line Driver Circuit 61b>

Figure 16A:
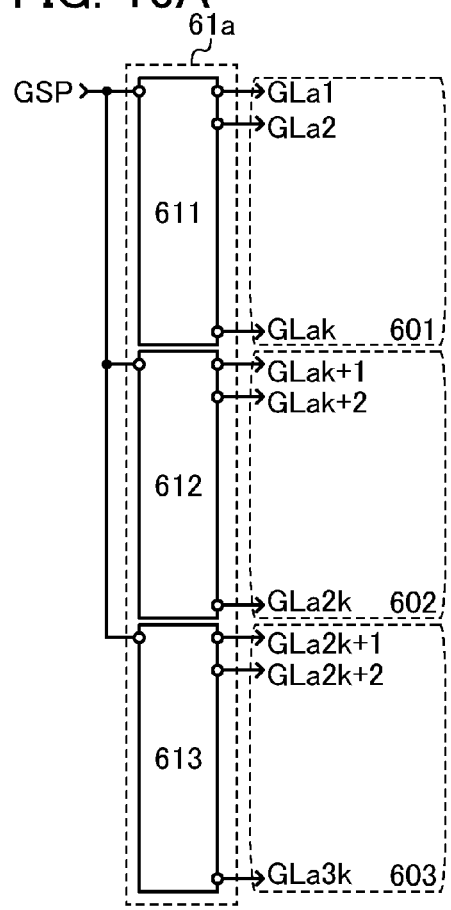
FIGS. 16A and 16B each illustrate a configuration of a scan line driver circuit.

FIG. 16A illustrates a configuration example of the scan line driver circuit 61a included in the liquid crystal display device illustrated in FIG. 15. The scan line driver circuit 61a illustrated in FIG. 16A includes shift registers 611 to 613 each including k output terminals. Each output terminal of the shift register 611 is connected to each corresponding one of the k scan lines GLa provided in the region 601; each output terminal of the shift register 612 is connected to each corresponding one of the k scan lines GLa provided in the region 602; and each output terminal of the shift register 613 is connected to each corresponding one of the k scan lines GLa provided in the region 603. That is, selection signals are scanned in the region 601 by the shift register 611, selection signals are scanned in the region 602 by the shift register 612, and selection signals are scanned in the region 603 by the shift register 613.

Specifically, a pulse of a scan line driver circuit start pulse signal (GSP) is input to the shift register 611, in response to which, the shift register 611 supplies selection signals whose pulses are sequentially shifted by ½ period to the scan lines GLa1 to GLak. In response to the input of the pulse of the scan line driver circuit start pulse signal (GSP), the shift register 612 supplies selection signals whose pulses are sequentially shifted by ½ period to the scan lines GLak+1 to GLa2k. In response to the input of the pulse of the scan line driver circuit start pulse signal (GSP), the shift register 613 supplies selection signals whose pulses are sequentially shifted by ½ period to the scan lines GLa2k+1 to GLa3k.

An operation example of the scan line driver circuit 61a in a full-color image display period 301 is described below with reference to FIG. 17A.

Figure 17A:
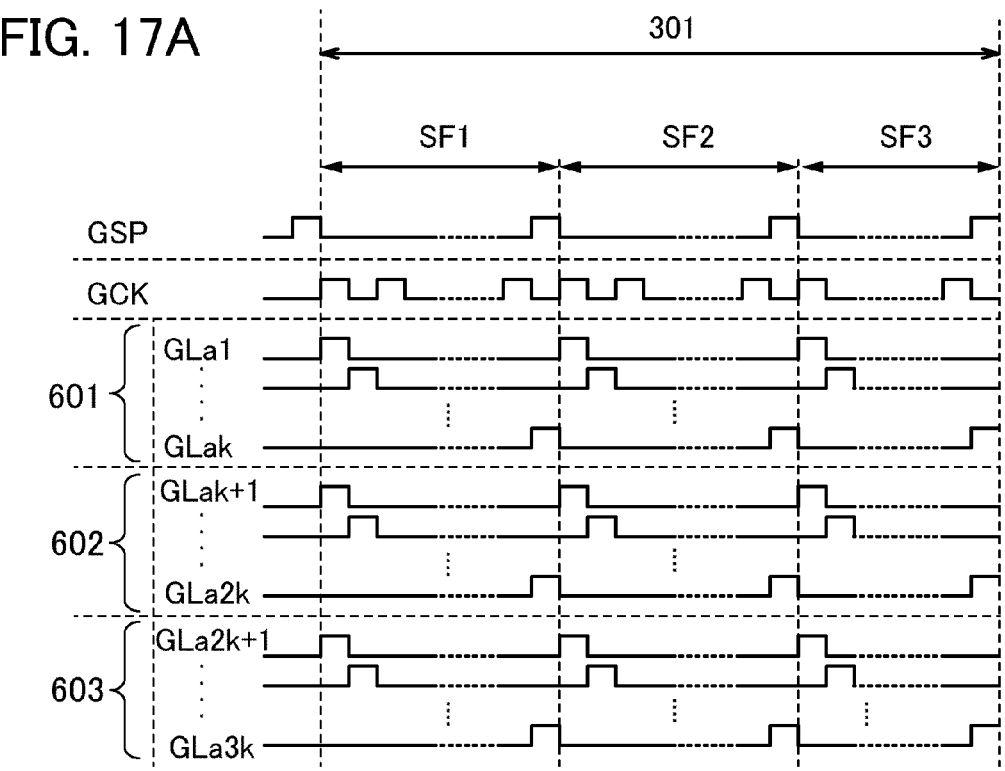
FIGS. 17A and 17B are each a timing diagram of a scan line driver circuit.

FIG. 17A is a timing diagram of a scan line driver circuit clock signal (GCK), the selection signals input to the scan lines GLa1 to GLak, the selection signals input to the scan lines GLak+1 to GLa2k, and the selection signals input to the scan lines GLa2k+1 to GLa3k.

First, an operation of the scan line driver circuit 61a in the full-color image display period 301 is described below. In the full-color image display period 301, a first subframe period SF1 starts in response to the pulse of the scan line driver circuit start pulse signal (GSP). In the first subframe period SF1, the selection signals whose pulses are sequentially shifted by ½ period are supplied to the scan lines GLa1 to GLak; the selection signals whose pulses are sequentially shifted by ½ period are supplied to the scan lines GLak+1 to GLa2k; and the selection signals whose pulses are sequentially shifted by ½ period are supplied to the scan lines GLa2k+1 to GLa3k.

Then, the pulse of the scan line driver circuit start pulse signal (GSP) is input to the scan line driver circuit 61a again, in response to which, a second subframe period SF2 starts. In the second subframe period SF2, as in the first subframe period SF1, sequentially-pulse-shifted selection signals are input to the scan lines GLa1 to GLak, the scan lines GLak+1 to GLa2k, and the scan lines GLa2k+1 to GLa3k.

Then, the pulse of the scan line driver circuit start pulse signal (GSP) is input to the scan line driver circuit 61a again, in response to which, a third subframe period SF3 starts. In the third subframe period SF3, as in the first subframe period SF1, sequentially-pulse-shifted selection signals are input to the scan lines GLa1 to GLak, the scan lines GLak+1 to GLa2k, and the scan lines GLa2k+1 to GLa3k.

The first to third subframe periods SF1 to SF3 are terminated to complete one frame period, whereby an image can be displayed in the pixel portion.

Next, an operation of the scan line driver circuit 61b in the monochrome still image display period 303 is described below. In the monochrome still image display period 303, an operation which is similar to the operation in any of the subframe periods in the full-color image display period 301 is performed in an image signal writing period in the scan line driver circuit 61b.

Figure 16B:
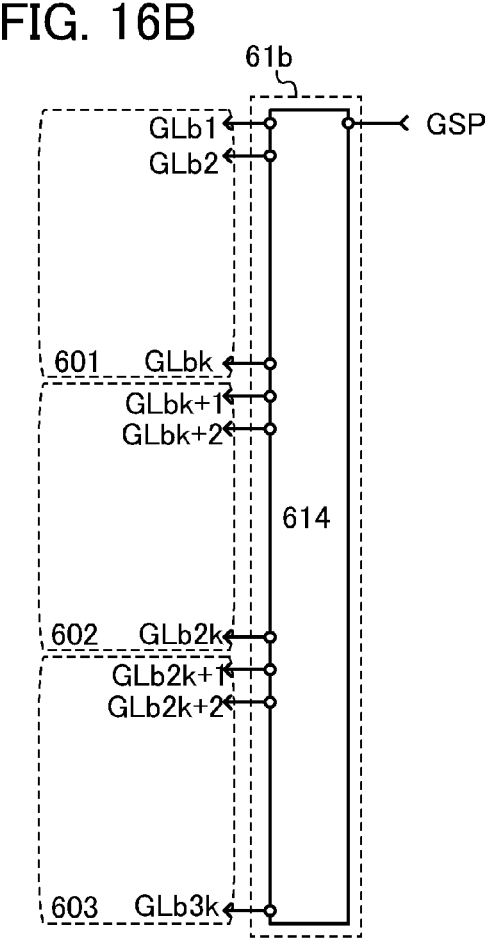

The scan line driver circuit 61b illustrated in FIG. 16B includes a shift register 614 including 3k output terminals. Each output terminal of the shift register 614 is connected to each corresponding one of the k scan lines GLb provided in the region 601, each corresponding one of the k scan lines GLb provided in the region 602, and each corresponding one of the k scan lines GLb provided in the region 603.

Specifically, a pulse of the scan line driver circuit start pulse signal (GSP) is input, in response to which, the shift register 614 begins to operate in accordance with the pulse and outputs selection signals whose pulses are sequentially shifted.

Next, in a holding period, supply of a driving signal and supply of a power supply potential to the scan line driver circuit 61b are stopped. Specifically, first, the supply of the scan line driver circuit start pulse signal (GSP) is stopped to stop the output of selection signals from the scan line driver circuit 61b, so that the selection by pulses in all of the scan lines GLb is terminated, and then, the supply of the power supply potential to the scan line driver circuit 61b is stopped. By the above method, malfunction of the scan line driver circuit 61b in stopping the operation of the scan line driver circuit 61b can be prevented. In addition, supply of the second scan line driver circuit first clock signal to the second scan line driver circuit fourth clock signal (GCK1 to GCK4) to the scan line driver circuit 61b may be stopped.

The supply of the driving signal and the supply of the power supply potential to the scan line driver circuit 61b are stopped, whereby a low-level potential is supplied to the scan lines GLb1 to GLbk, the scan lines GLbk+1 to GLb2k, and the scan lines GLb2k+1 to GL3k.

In the monochrome moving image display period 302, in a writing period, an operation of the scan line driver circuit 61b is similar to the operation in the monochrome still image display period 303.

Figure 17B:
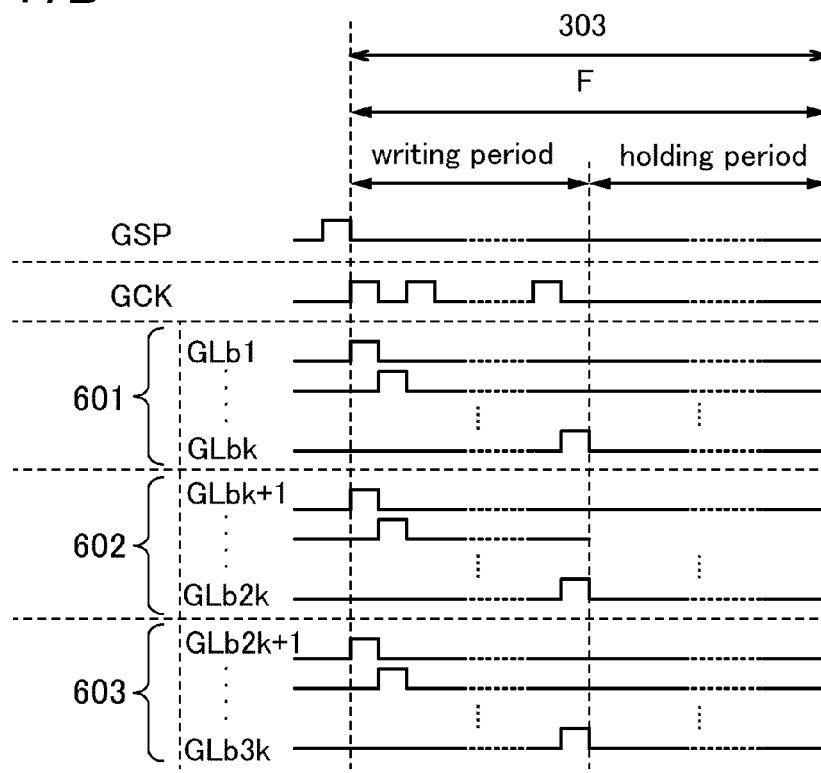

In one embodiment of the present invention, a transistor whose off-state current is extremely low is used in a pixel, whereby the period in which a voltage applied to the liquid crystal element is held can be longer. Therefore, in the monochrome still image display period 303, a long holding period shown in FIG. 17B can be secured, which enables the driving frequency of the scan line driver circuit 61b to be lower than in the full-color image display period 301. Accordingly, a liquid crystal display device whose power consumption is low can be provided.

<Configuration Example of Signal Line Driver Circuit 62a>

Figure 18A:
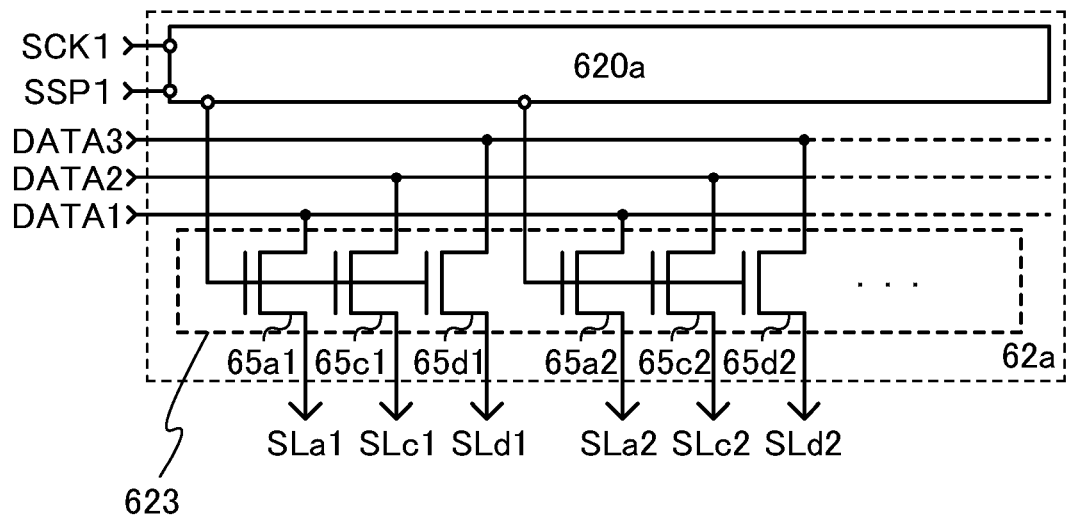
FIGS. 18A and 18B each illustrate a configuration of a signal line driver circuit.

FIG. 18A illustrates a configuration example of the signal line driver circuit 62a illustrated in FIG. 15. The signal line driver circuit 62a shown in FIG. 18A includes a shift register 620a having first to n-th output terminals and a switching element group 623 which controls supply of an image signal (DATA1) for the region 601, an image signal (DATA2) for the region 602, and an image signal (DATA3) for the region 603 to the signal lines SLa, SLc, and SLd.

Specifically, the switching element group 623 includes transistors 65a1 to 65an, transistors 65c1 to 65cn, and transistors 65d1 to 65dn.

First terminals of the transistors 65a1 to 65an are connected to a wiring for supplying the image signal (DATA1), second terminals thereof are connected to the signal lines SLa1 to SLan, respectively, and gate electrodes thereof are connected to the first to n-th output terminals of the shift register 620a, respectively.

First terminals of the transistors 65c1 to 65cn are connected to a wiring for supplying the image signal (DATA2), second terminals thereof are connected to the signal lines SLc1 to SLcn, respectively, and gate electrodes thereof are connected to the first to n-th output terminals of the shift register 620a, respectively.

First terminals of the transistors 65d1 to 65dn are connected to a wiring for supplying the image signal (DATA3), second terminals thereof are connected to the signal lines SLd1 to SLdn, respectively, and gate electrodes thereof are connected to the first to n-th output terminals of the shift register 620a, respectively.

The shift register 620a operates in accordance with a driving signal such as the signal line driver circuit start pulse signal (SSP1) and a signal line driver circuit clock signal (SCK1), and outputs signals whose pulses are sequentially shifted from the first to n-th output terminals. The signals are input to the gate electrodes of the transistors to turn on the transistors 65a1 to 65an sequentially, turn on the transistors 65c1 to 65cn sequentially, and turn on the transistors 65d1 to 65dn sequentially. Then, the image signal (DATA1) is input to the signal lines SLa1 to SLan, the image signal (DATA2) is input to the signal lines SLc1 to SLcn, and the image signal (DATA3) is input to the signal lines SLd1 to SLdn, so that an image is displayed.

<Configuration Example of Signal Line Driver Circuit 62b>

Figure 18B:
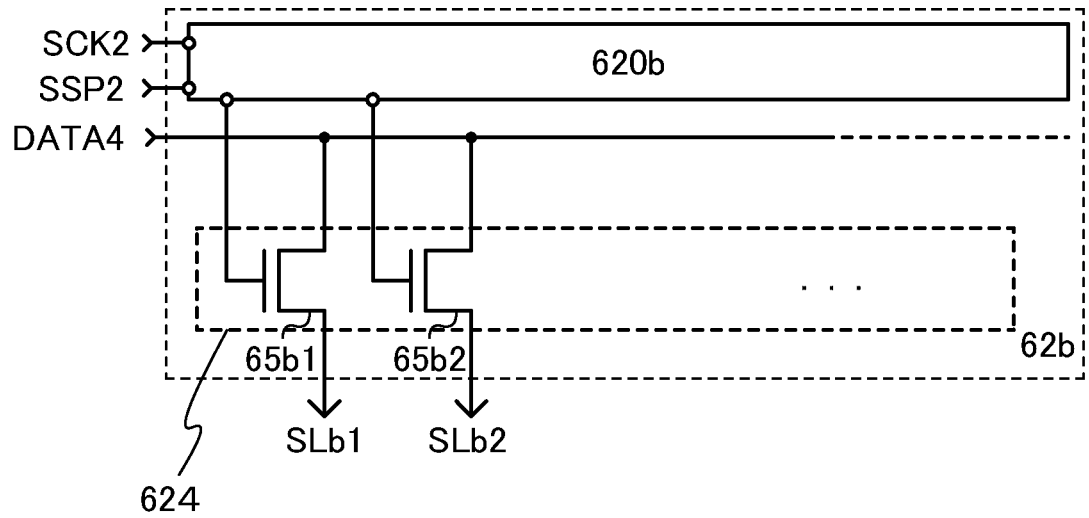

FIG. 18B illustrates a structural example of the signal line driver circuit 62b included in the liquid crystal display device in FIG. 15. The signal line driver circuit 62b includes a shift register 620b having first to n-th output terminals and a switching element group 624 which controls supply of image signals (DATA) to the signal lines SLb1 to SLbn.

The switching element group 624 includes a transistor 65b1 to a transistor 65bn. First terminals of the transistors 65b1 to 65bn are connected to a wiring for supplying an image signal (DATA4), second terminals thereof are connected to the signal lines SLb1 to SLbn, respectively, and gate electrodes thereof are connected to the first to n-th output terminals of the shift register 620b, respectively.

The shift register 620b operates in accordance with a driving signal such as the signal line driver circuit start pulse signal (SSP2) and the signal line driver circuit clock signal (SCK2), and outputs signals whose pulses are sequentially shifted from the first to n-th output terminals. The signals are input to the gate electrodes of the transistors 65b1 to 65bn to turn on the transistors 65b1 to 65bn sequentially.

In the holding period in the monochrome still image display period 303, supply of the signal line driver circuit start pulse signal (SSP2) to the shift register 620b and supply of the image signal (DATA4) to the signal line driver circuit 62b are stopped. Specifically, first, the supply of the signal line driver circuit start pulse signal (SSP2) is stopped to stop sampling of an image signal in the signal line driver circuit 62b, and then, the supply of the image signals and the supply of the power supply potential to the signal line driver circuit 62b are stopped. By the method, malfunction of the signal line driver circuit 62b in stopping the operation of the signal line driver circuit 62b can be prevented. In addition, supply of the signal line driver circuit clock signal (SCK2) to the signal line driver circuit 62b may be stopped.

This embodiment can be implemented in combination with another embodiment as appropriate.

(Embodiment 3)

In this embodiment, a manufacturing method of a transistor including an oxide semiconductor will be described.

Figure 21A:
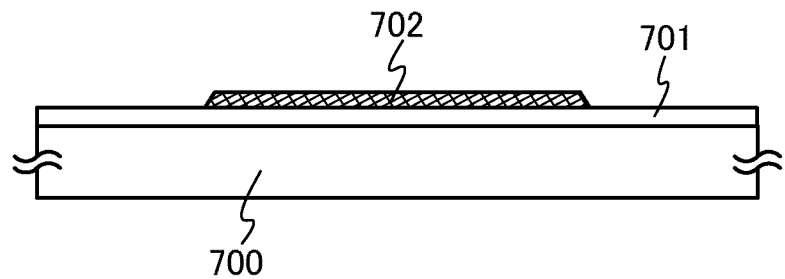
FIGS. 21A to 21C are cross-sectional views illustrating a method for manufacturing a transistor.

First, as illustrated in FIG. 21A, an insulating film 701 is formed over an insulating surface of a substrate 700, and a gate electrode 702 is formed over the insulating film 701.

Although there is no particular limitation on a substrate which can be used as the substrate 700 as long as it has a light-transmitting property, it is necessary that the substrate have at least enough heat resistance to heat treatment performed later. For example, a glass substrate manufactured by a fusion process or a float process, a quartz substrate, a ceramic substrate, or the like can be used as the substrate 700. In the case where a glass substrate is used and the temperature at which the heat treatment is to be performed later is high, a glass substrate whose strain point is higher than or equal to 730° C. is preferably used. Although a substrate formed of a flexible synthetic resin such as plastic generally has a lower resistance temperature than the aforementioned substrates, it may be used as long as being resistant to a processing temperature during manufacturing steps.

The insulating film 701 is formed using a material which can withstand a temperature of heat treatment in a later manufacturing step. Specifically, it is preferable to use silicon oxide, silicon nitride, silicon nitride oxide, silicon oxynitride, aluminum nitride, aluminum oxide, gallium oxide, or the like for the insulating film 701.

In this specification, an oxynitride denotes a material in which the amount of oxygen is larger than that of nitrogen, and a nitride oxide denotes a material in which the amount of nitrogen is larger than that of oxygen.

The gate electrode 702 can be formed with a single layer or a stacked layer using one or more of conductive films including a metal material such as molybdenum, titanium, chromium, tantalum, tungsten, neodymium, or scandium, or an alloy material including any of these metal materials as a main component, or a nitride of these metals. Note that aluminum or copper can also be used as such a metal material if it can withstand the temperature of heat treatment to be performed in a later step. Aluminum or copper is preferably combined with a refractory metal material in order to prevent a heat resistance problem and a corrosive problem. As the refractory metal material, molybdenum, titanium, chromium, tantalum, tungsten, neodymium, scandium, or the like can be used.

The thickness of the gate electrode 702 is in the range of 10 nm to 400 nm, preferably 100 nm to 200 nm. In this embodiment, a conductive film with a thickness of 150 nm for the gate electrode is formed by a sputtering method using a tungsten target, and then the conductive film is processed (patterned) into a desired shape by etching, whereby the gate electrode 702 is formed. Note that the end portion of the formed gate electrode is preferably tapered because coverage with a gate insulating film stacked thereover is improved. Note that a resist mask may be formed by an inkjet method. Formation of the resist mask by an inkjet method needs no photomask; thus, manufacturing cost can be reduced.

Figure 21B:
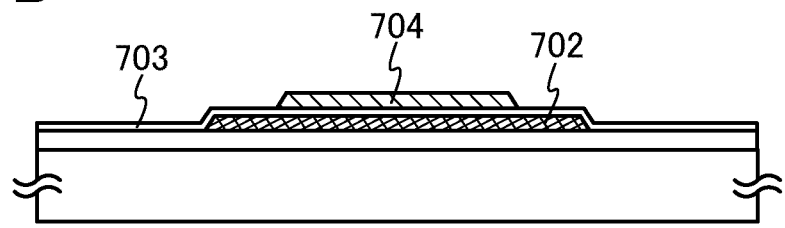

Next, as illustrated in FIG. 21B, a gate insulating film 703 is formed over the gate electrode 702, and then an island-shaped oxide semiconductor film 704 is formed over the gate insulating film 703 in a position overlapping with the gate electrode 702.

The gate insulating film 703 can be formed with a single-layer structure or a stacked-layer structure including any of a silicon oxide film, a silicon nitride film, a silicon oxynitride film, a silicon nitride oxide film, an aluminum oxide film, an aluminum nitride film, an aluminum oxynitride film, an aluminum nitride oxide film, a hafnium oxide film, a tantalum oxide film, or a gallium oxide film by a plasma CVD method, a sputtering method, or the like. It is preferable that the gate insulating film 703 do not include an impurity such as moisture, hydrogen, or oxygen as much as possible. In the case of forming a silicon oxide film by a sputtering method, a silicon target or a quartz target is used as a target, and oxygen or a mixed gas of oxygen and argon is used as a sputtering gas.

The oxide semiconductor which is highly purified by removal of an impurity is extremely sensitive to an interface state density or an interface electric charge; therefore, the interface between the highly purified oxide semiconductor and the gate insulating film 703 is important. Therefore, the gate insulating film (GI) that is in contact with the highly purified oxide semiconductor needs to have higher quality.

For example, a high-density plasma enhanced CVD using a microwave (frequency: 2.45 GHz) is preferably used, in which case an insulating film which is dense, has high withstand voltage, and is of high quality can be formed. This is because when the highly purified oxide semiconductor is closely in contact with the high-quality gate insulating film, the interface state density can be reduced and interface properties can be favorable.

Needless to say, other film formation methods, such as a sputtering method or a plasma CVD method, can be applied as long as a high-quality insulating film can be formed as the gate insulating film 703. In any case, any insulating film that has a reduced interface state density between a gate insulating film and the oxide semiconductor and can form a favorable interface as well as having a favorable film quality as the gate insulating film can be used.

In this embodiment, the gate insulating film 703 having a structure in which an aluminum oxide film having a thickness of 100 nm formed by a sputtering method is stacked over a silicon nitride film having a thickness of 50 nm formed by a sputtering method is formed. The thickness of the gate insulating film 703 may be set as appropriate depending on characteristics needed for the transistor and may be about 350 nm to 400 nm.

Note that the gate insulating film 703 is in contact with the oxide semiconductor to be formed later. When hydrogen is contained in the oxide semiconductor, characteristics of the transistor are adversely affected; therefore, it is preferable that the gate insulating film 703 do not contain hydrogen, a hydroxyl group, and moisture. In order that the gate insulating film 703 does not contain hydrogen, a hydroxyl group, and moisture as much as possible, it is preferable that an impurity adsorbed on the substrate 700, such as moisture or hydrogen, be eliminated and removed by preheating the substrate 700, over which the gate electrode 702 is formed, in a preheating chamber of a sputtering apparatus, as a pretreatment for film formation. The temperature for the preheating is higher than or equal to 100° C. and lower than or equal to 400° C., preferably higher than or equal to 150° C. and lower than or equal to 300° C. As an exhaustion unit provided for the preheating chamber, a cryopump is preferable. Note that this preheating treatment can be omitted.

The island-shaped oxide semiconductor film can be formed by processing an oxide semiconductor film formed over the gate insulating film 703 into a desired shape. The thickness of the oxide semiconductor film is greater than or equal to 2 nm and less than or equal to 200 nm, preferably greater than or equal to 3 nm and less than or equal to 50 nm, more preferably greater than or equal to 3 nm and less than or equal to 20 nm. The oxide semiconductor film is formed by a sputtering method using an oxide semiconductor target. Moreover, the oxide semiconductor film can be formed by a sputtering method under a rare gas (e.g., argon) atmosphere, an oxygen atmosphere, or a mixed atmosphere of a rare gas (e.g., argon) and oxygen.

In this embodiment, as the oxide semiconductor film, an In—Ga—Zn—O-based oxide semiconductor thin film with a thickness of 30 nm, which is obtained by a sputtering method using a target for an oxide semiconductor containing indium (In), gallium (Ga), and zinc (Zn), is used. As the target, for example, a target of $In_2O_3:Ga_2O_3:ZnO=1:1:2$ (molar ratio), $In_2O_3:Ga_2O_3:ZnO=1:1:1$ (molar ratio), or $In_2O_3:Ga_2O_3:ZnO=1:1:4$ (molar ratio) can be used. The filling factor of the target including In, Ga, and Zn is higher than or equal to 90% and lower than or equal to 100%, preferably higher than or equal to 95% and lower than 100%.

In this embodiment, the oxide semiconductor film is formed over the substrate 700 in such a manner that the substrate is held in a treatment chamber kept at reduced pressure, a sputtering gas from which hydrogen and moisture have been removed is introduced into the treatment chamber while remaining moisture therein is removed, and the above target is used. The substrate temperature may be set to higher than or equal to 100° C. and lower than or equal to 600° C., preferably higher than or equal to 200° C. and lower than or equal to 400° C. in film formation. By forming the oxide semiconductor film in a state where the substrate is heated, the concentration of an impurity contained in the formed oxide semiconductor film can be reduced. In addition, damage by sputtering can be reduced. In order to remove remaining moisture in the treatment chamber, an entrapment vacuum pump is preferably used. For example, a cryopump, an ion pump, or a titanium sublimation pump is preferably used. The exhaustion unit may be a turbo pump provided with a cold trap. In a treatment chamber which is exhausted with the cryopump, for example, a hydrogen atom, a compound containing a hydrogen atom, such as water ($H_2O$), (more preferably, also a compound containing a carbon atom), and the like are removed, whereby the concentration of an impurity contained in the oxide semiconductor film formed in the treatment chamber can be reduced.

As one example of the deposition conditions, the distance between the substrate and the target is 100 mm, the pressure is 0.6 Pa, the direct-current (DC) power is 0.5 kW, and the atmosphere is an oxygen atmosphere (the proportion of the oxygen flow rate is 100%). Note that a pulsed direct-current (DC) power supply is preferable because dust generated in deposition can be reduced and the film thickness can be made uniform.

In order that the oxide semiconductor film does not contain hydrogen, a hydroxyl group, and moisture as much as possible, it is preferable that an impurity adsorbed on the substrate 700, such as moisture or hydrogen, be eliminated and removed by preheating the substrate 700, over which films up to and including the gate insulating film 703 are formed, in a preheating chamber of a sputtering apparatus, as a pretreatment for film formation. The temperature for the preheating is higher than or equal to 100° C. and lower than or equal to 400° C., preferably higher than or equal to 150° C. and lower than or equal to 300° C. As an exhaustion unit, a cryopump is preferably provided for the preheating chamber. Note that this preheating treatment can be omitted. This preheating may be similarly performed on the substrate 700 over which films up to and including the conductive film 705 and the conductive film 706 are formed, before the formation of an insulating film 707.

Note that etching for forming the island-shaped oxide semiconductor film 704 may be wet etching, dry etching, or both dry etching and wet etching. As the etching gas for dry etching, a gas containing chlorine (e.g., a chlorine-based gas such as chlorine ($Cl_2$), boron trichloride ($BCl_3$), silicon tetrachloride ($SiCl_4$), or carbon tetrachloride ($CCl_4$)) is preferably used. Alternatively, a gas containing fluorine (e.g., a fluorine-based gas such as carbon tetrafluoride ($CF_4$), sulfur hexafluoride ($SF_6$), nitrogen trifluoride ($NF_3$), or trifluoromethane ($CHF_3$)); hydrogen bromide (HBr); oxygen ($O_2$); any of these gases to which a rare gas such as helium (He) or argon (Ar) is added; or the like can be used.

As the dry etching method, a parallel plate RIE (reactive ion etching) method or an ICP (inductively coupled plasma) etching method can be used. In order to etch a film into a desired shape, the etching conditions (the amount of electric power applied to a coil-shaped electrode, the amount of electric power applied to an electrode on a substrate side, the temperature of the electrode on the substrate side, or the like) are adjusted as appropriate.

As an etchant used for wet etching, ITO-07N (produced by KANTO CHEMICAL CO., INC.) may be used.

A resist mask for forming the island-shaped oxide semiconductor film 704 may be formed by an inkjet method. Formation of the resist mask by an inkjet method needs no photomask; thus, manufacturing cost can be reduced.

Note that the oxide semiconductor film formed by sputtering or the like contains a large amount of moisture or hydrogen (including a hydroxyl group) as an impurity in some cases. Moisture or hydrogen easily forms a donor level and thus serves as an impurity in the oxide semiconductor. In one embodiment of the present invention, in order to reduce an impurity such as moisture or hydrogen in the oxide semiconductor film (dehydration or dehydrogenation), the island-shaped oxide semiconductor film 704 is subjected to heat treatment in a reduced-pressure atmosphere, an inert gas atmosphere of nitrogen, a rare gas, or the like, an oxygen gas atmosphere, or an ultra dry air atmosphere (the moisture amount is 20 ppm (−55° C. by conversion into a dew point) or less, preferably 1 ppm or less, more preferably 10 ppb or less, in the case where the measurement is performed by a dew point meter in a cavity ring down laser spectroscopy (CRDS) method).

By performing the heat treatment on the island-shaped oxide semiconductor film 704, moisture or hydrogen in the island-shaped oxide semiconductor film 704 can be eliminated. Specifically, heat treatment may be performed at a temperature higher than or equal to 250° C. and lower than or equal to 750° C., preferably higher than or equal to 400° C. and lower than the strain point of a substrate. For example, heat treatment may be performed at 500° C. for approximately more than or equal to 3 minutes and less than or equal to 6 minutes. When an RTA method is used for the heat treatment, dehydration or dehydrogenation can be performed in a short time; therefore, treatment can be performed even at a temperature higher than the strain point of a glass substrate.

In this embodiment, an electrical furnace that is one of heat treatment apparatuses is used.

Note that a heat treatment apparatus is not limited to an electrical furnace, and may include a device for heating an object by heat conduction or heat radiation from a heating element such as a resistance heating element. For example, an RTA (rapid thermal anneal) apparatus such as a GRTA (gas rapid thermal anneal) apparatus or an LRTA (lamp rapid thermal anneal) apparatus can be used. An LRTA apparatus is an apparatus for heating an object by radiation of light (an electromagnetic wave) emitted from a lamp such as a halogen lamp, a metal halide lamp, a xenon arc lamp, a carbon arc lamp, a high pressure sodium lamp, or a high pressure mercury lamp. A GRTA apparatus is an apparatus for heat treatment using a high-temperature gas. As the gas, an inert gas which does not react with an object by heat treatment, such as nitrogen or a rare gas such as argon is used.

Note that it is preferable that in the heat treatment, moisture, hydrogen, or the like be not contained in nitrogen or a rare gas such as helium, neon, or argon. It is preferable that the purity of nitrogen or the rare gas such as helium, neon, or argon which is introduced into a heat treatment apparatus be set to be 6N (99.9999%) or higher, preferably 7N (99.99999%) or higher (that is, the impurity concentration is 1 ppm or lower, preferably 0.1 ppm or lower).

Through the above-described process, the concentration of hydrogen in the island-shaped oxide semiconductor film 704 can be reduced and the island-shaped oxide semiconductor film 704 can be highly purified. Thus, the oxide semiconductor film can be stabilized. In addition, the heat treatment at a temperature of lower than or equal to the glass transition temperature makes it possible to form an oxide semiconductor film with a wide band gap and a low carrier density due to hydrogen. Therefore, the transistor can be manufactured using a large substrate, so that the productivity can be increased. The above heat treatment can be performed at any time after the oxide semiconductor film is formed.

Note that in the case where the oxide semiconductor film is heated, although depending on a material of the oxide semiconductor film or heating conditions, plate-shaped crystals are formed in the surface of the oxide semiconductor film in some cases. The plate-shaped crystal is preferably a single crystal which is c-axis-aligned in a direction perpendicular to the surface of the oxide semiconductor film. Note that when a surface of the gate insulating film 703 in contact with the oxide semiconductor film is uneven, a plate-shaped crystal is a polycrystal. Therefore, the surface of the gate insulating film 703 is preferably as even as possible.

Figure 21C:
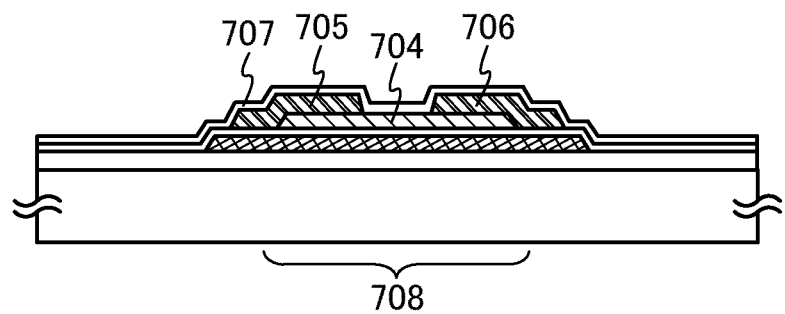

Next, as illustrated in FIG. 21C, the conductive film 705 and the conductive film 706 functioning as a source electrode and a drain electrode are formed, and an insulating film 707 is formed over the conductive film 705, the conductive film 706, and the island-shaped oxide semiconductor film 704.

The conductive film 705 and the conductive film 706 can be formed in the following manner: a conductive film is formed so as to cover the island-shaped oxide semiconductor film 704 by a sputtering method or a vacuum evaporation method, and then the conductive film is patterned by etching or the like.

The conductive film 705 and the conductive film 706 are in contact with the island-shaped oxide semiconductor film 704. As a material of the conductive film for forming the conductive film 705 and the conductive film 706, any of the following materials can be used: an element selected from aluminum, chromium, copper, tantalum, titanium, molybdenum, or tungsten; an alloy including any of these elements; an alloy film including the above elements in combination; or the like. A structure may be employed in which a film of a refractory metal such as chromium, tantalum, titanium, molybdenum, or tungsten is stacked over or below a metal film of aluminum or copper. Aluminum or copper is preferably combined with a refractory metal material in order to prevent a heat resistance problem and a corrosion problem. As the refractory metal material, molybdenum, titanium, chromium, tantalum, tungsten, neodymium, scandium, yttrium, or the like can be used.

Further, the conductive film may have a single-layer structure or a stacked-layer structure of two or more layers. For example, a single-layer structure of an aluminum film containing silicon; a two-layer structure in which a titanium film is stacked over an aluminum film; a three-layer structure in which a titanium film, an aluminum film, and a titanium film are stacked in this order; and the like can be given.

For the conductive film for forming the conductive film 705 and the conductive film 706, a conductive metal oxide may be used. As the conductive metal oxide, indium oxide, tin oxide, zinc oxide, an alloy of indium oxide and tin oxide, an alloy of indium oxide and zinc oxide, or the metal oxide material containing silicon or silicon oxide can be used.

In the case where heat treatment is performed after formation of the conductive film, the conductive film preferably has heat resistance enough to withstand the heat treatment.

Note that the material and etching conditions are adjusted as appropriate so that the island-shaped oxide semiconductor film 704 is not removed as much as possible in the etching of the conductive film. Depending on the etching conditions, there are some cases in which an exposed portion of the island-shaped oxide semiconductor film 704 is partly etched and thereby a groove (a depression portion) is formed.

In this embodiment, a titanium film is used for the conductive film. Therefore, wet etching can be selectively performed on the conductive film using a solution (an ammonia hydrogen peroxide mixture) containing ammonia and hydrogen peroxide water; however, the island-shaped oxide semiconductor film 704 is partly etched in some cases. As the solution containing the ammonia hydrogen peroxide mixture, specifically, an aqueous solution in which hydrogen peroxide water, pure water, and ammonium hydroxide are mixed at a volume ratio of 2:1:1 is used. Alternatively, dry etching may be performed on the conductive film with the use of a gas containing chlorine ($Cl_2$), boron chloride ($BCl_3$), or the like.

In order to reduce the number of photomasks and steps in a photolithography step, etching may be performed with the use of a resist mask formed using a multi-tone mask through which light is transmitted so as to have a plurality of intensities. A resist mask formed with the use of a multi-tone mask has a plurality of thicknesses and further can be changed in shape by etching; therefore, the resist mask can be used in a plurality of etching steps for processing into different patterns. Therefore, a resist mask corresponding to at least two kinds or more of different patterns can be formed by one multi-tone mask. Thus, the number of light-exposure masks can be reduced and the number of corresponding photolithography steps can be also reduced, whereby simplification of a manufacturing process can be realized.

Note that before formation of the insulating film 707, the island-shaped oxide semiconductor film 704 is subjected to plasma treatment with the use of a gas such as $N_2O$, $N_2$, or Ar. By the plasma treatment, adsorbed water or the like attached to an exposed surface of the island-shaped oxide semiconductor film 704 is removed. Plasma treatment may be performed using a mixture gas of oxygen and argon as well.

The insulating film 707 does not preferably contain an impurity such as moisture or hydrogen as much as possible. An insulating film of a single layer or a plurality of insulating films stacked may be employed for the insulating film 707. When hydrogen is contained in the insulating film 707, the hydrogen enters the oxide semiconductor film or oxygen in the oxide semiconductor film is extracted by the hydrogen, whereby a back channel portion of the island-shaped oxide semiconductor film 704 has lower resistance (n-type conductivity); thus, a parasitic channel might be formed. Therefore, it is important that a film formation method in which hydrogen is not used be employed so that the insulating film 707 does not contain hydrogen as much as possible. A material having a high barrier property is preferably used for the insulating film 707. For example, a silicon nitride film, a silicon nitride oxide film, an aluminum nitride film, an aluminum nitride oxide film, an aluminum oxide film, a gallium oxide film, or the like can be used as the insulating film having a high barrier property. With the use of the insulating film having a high barrier property, an impurity such as moisture or hydrogen can be prevented from entering the island-shaped oxide semiconductor film 704, the gate insulating film 703, or the interface between the island-shaped oxide semiconductor film 704 and another insulating film and the vicinity thereof.

In this embodiment, for example, the insulating film 707 having a structure in which an aluminum oxide film with a thickness of 100 nm formed by a sputtering method is stacked over a gallium oxide film with a thickness of 200 nm formed by a sputtering method is formed. The substrate temperature in film formation may be set to higher than or equal to room temperature and lower than or equal to 300° C. and in this embodiment, is 100° C. Further, the insulating film 707 preferably contains much oxygen that exceeds the stoichiometric composition, preferably at a proportion greater than 1 time and less than twice of the stoichiometric composition. When the insulating film 707 thus contains excessive oxygen, oxygen is supplied to the interface with the island-shaped oxide semiconductor film 704; thus, oxygen deficiency can be reduced.

After the insulating film 707 is formed, heat treatment may be performed. The heat treatment is performed under an atmosphere of nitrogen, ultra-dry air, or a rare gas (argon, helium, or the like) preferably at a temperature of higher than or equal to 200° C. and lower than or equal to 400° C., for example, higher than or equal to 250° C. and lower than or equal to 350° C. It is desirable that the content of water in the gas be 20 ppm or less, preferably 1 ppm or less, and more preferably 10 ppb or less. In this embodiment, for example, heat treatment at 250° C. under a nitrogen atmosphere for 1 hour is performed. Alternatively, RTA treatment for a short time at a high temperature may be performed before the formation of the conductive film 705 and the conductive film 706 in a manner similar to that of the previous heat treatment performed on the oxide semiconductor film for reduction of moisture or hydrogen. Even when oxygen deficiency is generated in the island-shaped oxide semiconductor film 704 by the previous heat treatment, by performing heat treatment after the insulating film 707 containing oxygen is provided, oxygen is supplied to the island-shaped oxide semiconductor film 704 from the insulating film 707. By supplying oxygen to the island-shaped oxide semiconductor film 704, oxygen deficiency that serves as a donor is reduced in the island-shaped oxide semiconductor film 704 and the stoichiometric composition can be satisfied. The island-shaped oxide semiconductor film 704 preferably contains oxygen whose composition exceeds the stoichiometric composition. As a result, the island-shaped oxide semiconductor film 704 can be made to be substantially i-type and variation in electric characteristics of the transistor due to oxygen deficiency can be reduced; thus, electric characteristics can be improved. The timing of this heat treatment is not particularly limited as long as it is after the formation of the insulating film 707. When this heat treatment doubles as another step such as heat treatment for formation of a resin film or heat treatment for reduction of the resistance of a light-transmitting conductive film, the island-shaped oxide semiconductor film 704 can be made to be substantially i-type without an increase in the number of manufacturing steps.

Moreover, the oxygen deficiency that serves as a donor in the island-shaped oxide semiconductor film 704 may be reduced by subjecting the island-shaped oxide semiconductor film 704 to heat treatment in an oxygen atmosphere so that oxygen is added to the oxide semiconductor. The heat treatment is performed at a temperature of, for example, higher than or equal to 100° C. and lower than 350° C., preferably higher than or equal to 150° C. and lower than 250° C. It is preferable that an oxygen gas used for the heat treatment under an oxygen atmosphere do not contain water, hydrogen, or the like. Alternatively, the purity of the oxygen gas which is introduced into the heat treatment apparatus is preferably greater than or equal to 6N (99.9999%) or more preferably greater than or equal to 7N (99.99999%) (that is, the impurity concentration in the oxygen is less than or equal to 1 ppm, or preferably less than or equal to 0.1 ppm).

Alternatively, oxygen may be added to the island-shaped oxide semiconductor film 704 by an ion implantation method or an ion doping method to reduce oxygen deficiency serving as a donor. For example, oxygen which is made into a plasma state by a microwave at 2.45 GHz may be added to the island-shaped oxide semiconductor film 704.

Note that a back gate electrode may be formed in a position overlapping with the island-shaped oxide semiconductor film 704 by forming a conductive film over the insulating film 707 and then patterning the conductive film. In the case where the back gate electrode is formed, an insulating film is preferably formed so as to cover the back gate electrode. The back gate electrode can be formed using a material and a structure similar to those of the gate electrode 702 or the conductive films 705 and 706.

The thickness of the back gate electrode is 10 nm to 400 nm, preferably 100 nm to 200 nm. For example, the back gate electrode may be formed in a such a manner that a conductive film in which a titanium film, an aluminum film, and a titanium film are stacked is formed, a resist mask is formed by a photolithography method or the like, and an unnecessary portion of the conductive film is removed by etching so that the conductive film is processed (patterned) into a desired shape. The back gate electrode also functions as a light-blocking film, whereby photodegradation of the transistor such as negative-bias stress photodegradation can be reduced and the reliability can be increased.

Through the above-described process, the transistor 708 is formed.

The transistor 708 includes the gate electrode 702, the gate insulating film 703 over the gate electrode 702, the island-shaped oxide semiconductor film 704 which is over the gate insulating film 703 and overlaps with the gate electrode 702, and a pair of the conductive film 705 and the conductive film 706 formed over the island-shaped oxide semiconductor film 704. Further, the transistor 708 may include the insulating film 707 as its constituent. The transistor 708 illustrated in FIG. 21C has a channel-etched structure in which part of the island-shaped oxide semiconductor film 704 between the conductive film 705 and the conductive film 706 is etched.

Although the transistor 708 is described as a single-gate transistor, a multi-gate transistor including a plurality of channel formation regions can also be manufactured as needed. The multi-gate transistor includes a plurality of the gate electrodes 702 electrically connected to each other.

This embodiment can be implemented in combination with another embodiment as appropriate.

(Embodiment 4)

In this embodiment, structural examples of a transistor will be described. Note that the same portions as those in the above embodiments, portions having functions similar to those in the above embodiments, the same steps as those in the above embodiments, and steps similar to those in the above embodiments may be described as in the above embodiments, and repeated description thereof is omitted in this embodiment. Further, a specific description for the same portions is omitted.

Figure 22A:
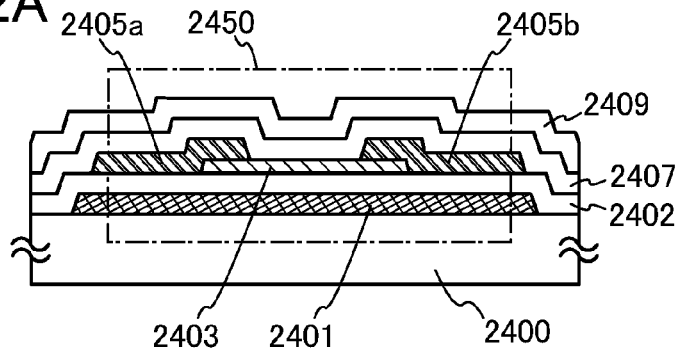
FIGS. 22A to 22D are each a cross-sectional view illustrating a transistor.

A transistor 2450 illustrated in FIG. 22A includes a gate electrode 2401 over a substrate 2400, a gate insulating film 2402 over the gate electrode 2401, an oxide semiconductor film 2403 over the gate insulating film 2402, and a source electrode 2405*a* and a drain electrode 2405*b* over the oxide semiconductor film 2403. An insulating film 2407 is formed over the oxide semiconductor film 2403, the source electrode 2405*a*, and the drain electrode 2405*b*. A protective insulating film 2409 may be formed over the insulating film 2407. The transistor 2450 is a bottom-gate transistor and is also an inverted staggered transistor.

Figure 22B:
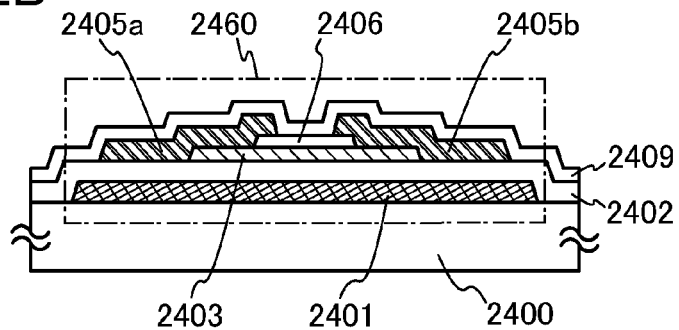

A transistor 2460 illustrated in FIG. 22B includes a gate electrode 2401 over the substrate 2400, the gate insulating film 2402 over the gate electrode 2401, the oxide semiconductor film 2403 over the gate insulating film 2402, a channel protective layer 2406 over the oxide semiconductor film 2403, and the source electrode 2405*a* and the drain electrode 2405*b* over the channel protective layer 2406 and the oxide semiconductor film 2403. The protective insulating film 2409 may be formed over the source electrode 2405*a* and the drain electrode 2405*b*. The transistor 2460 is a bottom-gate transistor called a channel-protective type (also referred to as a channel-stop type) transistor and is also an inverted staggered transistor. The channel protective layer 2406 can be formed using a material and a method similar to those of any other insulating film.

Figure 22C:
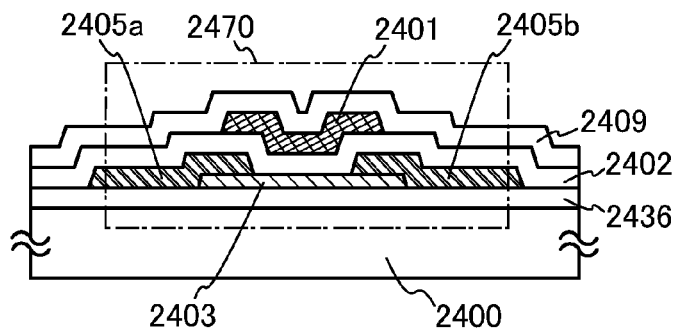

A transistor 2470 illustrated in FIG. 22C includes a base film 2436 over the substrate 2400, the oxide semiconductor film 2403 over the base film 2436, the source electrode 2405*a* and the drain electrode 2405*b* over the oxide semiconductor film 2403 and the base film 2436, the gate insulating film 2402 over the oxide semiconductor film 2403, the source electrode 2405*a*, and the drain electrode 2405*b*, and the gate electrode 2401 over the gate insulating film 2402. The protective insulating film 2409 may be formed over the gate electrode 2401. The transistor 2470 is a top-gate transistor.

Figure 22D:
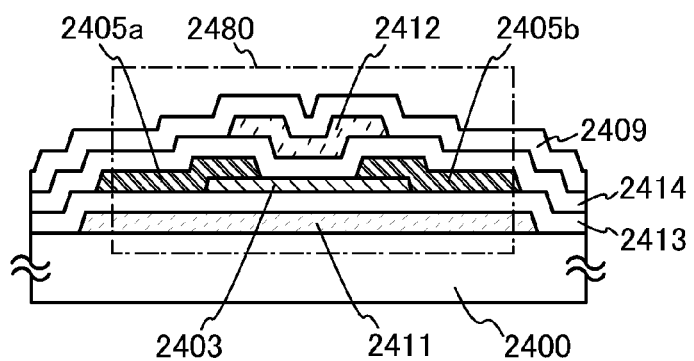

A transistor 2480 illustrated in FIG. 22D includes a first gate electrode 2411 over the substrate 2400, a first gate insulating film 2413 over the first gate electrode 2411, the oxide semiconductor film 2403 over the first gate insulating film 2413, and the source electrode 2405*a* and the drain electrode 2405*b* over the oxide semiconductor film 2403 and the first gate insulating film 2413. A second gate insulating film 2414 is formed over the oxide semiconductor film 2403, the source electrode 2405*a*, and the drain electrode 2405*b*, and a second gate electrode 2412 is formed over the second gate insulating film 2414. The protective insulating film 2409 may be formed over the second gate electrode 2412.

The transistor 2480 has a structure combining the transistor 2450 and the transistor 2470. The first gate electrode 2411 and the second gate electrode 2412 can be electrically connected to each other, so that they function as one gate electrode. Either the first gate electrode 2411 or the second gate electrode 2412 may be simply referred to as a gate electrode and the other may be referred to as a back gate electrode.

By changing a potential of the back gate electrode, the threshold voltage of the transistor can be changed. The back gate electrode is formed so as to overlap with a channel formation region in the oxide semiconductor film 2403. Further, the back gate electrode may be electrically insulated and in a floating state, or may be in a state where the back gate electrode is supplied with a potential. In the latter case, the back gate electrode may be supplied with a potential at the same level as that of the gate electrode, or may be supplied with a fixed potential such as a ground potential. The level of the potential applied to the back gate electrode is controlled, so that the threshold voltage of the transistor 2480 can be controlled.

When the oxide semiconductor film 2403 is completely covered with the back gate electrode, light from the back gate electrode side can be prevented from entering the oxide semiconductor film 2403. Therefore, photodegradation of the oxide semiconductor film 2403 can be prevented and deterioration in characteristics of the transistor, such as a shift of the threshold voltage, can be prevented.

An insulating film in contact with the oxide semiconductor film 2403 (in this embodiment, corresponding to the gate insulating film 2402, the insulating film 2407, the channel protective layer 2406, the base film 2436, the first gate insulating film 2413, and the second gate insulating film 2414) is preferably formed of an insulating material containing a Group 13 element and oxygen. Many oxide semiconductor materials contain a Group 13 element, and an insulating material containing a Group 13 element works well with an oxide semiconductor. By using such an insulating material containing a Group 13 element for the insulating film in contact with the oxide semiconductor film, an interface with the oxide semiconductor film can keep a favorable state.

An insulating material containing a Group 13 element means an insulating material containing one or more Group 13 elements. As the insulating material containing a Group 13 element, gallium oxide, aluminum oxide, aluminum gallium oxide, and gallium aluminum oxide can be given, for example. Here, the amount of aluminum is larger than that of gallium in atomic percent in aluminum gallium oxide, whereas the amount of gallium is larger than that of aluminum in atomic percent in gallium aluminum oxide.

For example, in the case of forming an insulating film in contact with an oxide semiconductor film containing gallium, a material containing gallium oxide may be used for the insulating film, so that favorable characteristics can be kept at the interface between the oxide semiconductor film and the insulating film. When the oxide semiconductor film and the insulating film containing gallium oxide are provided in contact with each other, pileup of hydrogen at the interface between the oxide semiconductor film and the insulating film can be reduced, for example. Note that a similar effect can be obtained in the case where an element in the same group as a constituent element of the oxide semiconductor film is used in an insulating film. For example, it is effective to form an insulating film with the use of a material containing aluminum oxide. Note that aluminum oxide has a property of not easily transmitting water. Thus, it is preferable to use a material containing aluminum oxide in terms of preventing entry of water to the oxide semiconductor film.

The insulating film in contact with the oxide semiconductor film 2403 preferably contains oxygen in a proportion higher than that in the stoichiometric composition, by heat treatment in an oxygen atmosphere or oxygen doping. Oxygen doping means addition of oxygen into a bulk. Note that the term "bulk" is used in order to clarify that oxygen is added not only to a surface of a thin film but also to the inside of the thin film. In addition, "oxygen doping" includes "oxygen plasma doping" in which oxygen which is made to be plasma is added to a bulk. The oxygen doping may be performed using an ion implantation method or an ion doping method.

For example, in the case where the insulating film in contact with the oxide semiconductor film 2403 is formed of gallium oxide, the composition of gallium oxide can be set to be $Ga_2O_x$ ($x=3+\alpha$, $0<\alpha<1$) by heat treatment in an oxygen atmosphere or oxygen doping.

In the case where the insulating film in contact with the oxide semiconductor film 2403 is formed of aluminum oxide, the composition of aluminum oxide can be set to be $Al_2O_x$ ($x=3+\alpha$, $0<\alpha<1$) by heat treatment in an oxygen atmosphere or oxygen doping.

In the case where the insulating film in contact with the oxide semiconductor film 2403 is formed of gallium aluminum oxide (or aluminum gallium oxide), the composition of gallium aluminum oxide (or aluminum gallium oxide) can be set to be $Ga_xAl_{2-x}O_{3+\alpha}$ ($0<x<2$, $0<\alpha<1$) by heat treatment in an oxygen atmosphere or oxygen doping.

By oxygen doping, an insulating film including a region where the proportion of oxygen is higher than that in the stoichiometric composition can be formed. When the insulating film including such a region is in contact with the oxide semiconductor film, oxygen that exists excessively in the insulating film is supplied to the oxide semiconductor film, and oxygen deficiency in the oxide semiconductor film or at an interface between the oxide semiconductor film and the insulating film is reduced. Thus, the oxide semiconductor film can be formed to an i-type or substantially i-type oxide semiconductor.

The insulating film including a region where the proportion of oxygen is higher than that in the stoichiometric composition may be applied to either the insulating film placed on the upper side of the oxide semiconductor film or the insulating film placed on the lower side of the oxide semiconductor film of the insulating films in contact with the oxide semiconductor film 2403; however, it is preferable to apply such an insulating film to both of the insulating films in contact with the oxide semiconductor film 2403. The above-described effect can be enhanced with a structure where the oxide semiconductor film 2403 is sandwiched between the insulating films each including a region where the proportion of oxygen is higher than that in the stoichiometric composition, which are used as the insulating films in contact with the oxide semiconductor film 2403 and placed on the upper side and the lower side of the oxide semiconductor film 2403.

The insulating films on the upper side and the lower side of the oxide semiconductor film 2403 may contain the same constituent element or different constituent elements. For example, the insulating films on the upper side and the lower side may be both formed using gallium oxide whose composition is $Ga_2O_x$ ($x=3+\alpha$, $0<\alpha<1$). Alternatively, one of the insulating films on the upper side and the lower side may be formed using gallium oxide whose composition is $Ga_2O_x$ ($x=3+\alpha$, $0<\alpha<1$) and the other may be formed using aluminum oxide whose composition is $Al_2O_x$ ($x=3+\alpha$, $0<\alpha<1$).

The insulating film in contact with the oxide semiconductor film 2403 may be formed by stacking insulating films including a region where the proportion of oxygen is higher than that in the stoichiometric composition. For example, the insulating film on the upper side of the oxide semiconductor film 2403 may be formed as follows: gallium oxide whose composition is $Ga_2O_x$ ($x=3+\alpha$, $0<\alpha<1$) is formed and gallium aluminum oxide (or aluminum gallium oxide) whose composition is $Ga_xAl_{2-x}O_{3+\alpha}$ ($0<x<2$, $0<\alpha<1$) may be formed thereover. Note that the insulating film on the lower side of the oxide semiconductor film 2403 may be formed by stacking insulating films each including a region where the proportion of oxygen is higher than that in the stoichiometric composition. Further, both of the insulating films on the upper side and the lower side of the oxide semiconductor film 2403 may be formed by stacking insulating films each including a region where the proportion of oxygen is higher than that in the stoichiometric composition.

This embodiment can be implemented in combination with another embodiment as appropriate.

(Embodiment 5)

In this embodiment, an example of a substrate used in a liquid crystal display device according to one embodiment of the present invention will be described with reference to FIGS. 23A, 23B, 23C1, 23C2, 23D1, 23D2, 23E1, and 23E2.

Figure 23A:

A layer 6116 to be separated is formed over a substrate 6200 with a separation layer 6201 provided therebetween (see FIG. 23A).

The substrate 6200 may be a quartz substrate, a sapphire substrate, a ceramic substrate, a glass substrate, a metal substrate, or the like. Note that such a substrate which is thick enough not to be definitely flexible enables precise formation of an element such as a transistor. The degree "not to be definitely flexible" means that the elastic modulus of the substrate is higher than or equivalent to that of a glass substrate used in generally fabricating a liquid crystal display.

The separation layer 6201 is formed with a single layer or stacked layers using any of elements selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), iridium (Ir), and silicon (Si), an alloy material containing any of the above elements as its main component, and a compound material containing any of the above elements as its main component by a sputtering method, a plasma CVD method, an application method, a printing method, or the like.

In the case where the separation layer 6201 has a single-layer structure, a tungsten layer, a molybdenum layer, or a layer containing a mixture of tungsten and molybdenum is preferably formed. Alternatively, a layer containing an oxide or an oxynitride of tungsten, a layer containing an oxide or an oxynitride of molybdenum, or a layer containing an oxide or an oxynitride of a mixture of tungsten and molybdenum is formed. Note that the mixture of tungsten and molybdenum corresponds to an alloy of tungsten and molybdenum, for example.

In the case where the separation layer 6201 has a layered structure, it is preferable that a metal layer and a metal oxide layer be formed as a first layer and a second layer, respectively. Typically, it is preferable to form a tungsten layer, a molybdenum layer, or a layer containing a mixture of tungsten and molybdenum as the first layer and to form an oxide, a nitride, an oxynitride, or a nitride oxide of tungsten, molybdenum, or a mixture of tungsten and molybdenum as the second layer. As formation of the metal oxide layer as the second layer, an oxide layer (such as a silicon oxide layer which can be utilized as an insulating layer) may be formed over the metal layer which is the first layer so that an oxide of the metal is formed on a surface of the metal layer.

The layer 6116 to be separated includes components necessary for an element substrate, such as a transistor, an interlayer insulating film, a wiring, and a pixel electrode, and further, depending on a case, a counter electrode, a light-blocking film, an alignment film, or the like. Such components can be normally formed over the separation layer 6201. Materials, manufacturing methods, and structures of these components are similar to those described in any of the above embodiments, and repeated description thereof is omitted in this embodiment. Thus, the transistor and the electrode can be formed precisely using a known material and a known method.

Figure 23B:
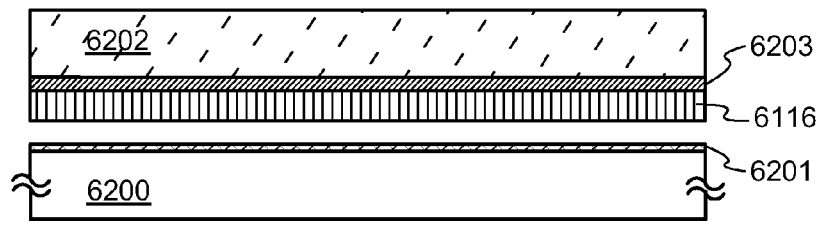
Figure 23B:
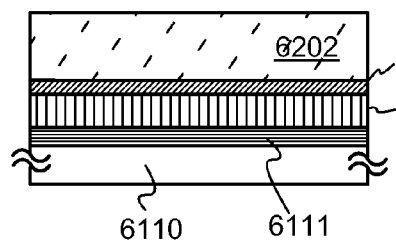
Figure 23B:
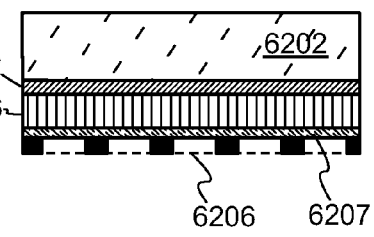
Figure 23B:
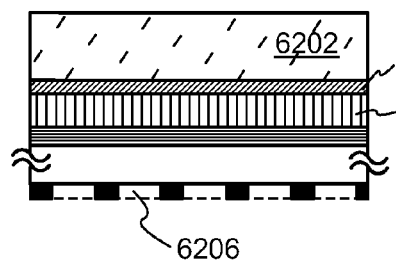
Figure 23B:
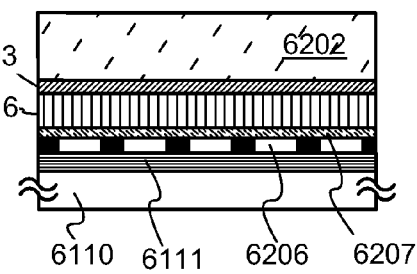
Figure 23B:
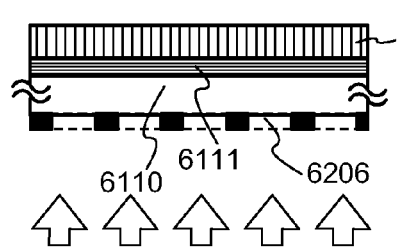
Figure 23B:
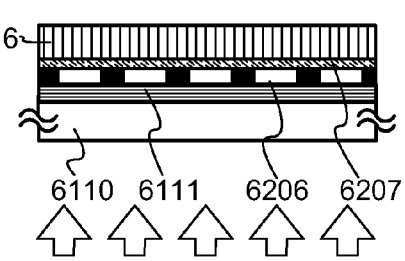

Next, the layer 6116 to be separated is bonded to a temporary supporting substrate 6202 with the use of an adhesive 6203 for separation and then, the layer 6116 to be separated is separated from the separation layer 6201 over the substrate 6200 to be transferred (see FIG. 23B). In this manner, the layer 6116 to be separated is placed on the temporary supporting substrate side. Note that in this specification, a process for transferring the layer to be separated from the substrate to the temporary supporting substrate is referred to as a transfer process.

As the temporary supporting substrate 6202, a glass substrate, a quartz substrate, a sapphire substrate, a ceramic substrate, a metal substrate, or the like can be used. Alternatively, a plastic substrate which can withstand the temperature of the following process may be used.

As the adhesive 6203 for separation which is used here, an adhesive which is soluble in water or a solvent, an adhesive which is capable of being plasticized upon irradiation of UV light, or the like is used so that the temporary supporting substrate 6202 and the layer 6116 to be separated can be separated when necessary.

Any of various methods can be used as appropriate in the process for transferring the layer 6116 to be separated to the temporary supporting substrate 6202. For example, when a film including a metal oxide film is formed as the separation layer 6201 so as to be in contact with the layer 6116 to be separated, the metal oxide film is embrittled by crystallization, whereby the layer 6116 to be separated can be separated from the substrate 6200. When an amorphous silicon film containing hydrogen is formed as the separation layer 6201 between the substrate 6200 and the layer 6116 to be separated, the amorphous silicon film containing hydrogen is removed by laser light irradiation or etching, so that the layer 6116 to be separated can be separated from the substrate 6200. In the case where a film containing nitrogen, oxygen, hydrogen, or the like (for example, an amorphous silicon film containing hydrogen, an alloy film containing hydrogen, an alloy film containing oxygen, or the like) is used as the separation layer 6201, the separation layer 6201 can be irradiated with laser light to release the nitrogen, oxygen, or hydrogen contained in the separation layer 6201 as a gas, so that separation between the layer 6116 to be separated and the substrate 6200 can be promoted. Alternatively, a liquid may be made to penetrate the interface between the separation layer 6201 and the layer 6116 to be separated to cause separation of the layer 6116 to be separated from the substrate 6200. Still alternatively, when the separation layer 6201 is formed using tungsten, the separation may be performed while the separation layer 6201 is etched with the use of a mixed solution of ammonia water and a hydrogen peroxide solution.

Further, the transfer process can be facilitated by using plural kinds of separation methods described above in combination. That is, the separation can be performed with a physical force (by a machine or the like) after performing laser light irradiation on part of the separation layer, etching on part of the separation layer with a gas, a solution, or the like, or mechanical removal of part of the separation layer with a sharp knife, a scalpel, or the like, in order that the separation layer and the layer to be separated can be easily separated from each other. In the case where the separation layer 6201 is formed to have a layered structure of a metal and a metal oxide, the layer to be separated can be physically separated easily from the separation layer by using a groove formed by laser light irradiation or a scratch made by a sharp knife, a scalpel, or the like as a trigger.

Alternatively, the separation may be performed while a liquid such as water is poured.

As a method for separating the layer 6116 to be separated from the substrate 6200, a method may alternatively be employed in which the substrate 6200 over which the layer 6116 to be separated is formed is removed by mechanical polishing or by etching using a solution or a halogen fluoride gas such as $NF_3$, $BrF_3$, or $ClF_3$, or the like. In that case, the separation layer 6201 is not necessarily provided.

Next, a surface of the layer 6116 to be separated or the separation layer 6201 exposed by separation of the layer 6116 to be separated from the substrate 6200 is bonded to a transfer substrate 6110 with the use of a first adhesive layer 6111 including an adhesive different from the adhesive 6203 for separation (see FIG. 23C1).

As a material of the first adhesive layer 6111, any of various curable adhesives, e.g., a light curable adhesive such as a UV curable adhesive, a reactive curable adhesive, a thermal curable adhesive, and an anaerobic adhesive, can be used.

As the transfer substrate 6110, any of various substrates with high toughness, such as an organic resin film and a metal substrate, can be favorably used. Substrates with high toughness have high impact resistance and thus are less likely to be damaged. In the case of using an organic resin film and a thin metal substrate, which are lightweight, the weight can be significantly lower than in the case of using a general glass substrate. With the use of such a substrate, it is possible to fabricate a lightweight liquid crystal display device which is not easily damaged.

In the case of a transmissive or transflective liquid crystal display device, a substrate which has high toughness and transmits visible light may be used as the transfer substrate 6110. As a material of such a substrate, for example, polyester resins such as polyethylene terephthalate (PET) and polyethylene naphthalate (PEN), an acrylic resin, a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, and a polyvinylchloride resin can be given. A substrate made of such an organic resin has high toughness and thus has high impact resistance and is less likely to be damaged. Further, a film of such an organic resin, which is lightweight, enables significant reduction in weight of a display device unlike a general glass substrate. In that case, the transfer substrate 6110 is preferably further provided with a metal plate 6206 having an opening at least in a portion overlapping with a region where light of each pixel is transmitted. With the above structure, the transfer substrate 6110 which has high toughness and high impact resistance and is less likely to be damaged can be formed while a change in dimension is suppressed. Further, when the thickness of the metal plate 6206 is reduced, the transfer substrate 6110 which is lighter than a general glass substrate can be formed. With the use of such a substrate, it is possible to fabricate a lightweight liquid crystal display device which is not easily damaged (see FIG. 23D1).

After that, the temporary supporting substrate 6202 is separated from the layer 6116 to be separated. Since the adhesive 6203 for separation includes a material capable of separating the temporary supporting substrate 6202 and the layer 6116 to be separated from each other when necessary, the temporary supporting substrate 6202 may be separated by a method suitable for the material. Note that light is emitted from the backlight as shown by arrows in the drawing (see FIG. 23E1).

Thus, the layer 6116 to be separated, which includes components such as the transistor and the pixel electrode (a counter electrode, a light-blocking film, an alignment film, or the like may also be provided as necessary), can be formed over the transfer substrate 6110, whereby a lightweight element substrate with high impact resistance can be formed.

Modification Example

The liquid crystal display device having the above structure is one embodiment of the present invention, and the present invention also includes a liquid crystal display device having a structure different from that of the above liquid crystal display device. After the above transfer process (FIG. 23B), the metal plate 6206 may be attached to an exposed surface of the separation layer 6201 or the layer 6116 to be separated before attachment of the transfer substrate 6110 (see FIG. 23C2). In that case, a barrier layer 6207 is preferably provided between the metal plate 6206 and the layer 6116 to be separated so that a contaminant from the metal plate 6206 can be prevented from adversely affecting characteristics of the transistor in the layer 6116 to be separated. In the case of providing the barrier layer 6207, the barrier layer 6207 may be provided over the exposed surface of the separation layer 6201 or the layer 6116 to be separated before attachment of the metal plate 6206. The barrier layer 6207 may be formed using an inorganic material, an organic material, or the like; typically, a silicon nitride and the like can be used. A material of the barrier layer is not limited to the above as long as contamination of the transistor can be prevented. The barrier layer is formed using a light-transmitting material or formed to a thickness small enough to transmit light so that the barrier layer can transmit at least visible light. Note that the metal plate 6206 may be bonded with the use of a second adhesive layer (not shown) including an adhesive different from the adhesive 6203 for separation.

After that, the first adhesive layer 6111 is formed over a surface of the metal plate 6206 and the transfer substrate 6110 is attached to the first adhesive layer 6111 (FIG. 23D2) and the temporary supporting substrate 6202 is separated from the layer 6116 to be separated (FIG. 23E2), whereby a lightweight element substrate with high impact resistance can be formed. Note that light is emitted from the backlight as shown by arrows in the drawing.

The lightweight element substrate with high impact resistance formed as described above is firmly attached to a counter substrate with the use of a sealant with a liquid crystal layer provided between the substrates, whereby a lightweight liquid crystal display device with high impact resistance can be manufactured. As the counter substrate, a substrate which has high toughness and transmits visible light (similar to a plastic substrate which can be used as the transfer substrate 6110) can be used. Further, a polarizing plate, a light-blocking film, a counter electrode, or an alignment film may be provided as necessary. As a method for forming the liquid crystal layer, a dispenser method, an injection method, or the like can be employed as in a conventional case.

In the case of the lightweight liquid crystal display device with high impact resistance manufactured as described above, a fine element such as the transistor can be formed over a glass substrate or the like which has relatively high dimensional stability, and a conventional manufacturing method can be applied, so that even such a fine element can be formed precisely. Therefore, the lightweight liquid crystal display device with high impact resistance can display images with high precision and high quality.

Further, the liquid crystal display device manufactured as described above may be flexible.

This embodiment can be implemented in combination with another embodiment as appropriate.

(Embodiment 6)

Figure 24:
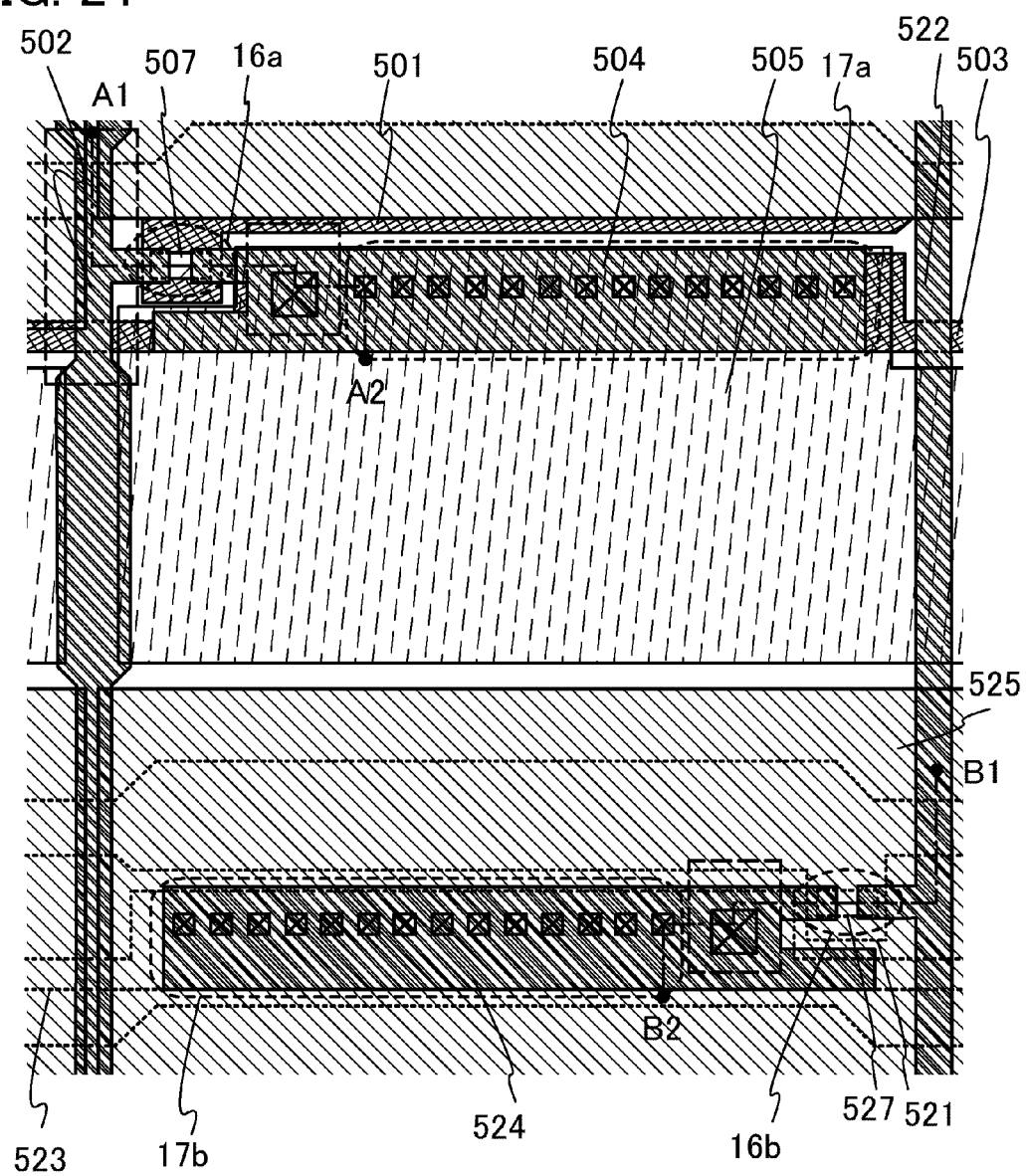
FIG. 24 is an example of a top view illustrating a pixel.

FIG. 24 illustrates an example of a top view of a pixel. A cross-sectional view along chain line A1-A2 in FIG. 24 is FIG. 25A. A cross-sectional view along chain line B1-B2 in FIG. 24 is FIG. 25B.

Note that description will be made using the same reference numerals for the same portions in FIG. 2B, FIG. 24, and FIGS. 25A and 25B. The pixel illustrated in FIG. 25A includes a conductive film 501 functioning as the scan line GLa, a conductive film 502 functioning as the signal line SLa, a conductive film 503 functioning as a wiring COM, and a conductive film 504 functioning as the second terminal of the first pixel transistor 16a. The conductive film 501 also functions as the gate electrode of the first pixel transistor 16a illustrated in FIG. 2B. In addition, the conductive film 502 also functions as the first terminal of the first pixel transistor 16a.

The conductive film 501 and the conductive film 503 can be formed by processing one conductive film formed over a substrate 500 having an insulating surface into a desired shape. A gate insulating film 506 is formed over the conductive film 501 and the conductive film 503. Further, the conductive film 502 and the conductive film 504 can be formed by processing one conductive film formed over the gate insulating film 506 into a desired shape.

Figure 25A:
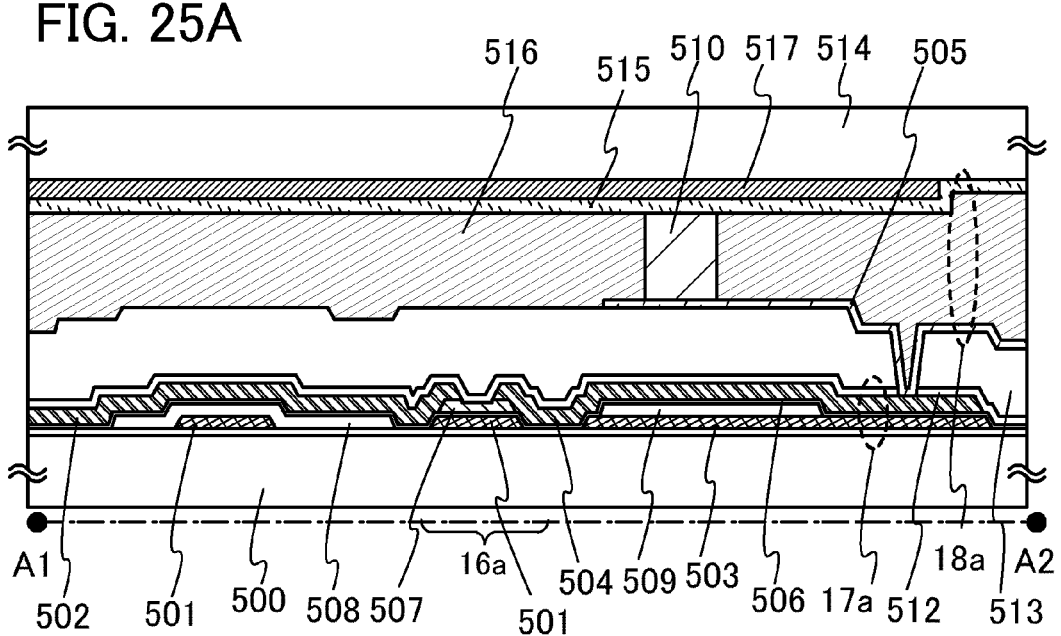
FIGS. 25A and 25B are each a cross-sectional view illustrating a pixel.

An active layer 507 of the first pixel transistor 16a is formed over the gate insulating film 506 so as to overlap with the conductive film 501. As illustrated in FIG. 25A, the active layer 507 preferably overlaps with the conductive film 501 functioning as the gate electrode. With such a structure, an oxide semiconductor in the active layer 507 can be prevented from deteriorating owing to incident light from the substrate 500 side; thus, deterioration of characteristics of the first pixel transistor 16a, such as a shift of the threshold voltage, can be prevented.

Further, in the pixel illustrated in FIG. 25A, an insulating film 512 and an insulating film 513 are sequentially formed so as to cover the active layer 507, the conductive film 502, and the conductive film 504. In addition, a pixel electrode 505 positioned in a transmissive region is formed over the insulating film 513, and the conductive film 504 is connected to the pixel electrode 505 through a contact hole formed in the insulating film 512 and the insulating film 513.

Note that a portion where the conductive film 503 functioning as the wiring COM overlaps with the conductive film 504 with the gate insulating film 506 provided therebetween functions as the first capacitor 17a.

In this embodiment, an insulating film 508 is formed between the conductive film 501 and the gate insulating film 506. The insulating film 508 is provided between the conductive film 501 and the conductive film 502; thus, parasitic capacitance generated between the conductive film 501 and the conductive film 502 can be suppressed to be lower by the insulating film 508.

In this embodiment, an insulating film 509 is formed between the conductive film 503 and the gate insulating film 506. In addition, a spacer 510 is formed over the pixel electrode 505 so as to overlap with the insulating film 509.

A counter electrode 515 is provided for a substrate 514, and a liquid crystal layer 516 containing a liquid crystal is provided between the pixel electrode 505 and the counter electrode 515. The first liquid crystal element 18a is formed in a portion where the pixel electrode 505, the counter electrode 515, and the liquid crystal layer 516 overlap with one another.

The pixel electrode 505 and the counter electrode 515 can be formed using a light-transmitting conductive material such as indium tin oxide containing silicon oxide (ITSO), indium tin oxide (ITO), zinc oxide (ZnO), indium zinc oxide (IZO), or zinc oxide to which gallium is added (GZO), for example.

Note that an alignment film may be provided as appropriate between the pixel electrode 505 and the liquid crystal layer 516 and/or between the counter electrode 515 and the liquid crystal layer 516. The alignment film can be formed using an organic resin such as polyimide or polyvinyl alcohol. Alignment treatment such as rubbing is performed on a surface of the alignment film in order to align liquid crystal molecules in a certain direction. Rubbing can be performed by rolling a roller wrapped with cloth of nylon or the like while being in contact with the alignment film such that the surface of the alignment film is rubbed in a certain direction. Note that it is also possible to form the alignment film having alignment characteristics with the use of an inorganic material such as silicon oxide by evaporation or the like, without alignment treatment.

Injection of a liquid crystal for forming the liquid crystal layer 516 may be performed by a dispenser method (dripping method) or a dipping method (pumping method).

Over the substrate 514, in order to prevent disclination due to disorder of the alignment of the liquid crystal between pixels from being perceived, or to prevent diffusing light from entering a plurality of adjacent pixels, a light-blocking film 517 capable of blocking light is provided. The light-blocking film 517 can be formed using an organic resin containing black colorant such as carbon black or titanium lower oxide whose oxidation number is smaller than the oxidation number of titanium dioxide. Alternatively, the light-blocking film 517 can be formed with a film formed using chromium.

By providing the light-blocking film 517 so as to overlap with the active layer 507 of the first pixel transistor 16a, the oxide semiconductor in the active layer 507 can be prevented from deteriorating owing to incident light from the substrate 514 side; thus, deterioration of characteristics of the first pixel transistor 16a, such as a shift of the threshold voltage, can be prevented. Alternatively, light may be blocked by arranging a reflective electrode of an adjacent pixel such that the reflective electrode overlaps with the active layer 507 of the first pixel transistor 16a. In that case, without an alignment margin in attachment of the substrate 514 and the substrate 500 and an increase in the number of manufacturing steps, light to the active layer can be blocked.

Figure 25B:
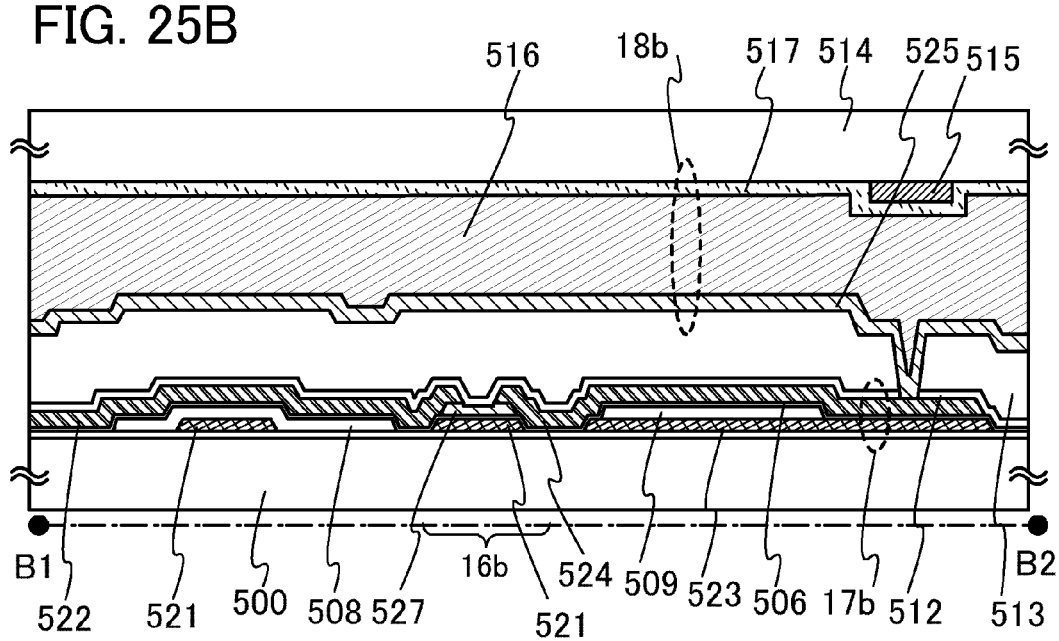

A liquid crystal display device having the pixel structure illustrated in FIG. 24 includes, in addition to the transmissive region illustrated in FIG. 25A, a reflective region illustrated in FIG. 25B where a reflective electrode 525 is arranged as a pixel electrode.

A surface of the insulating film 513 may be etched selectively so as to be uneven such that the reflective electrode 525 has an uneven surface. When the reflective electrode 525 has an uneven surface, incident light from the outside is irregularly reflected, so that more favorable display can be performed. Accordingly, visibility of display is improved.

The pixel illustrated in FIG. 25B includes a conductive film 521 functioning as the scan line GLb, a conductive film 522 functioning as the signal line SLb, a conductive film 523 functioning as the wiring COM, and a conductive film 524 functioning as the second terminal of the second pixel transistor 16b. The conductive film 521 also functions as the gate electrode of the second pixel transistor 16b illustrated in FIG. 2B. The conductive film 522 also functions as the first terminal of the second pixel transistor 16b.

Note that a portion where the conductive film 523 functioning as the wiring COM overlaps with the conductive film 524 with the gate insulating film 506 provided therebetween functions as the second capacitor 17b.

By providing the reflective electrode 525 so as to overlap with the active layer 527 of the second pixel transistor 16b, the oxide semiconductor in the active layer 527 can be prevented from deteriorating owing to stray light entered from the substrate 514 side; thus, deterioration of characteristics of the second pixel transistor 16b, such as a shift of the threshold voltage, can be prevented.

Note that in the case of forming a driver circuit on a panel, also by blocking light to a transistor used in the driver circuit with the use of a gate electrode or a light-blocking film, deterioration of characteristics of the transistor, such as a shift of the threshold voltage, can be prevented.

In FIG. 25A or FIG. 25B, an example of the first liquid crystal element 18a or the second liquid crystal element 18b positioned in the transmissive region or the reflective region is described in which the pixel electrode 505 or the reflective electrode 525 overlaps with the counter electrode 515 with the liquid crystal layer 516 provided therebetween; however, the structure of the liquid crystal display device according to one embodiment of the present invention is not limited to this structure. Like an IPS liquid crystal element or a liquid crystal element using a liquid crystal exhibiting a blue phase, the pixel electrode and the counter electrode may be formed over one substrate.

Figure 27A:
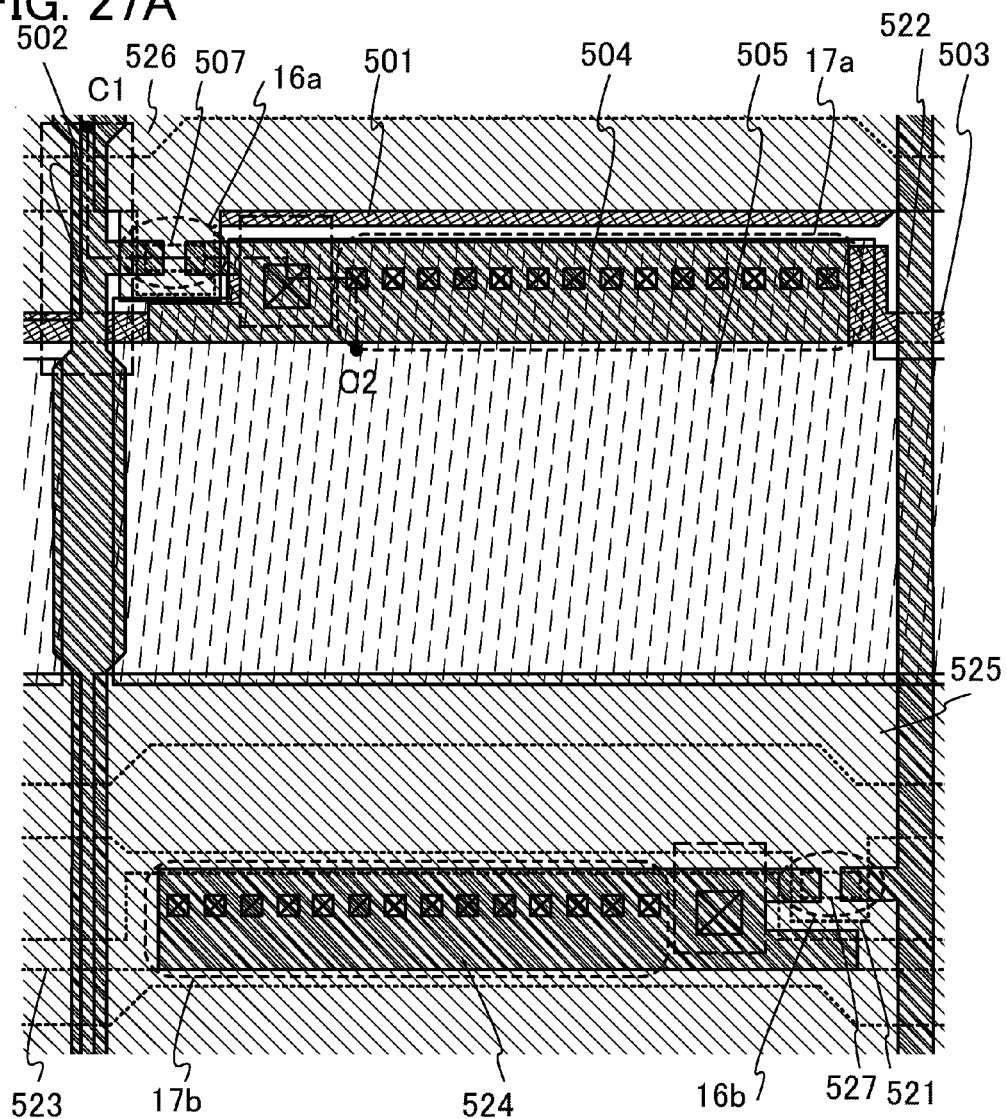
FIGS. 27A and 27B are a top view and a cross-sectional view illustrating a structure of a liquid crystal display device.
Figure 27B:
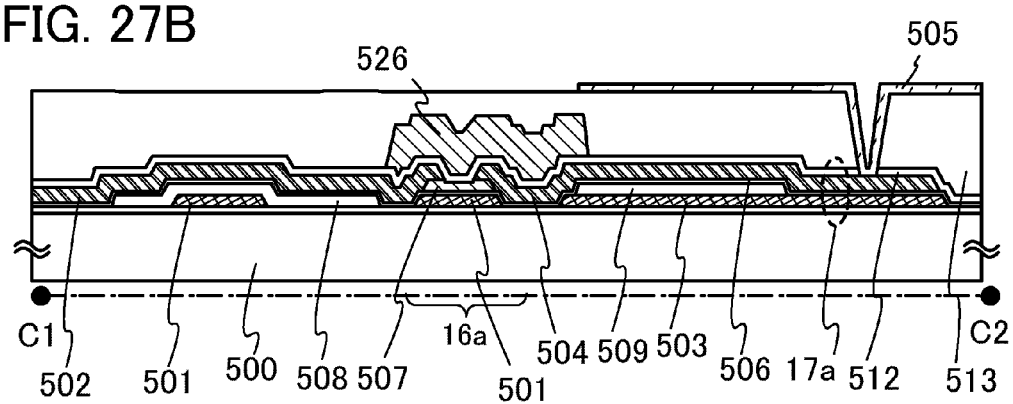

FIGS. 27A and 27B illustrate an example in which the pixel structure is partly different from that in FIG. 24 and FIGS. 25A and 25B. FIG. 27B is a cross-sectional view right after the step of forming the pixel electrode 505.

FIG. 27A is a top view illustrating the pixel, and FIG. 27B is a cross-sectional view along chain line C1-C2 in FIG. 27A. In FIGS. 27A and 27B, the same reference numerals are used for the same portions as those in FIG. 24 and FIGS. 25A and 25B.

In the example of the pixel structure illustrated in FIG. 27A, in order to prevent incident light to the active layer 507 more effectively, a reflective electrode 526 of an adjacent pixel is arranged so as to overlap with the active layer 507 of the first pixel transistor 16a, so that light is blocked.

By arranging the reflective electrode 526 of the adjacent pixel so as to overlap with the active layer 507 of the first pixel transistor 16a, deterioration of the oxide semiconductor in the active layer 507 due to stray light is prevented; thus, deterioration of characteristics of the first pixel transistor 16a, such as a shift of the threshold voltage, can be prevented. In the second pixel transistor 16b electrically connected to the reflective electrode 525, the active layer 527 is provided between the reflective electrode 525 and the conductive film 521, so that light is blocked. With this structure, deterioration of characteristics of the second pixel transistor 16b, such as a shift of the threshold voltage due to stray light on the active layer 527, can be prevented.

As illustrated in FIG. 27B, the reflective electrode 526 and the reflective electrode 525 are provided over the insulating film 512, and the insulating film 513 formed using a planarization insulating film is provided so as to cover the reflective electrode 526 and the reflective electrode 525. In addition, the pixel electrode 505 is provided over the insulating film 513. In this manner, a stacked-layer structure is used. Thus, as illustrated in FIG. 27A, the pixel electrode 505 can partly overlap with the reflective electrode 525 with the insulating film 513 provided therebetween, resulting in a larger area of the transmissive region. Therefore, the aperture ratio is higher than that of the pixel structure illustrated in FIG. 24.

As illustrated in FIG. 27B, the reflective electrode 526 can be formed over the insulating film 512 having an uneven surface, so that the reflective electrode 526 can have an uneven surface. When the reflective electrode 526 has an uneven surface, incident light from the outside is irregularly reflected, so that more favorable display can be performed. Accordingly, visibility of display is improved.

Figures 26A, 26B:
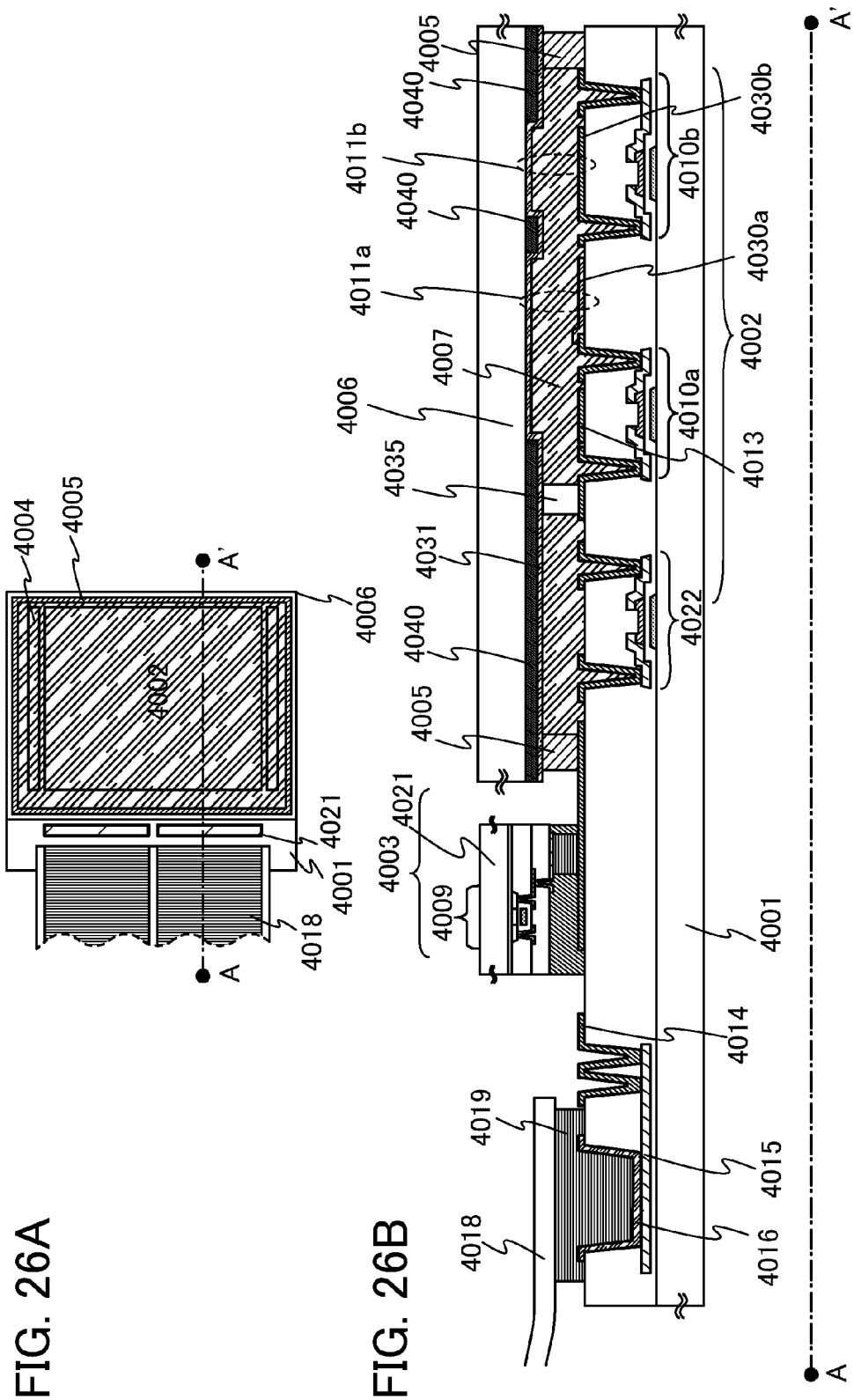
FIGS. 26A and 26B are a top view and a cross-sectional view illustrating a liquid crystal display device.

Next, a liquid crystal display device according to one embodiment of the present invention will be described with reference to FIGS. 26A and 26B. FIG. 26A is a top view of the panel in which a substrate 4001 is bonded to a counter substrate 4006 with a sealant 4005. FIG. 26B is a cross-sectional view along dashed line A-A' in FIG. 26A.

The sealant 4005 is provided so as to surround a pixel portion 4002 and a scan line driver circuit 4004 provided over the substrate 4001. In addition, the counter substrate 4006 is provided over the pixel portion 4002 and the scan line driver circuit 4004. Thus, the pixel portion 4002 and the scan line driver circuit 4004 are sealed together with a liquid crystal 4007 by the substrate 4001, the sealant 4005, and the counter substrate 4006.

A substrate 4021 provided with a signal line driver circuit 4003 is mounted in a region which is different from a region surrounded by the sealant 4005 over the substrate 4001. FIG. 26B illustrates a transistor 4009 included in the signal line driver circuit 4003.

A plurality of transistors are included in the pixel portion 4002 and the scan line driver circuit 4004 which are provided over the substrate 4001. FIG. 26B illustrates transistors 4010a, 4010b, and 4022 which are included in the pixel portion 4002. Each of the transistors 4010a, 4010b, and 4022 includes an oxide semiconductor in a channel formation region. A light-blocking film 4040 provided for the counter substrate 4006 overlaps with a channel formation region of the transistor 4022. By blocking light to the transistor 4022, deterioration of an oxide semiconductor of the transistor 4022 due to light is prevented; thus, deterioration of characteristics of the transistor 4022, such as a shift of the threshold voltage, can be prevented.

A light-blocking metal film 4013 formed in the same process as a lead wiring 4014 formed using a metal material overlaps with a channel formation region of the transistor 4010a. By blocking light to the transistor 4010a with the light-blocking metal film 4013, deterioration of an oxide semiconductor due to light is prevented; thus, deterioration of characteristics of the transistor 4010a, such as a shift of the threshold voltage, can be prevented. The light-blocking metal film 4013 may be an electrode in a floating state, an electrode electrically connected to the oxide semiconductor of the transistor 4010a, or an electrode electrically connected to a gate electrode of the transistor 4010a.

Although the number of manufacturing steps is increased, a light-blocking resin film may be used instead of the light-blocking metal film 4013. The light-blocking resin film containing black colorant such as carbon black may be formed by an inkjet method or the like so as to overlap with the channel formation region of the transistor 4010a.

A pixel electrode 4030a formed using a light-transmitting conductive film is electrically connected to the transistor 4010a. A counter electrode 4031 is provided for the counter substrate 4006. A portion where the pixel electrode 4030a, the counter electrode 4031, and the liquid crystal 4007 overlap with one another corresponds to a liquid crystal element 4011a in a transmissive region.

A pixel electrode 4030b which is a reflective electrode is electrically connected to the transistor 4010b. A portion where the pixel electrode 4030b, the counter electrode 4031, and the liquid crystal 4007 overlap with one another corresponds to a liquid crystal element 4011b in a reflective region. The pixel electrode 4030b which is the reflective electrode overlaps with the channel formation region of the transistor 4010b. By blocking light to the transistor 4010b, deterioration of an oxide semiconductor of the transistor 4010b due to light is prevented; thus, deterioration of characteristics of the transistor 4010b, such as a shift of the threshold voltage, can be prevented.

A spacer 4035 is provided to control a distance (cell gap) between the pixel electrode 4030a and the counter electrode 4031 and between the pixel electrode 4030b and the counter electrode 4031. FIG. 26B shows the case where the spacer 4035 is formed by patterning of an insulating film; alternatively, a spherical spacer may be used.

A variety of signals and potentials are supplied to the signal line driver circuit 4003, the scan line driver circuit 4004, and the pixel portion 4002 from a connection terminal 4016 through the lead wiring 4014 and a lead wiring 4015. The connection terminal 4016 is electrically connected to an FPC 4018 and an anisotropic conductive film 4019.

Note that for the substrate 4001, the counter substrate 4006, and the substrate 4021, glass, ceramics, or plastics can be used. Plastics include, in its category, a fiberglass-reinforced plastic (FRP) plate, a polyvinyl fluoride (PVF) film, a polyester film, an acrylic resin film, and the like. In addition, a sheet having a structure in which an aluminum foil is sandwiched between PVF films can be used.

Note that a substrate placed in a direction in which light is extracted through the liquid crystal element 4011 is formed using a light-transmitting material such as a glass plate, plastic, a polyester film, or an acrylic film.

This embodiment can be implemented in combination with another embodiment as appropriate.

(Embodiment 7)

In this embodiment, a transistor 951 was manufactured using the manufacturing method described in another embodiment, a transistor 952 having a back gate electrode was manufactured, and evaluation results of the amount of a change in the threshold voltage ($V_{th}$) through a negative bias stress test with light irradiation on the transistors will be described.

Figure 29A:
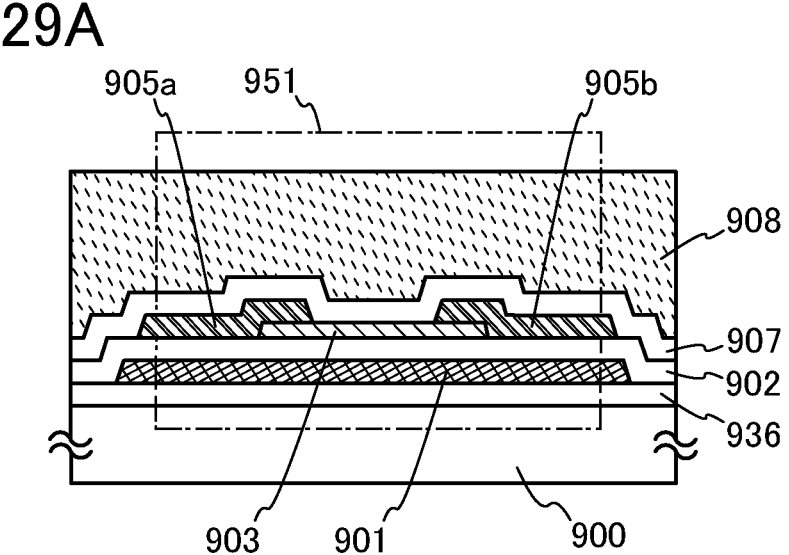
FIGS. 29A and 29B each illustrate a structure of a transistor.

Described first is a stacked-layer structure and a manufacturing method of the transistor 951 with reference to FIG. 29A. Over a substrate 900, a stacked-layer film of a silicon nitride film (thickness: 200 nm) and a silicon oxynitride film (thickness: 400 nm) was formed by a CVD method as a base film 936. Next, over the base film 936, a stacked-layer film of a tantalum nitride film (thickness: 30 nm) and a tungsten film (thickness: 100 nm) was formed by a sputtering method and selectively etched to form a gate electrode 901.

Next, over the gate electrode 901, a silicon oxynitride film (thickness: 30 nm) was formed by a high-density plasma enhanced CVD method as a gate insulating film 902.

Next, over the gate insulating film 902, an oxide semiconductor film (thickness: 30 nm) was formed using a target of an In—Ga—Zn—O-based oxide semiconductor by a sputtering method. Then, the oxide semiconductor film was selectively etched to form an island-shaped oxide semiconductor film 903.

Next, first heat treatment was performed at 450° C. for 60 minutes in a nitrogen atmosphere.

Next, over the island-shaped oxide semiconductor film 903, a stacked-layer film of a titanium film (thickness: 100 nm), an aluminum film (thickness: 200 nm), and a titanium film (thickness: 100 nm) was formed by a sputtering method and selectively etched to form a source electrode 905a and a drain electrode 905b.

Next, over the source electrode 905a and the drain electrode 905b, a silicon oxide film was formed by a sputtering method as an insulating film 907 so as to be in contact with part of the island-shaped oxide semiconductor film 903.

Next, second heat treatment was performed at 250° C. for 60 minutes in a nitrogen atmosphere.

Next, over the insulating film 907, a polyimide resin film (thickness: 2.0 μm) was formed as an insulating film 908.

Next, third heat treatment was performed at 250° C. for 60 minutes in a nitrogen atmosphere.

Figure 29B:
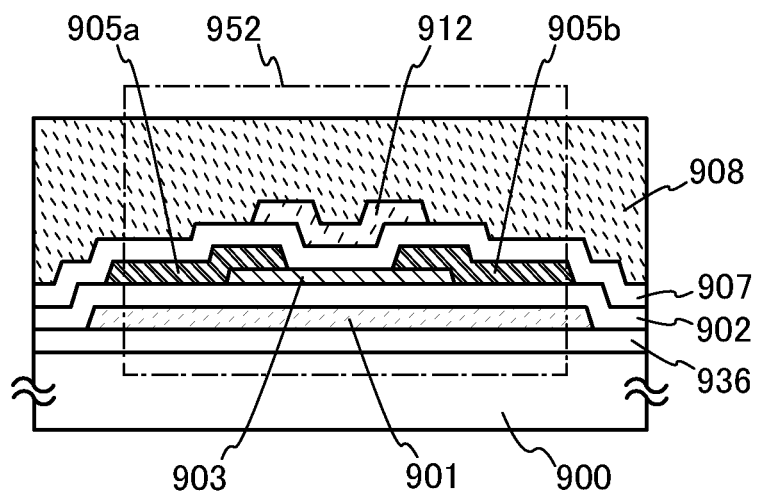

The transistor 952 illustrated in FIG. 29B can be manufactured in a manner similar to that of the transistor 951. The transistor 952 is different from the transistor 951 in that a back gate electrode 912 is provided between the insulating films 907 and 908. The back gate electrode 912 was formed as follows: a stacked-layer film of a titanium film (thickness: 100 nm), an aluminum film (thickness: 200 nm), and a titanium film (thickness: 100 nm) was formed by a sputtering method over the insulating film 907 and selectively etched. The back gate electrode 912 was electrically connected to the source electrode 905a.

In each of the transistors 951 and 952, the channel length is 3 μm and the channel width is 20 μm.

Described next is a negative bias stress test with light irradiation performed on the transistors 951 and 952.

The negative bias stress test with light irradiation is a kind of accelerated test and can measure the change of characteristics of a transistor with light irradiation, in a short period of time. In particular, the amount of a change in the threshold voltage $V_{th}$ of a transistor through the negative bias stress test with light irradiation is an important benchmark for the reliability. The smaller the amount of a change in the threshold voltage $V_{th}$ of a transistor through the negative bias stress test with light irradiation is, the higher the reliability of the transistor is. The amount of a change through the negative bias stress test with light irradiation is preferably less than or equal to 1 V, more preferably less than or equal to 0.5 V.

Specifically, according to the negative bias stress test with light irradiation, the temperature of a substrate provided with a transistor (substrate temperature) is kept at a fixed temperature, a source electrode and a drain electrode of the transistor are set at the same potential, and a gate electrode of the transistor is applied with a potential lower than the potential of the source electrode and the drain electrode for a certain period while irradiating the transistor with light.

The stress intensity of a negative bias stress test with light irradiation can be determined in accordance with the light irradiation conditions, the substrate temperature, the intensity of electric field applied to a gate insulating film, and a time of applying the electric field. The intensity of the electric field applied to the gate insulating film is determined in accordance with a value obtained by dividing a potential difference between a gate electrode and a source and drain electrodes by the thickness of the gate insulating film. For example, in the case where the intensity of the electric field applied to the gate insulating film with a thickness of 100 nm is to be 2 MV/cm, the potential difference may be set to 20 V.

A test in which a potential higher than that of a source electrode and a drain electrode is applied to a gate electrode under light irradiation is called a positive bias temperature stress test with light irradiation. The characteristics of a transistor are more likely to change through a negative bias stress test with light irradiation than through the positive bias temperature stress test with light irradiation, and therefore, the negative bias stress test with light irradiation was adopted in this embodiment.

The negative bias stress test with light irradiation in this embodiment was performed in the following conditions: the substrate temperature is room temperature (25° C.), the electric field intensity applied to the gate insulating film 902 is 2 MV/cm, and a period of light irradiation and electric field application is 1 hour. The conditions of the light irradiation were as follows: a xenon light source "MAX-302" manufactured by Asahi Spectra Co., Ltd is used, the peak wavelength is 400 nm (half width: 10 nm), and irradiance is 326 µW/cm².

Prior to the negative bias stress test with light irradiation, initial characteristics of each transistor were measured. Measured in this embodiment were $V_g$-$I_d$ characteristics, that is, change characteristics of a current which flows between the source electrode and the drain electrode (the current is hereinafter referred to as a drain current or $I_d$) under the following conditions: the substrate temperature is room temperature (25° C.), the voltage between the source electrode and the drain electrode (the voltage is hereinafter referred to as a drain voltage or $V_d$) is 3 V, and the voltage between the source electrode and the gate electrode (the voltage is hereinafter referred to as a gate voltage or $V_g$) is changed from −5 V to +5 V.

Next, light irradiation on the insulating film 908 side was started, the potential of each of the source and drain electrodes of the transistor was set to 0 V, and a negative voltage was applied to the gate electrode 901 such that the intensity of an electric field applied to the gate insulating film 902 of the transistor became 2 MV/cm. In this embodiment, since the thickness of the gate insulating film 902 of the transistor was 30 nm, −6 V was applied to the gate electrode 901 and kept for 1 hour. The time of the voltage application was 1 hour in this embodiment; however, the time may be determined as appropriate in accordance with the purpose.

Next, the voltage application was ended, but while keeping the light irradiation, the $V_g$-$I_d$ characteristics were measured under the condition which is the same as the measurement of the initial characteristics, so that the $V_g$-$I_d$ characteristics after the negative bias stress test with light irradiation were obtained.

Figure 30:
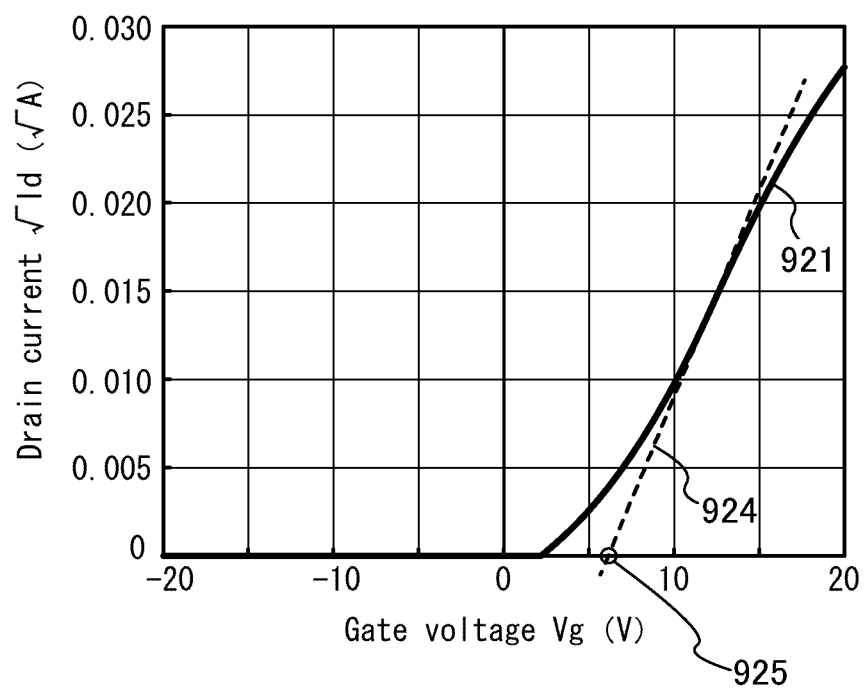
FIG. 30 is a graph for defining $V_{th}$.

The threshold voltage $V_{th}$ in this embodiment is defined below using FIG. 30. In FIG. 30, the horizontal axis represents the gate voltage on a linear scale and the vertical axis represents the square root of the drain current (hereinafter also referred to as $\sqrt{I_d}$) on a linear scale. A curve 921 indicates the square root of value of $I_d$ in the $V_g$-$I_d$ characteristics (the curve is hereinafter also referred to as a $\sqrt{I_d}$ curve).

First, the $\sqrt{I_d}$ curve (the curve 921) is obtained from the $V_g$-$I_d$ curve. Then, a tangent 924 to a point on the $\sqrt{I_d}$ curve at which a differential value of the $\sqrt{I_d}$ curve is the maximum is obtained. Next, the tangent 924 is extended, and the gate voltage $V_g$ at a drain current $I_d$ of 0 A on the tangent 924, that is, a value at a horizontal-axis-intercept, i.e., gate-voltage-axis-intercept 925 of the tangent 924 is defined as $V_{th}$.

Figure 31A:
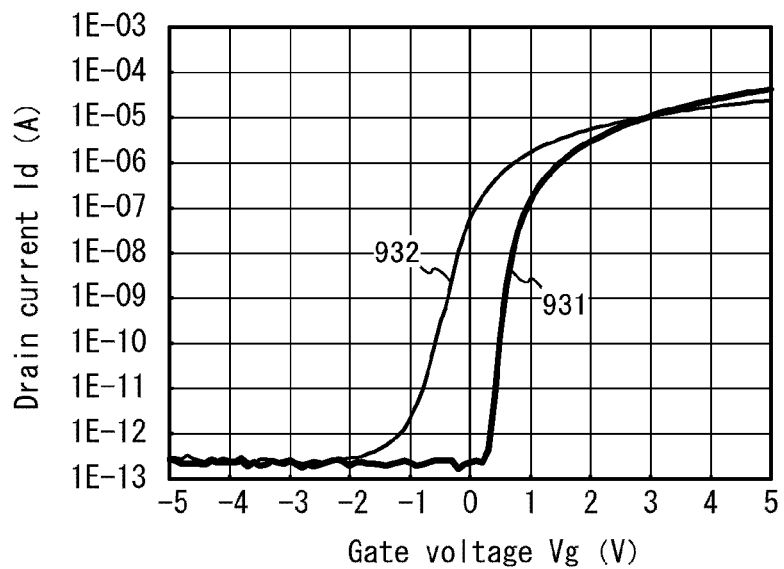
FIGS. 31A to 31C each show results of a negative bias stress test with light irradiation.
Figure 31B:
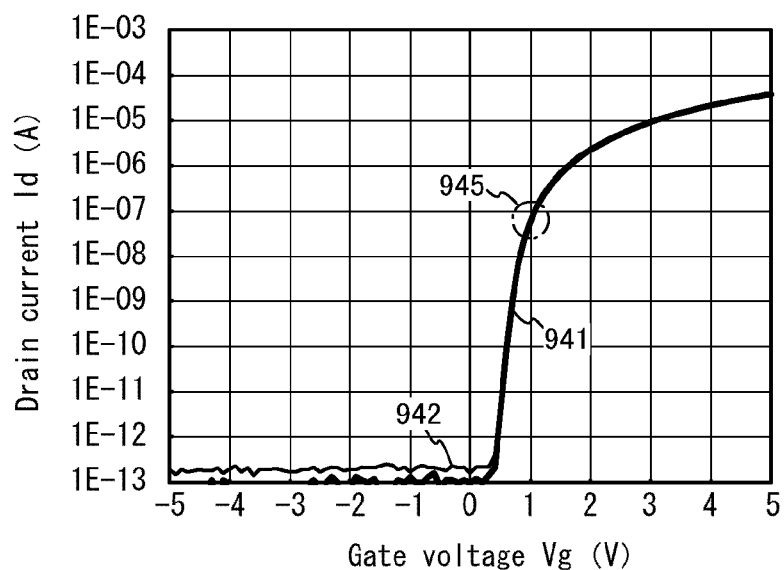
Figure 31C:
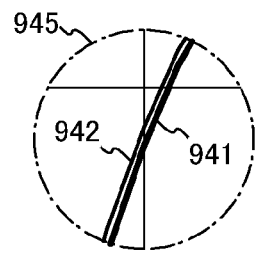

FIGS. 31A to 31C show the $V_g$-$I_d$ characteristics of the transistors 951 and 952 before and after the negative bias stress test with light irradiation. In each of FIGS. 31A and 31B, the horizontal axis represents the gate voltage ($V_g$), and the vertical axis represents the drain current ($I_d$) with respect to the gate voltage on a logarithmic scale.

FIG. 31A shows the $V_g$-$I_d$ characteristics of the transistor 951 before and after the negative bias stress test with light irradiation. Initial characteristics 931 are the $V_g$-$I_d$ characteristics of the transistor 951 before being subjected to the negative bias stress test with light irradiation, and post-test characteristics 932 are the $V_g$-$I_d$ characteristics of the transistor 951 after being subjected to the negative bias stress test with light irradiation. The threshold voltage $V_{th}$ of the initial characteristics 931 was 1.01 V, and that of the post-test characteristics 932 was 0.44 V.

FIG. 31B shows the $V_g$-$I_d$ characteristics of the transistor 952 before and after the negative bias stress test with light irradiation. FIG. 31C is an enlarged graph of a portion 945 in FIG. 31B. Initial characteristics 941 are the $V_g$-$I_d$ characteristics of the transistor 952 before being subjected to the negative bias stress test with light irradiation, and post-test characteristics 942 are the $V_g$-$I_d$ characteristics of the transistor 952 after being subjected to the negative bias stress test with light irradiation. The threshold voltage $V_{th}$ of the initial characteristics 941 was 1.16 V, and that of the post-test characteristics 942 was 1.10 V. Since the back gate electrode 912 of the transistor 952 is electrically connected to the source electrode 905a, the potential of the back gate electrode 912 equals to that of the source electrode 905a.

In FIG. 31A, the threshold voltage $V_{th}$ of the post-test characteristics 932 is changed by 0.57 V in the negative direction from that of the initial characteristics 931; in FIG. 31B, the threshold voltage $V_{th}$ of the post-test characteristics 942 is changed by 0.06 V in the negative direction from that of the initial characteristics 941. The amount of a change of either of the transistor 951 and the transistor 952 is less than or equal to 1 V, from which it can be confirmed that both of the transistors have high reliability. In addition, since the amount of a change of the threshold voltage $V_{th}$ of the transistor 952 provided with the back gate electrode 912 is less than or equal to 0.1 V, it can be confirmed that the transistor 952 has higher reliability than the transistor 951.

Example 1

With a liquid crystal display device according to one embodiment of the present invention, an electronic appliance capable of displaying a high-quality image can be provided. With the liquid crystal display device according to one embodiment of the present invention, an electronic appliance with low power consumption can be provided. In particular, the case of a portable electronic appliance to which electric power cannot be easily supplied constantly, continuous use time becomes longer by adding the liquid crystal display device according to one embodiment of the present invention as a component, which is an advantage.

The liquid crystal display device according to one embodiment of the present invention can be used for display devices, laptops, or image reproducing devices provided with recording media (typically, devices which reproduce the content of recording media such as digital versatile discs (DVDs) and have displays for displaying the reproduced images). In addition to the above examples, as electronic appliances each including the liquid crystal display device according to one embodiment of the present invention, mobile phones, portable game machines, portable information terminals, e-book readers, video cameras, digital still cameras, goggle-type displays (head mounted displays), navigation systems, audio reproducing devices (e.g., car audio components and digital audio players), copiers, facsimiles, printers, multifunction printers, automated teller machines (ATM), vending machines, and the like can be given. Specific examples of such electronic appliances are shown in FIGS. 28A to 28F.

Figure 28A:
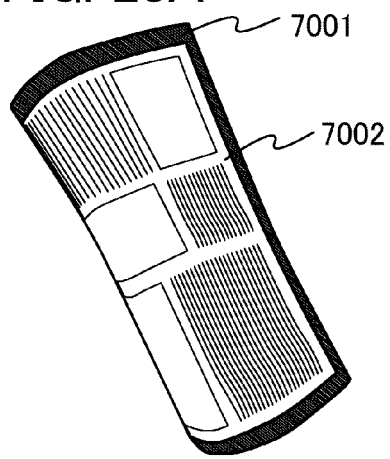
FIGS. 28A to 28F each illustrate an electronic appliance.

FIG. 28A illustrates an e-book reader including a housing 7001, a display portion 7002, and the like. A liquid crystal display device according to one embodiment of the present invention can be used for the display portion 7002. With the liquid crystal display device according to one embodiment of the present invention applied to the display portion 7002, an e-book reader capable of displaying a high-quality image or an e-book reader with low power consumption can be provided. Moreover, when a panel is formed with the use of a flexible substrate and a touch panel has flexibility, the liquid crystal display device can have flexibility; thus, a flexible, lightweight, and easy-to-use e-book reader can be provided.

Figure 28B:
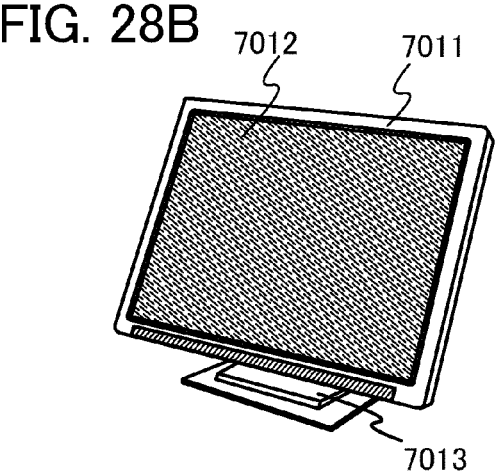

FIG. 28B illustrates a display device including a housing 7011, a display portion 7012, a support 7013, and the like. A liquid crystal display device according to one embodiment of the present invention can be used for the display portion 7012. With the liquid crystal display device according to one embodiment of the present invention applied to the display portion 7012, a display device capable of displaying a high-quality image or a display device with low power consumption can be provided. The display device includes in its category, any information display device for personal computers, TV broadcast reception, advertisement, and the like.

Figure 28C:
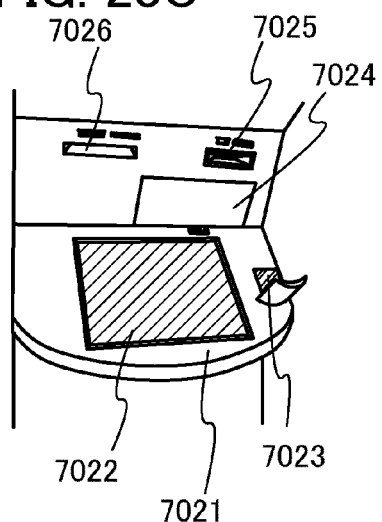

FIG. 28C illustrates an automated teller machine including a housing 7021, a display portion 7022, a coin slot 7023, a bill slot 7024, a card slot 7025, a bankbook slot 7026, and the like. The liquid crystal display device according to one embodiment of the present invention can be used for the display portion 7022. With the liquid crystal display device according to one embodiment of the present invention applied to the display portion 7022, an automated teller machine capable of displaying a high-quality image or an automated teller machine with low power consumption can be provided.

Figure 28D:
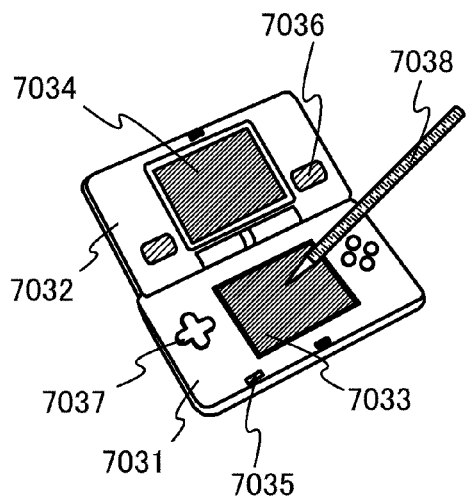

FIG. 28D illustrates a portable game machine including a housing 7031, a housing 7032, a display portion 7033, a display portion 7034, a microphone 7035, speakers 7036, operation keys 7037, a stylus 7038, and the like. A liquid crystal display device according to one embodiment of the present invention can be used for the display portion 7033 or the display portion 7034. With the liquid crystal display device according to one embodiment of the present invention applied to the display portion 7033 or the display portion 7034, a portable game machine capable of displaying a high-quality image or a portable game machine with low power consumption can be provided. Although the portable game machine illustrated in FIG. 28D has the two display portions 7033 and 7034, the number of display portions included in the portable game machines is not limited thereto.

Figure 28E:
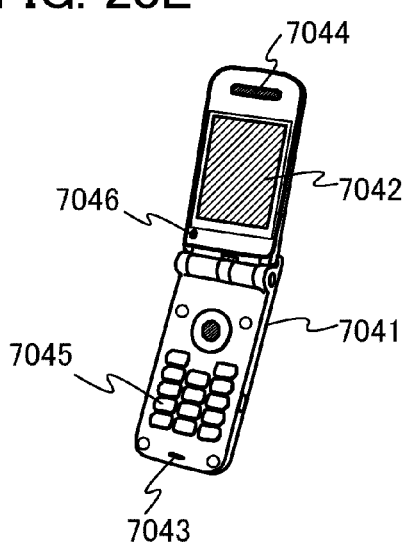

FIG. 28E illustrates a mobile phone including a housing 7041, a display portion 7042, an audio input portion 7043, an audio output portion 7044, operation keys 7045, a light-receiving portion 7046, and the like. Light received in the light-receiving portion 7046 is converted into electrical signals, whereby external images can be loaded. A liquid crystal display device according to one embodiment of the present invention can be used for the display portion 7042. With the liquid crystal display device according to one embodiment of the present invention applied to the display portion 7042, a mobile phone capable of displaying a high-quality image or a mobile phone with low power consumption can be provided.

Figure 28F:
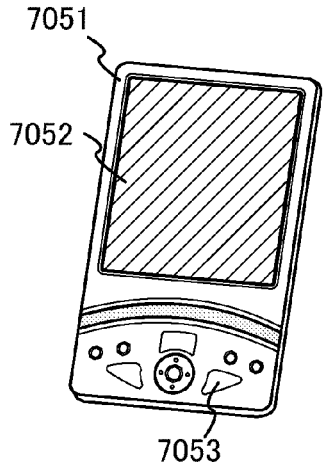

FIG. 28F is a portable information terminal including a housing 7051, a display portion 7052, an operation key 7053, and the like. In the portable information terminal illustrated in FIG. 28F, a modem may be incorporated in the housing 7051. A liquid crystal display device according to one embodiment of the present invention can be used for the display portion 7052. With the liquid crystal display device according to one embodiment of the present invention applied to the display portion 7052, a portable information terminal capable of displaying a high-quality image or a portable information terminal with low power consumption can be provided.

This example can be implemented in combination with any of the above-described embodiments as appropriate.

This application is based on Japanese Patent Application serial no. 2010-152317 filed with Japan Patent Office on Jul. 2, 2010, the entire contents of which are hereby incorporated by reference.

What is claimed is:

1. A liquid crystal display device comprising:
a plurality of light sources emitting a plurality of lights; and
a pixel portion, the pixel portion comprising:
 a first pixel electrode having a light-transmitting property; and
 a second pixel electrode which is a reflective electrode and placed adjacently to the first pixel electrode,
wherein the first pixel electrode is electrically connected to a first transistor and the second pixel electrode is electrically connected to a second transistor,
wherein the pixel portion is divided into a plurality of regions,
wherein color display is performed by controlling the plurality of lights whose hues are different per the plurality of regions and applying a voltage to a first region of the liquid crystal layer overlapping with the first pixel electrode,
wherein a monochrome still image is displayed by driving the second transistor in a period when the plurality of light sources are turned off and applying a voltage to a second region of the liquid crystal layer overlapping with the second pixel electrode,
wherein the color display is a moving image,
wherein an interval of writings of the monochrome still image is longer than that of the color display,
wherein the reflective electrode of an adjacent pixel is above the first transistor, and
wherein the reflective electrode of the adjacent pixel overlaps with an active layer of the first transistor.

2. The liquid crystal display device according to claim 1, wherein the first transistor and the second transistor comprise an oxide semiconductor.

3. The liquid crystal display device according to claim 2, wherein the oxide semiconductor is an In—Ga—Zn—O-base oxide semiconductor.

4. The liquid crystal display device according to claim 2, wherein a hydrogen concentration of the oxide semiconductor is less than or equal to $5\times10^{19}/cm^3$.

5. The liquid crystal display device according to claim 1, wherein an off-state current density of the first transistor and the second transistor is less than or equal to 100 yA/μm.

6. A liquid crystal display device comprising:
a plurality of light sources emitting a plurality of lights whose hues are different from each other; and
a pixel portion, the pixel portion comprising:
 a first pixel electrode having a light-transmitting property; and
 a second pixel electrode which is a reflective electrode and placed adjacently to the first pixel electrode,
wherein the first pixel electrode is electrically connected to a first transistor and the second pixel electrode is electrically connected to a second transistor,
wherein the pixel portion comprises a first region and a second region,
wherein color display is performed by controlling the plurality of lights whose hues are different per the first region and the second region and applying a voltage to a first region of the liquid crystal layer overlapping with the first pixel electrode, wherein a monochrome still image is displayed by driving the second transistor in a period when the plurality of light sources are turned off and applying a voltage to a second region of the liquid crystal layer overlapping with the second pixel electrode, wherein the color display is a moving image, wherein an interval of writings of the monochrome still image is longer than that of the color display, wherein the reflective electrode of an adjacent pixel is above the first transistor, and wherein the reflective electrode of the adjacent pixel overlaps with an active layer of the first transistor.

7. The liquid crystal display device according to claim 6, wherein the first transistor and the second transistor comprise an oxide semiconductor.

8. The liquid crystal display device according to claim 7, wherein the oxide semiconductor is an In—Ga—Zn—O-base oxide semiconductor.

9. The liquid crystal display device according to claim 7, wherein a hydrogen concentration of the oxide semiconductor is less than or equal to $5 \times 10^{19}/cm^3$.

10. The liquid crystal display device according to claim 6, wherein an off-state current density of the first transistor and the second transistor is less than or equal to 100 yA/μm.

11. A liquid crystal display device comprising:
a plurality of light sources emitting a plurality of lights whose hues are different from each other; and
a pixel portion, the pixel portion comprising:
    a first pixel electrode having a light-transmitting property; and
    a second pixel electrode which is a reflective electrode and placed adjacently to the first pixel electrode,
wherein the first pixel electrode is electrically connected to a first transistor and the second pixel electrode is electrically connected to a second transistor,
wherein the pixel portion comprises a first region and a second region,
wherein color display is performed by sequentially supplying the plurality of lights to the first region in a first rotating order and to the second region in a second rotating order and applying a voltage to a first region of the liquid crystal layer overlapping with the first pixel electrode, wherein a monochrome still image is displayed by driving the second transistor in a period when the plurality of light sources are turned off and applying a voltage to a second region of the liquid crystal layer overlapping with the second pixel electrode, wherein the first rotating order is different from the second rotating order, wherein the color display is a moving image, wherein an interval of writings of the monochrome still image is longer than that of the color display, wherein the reflective electrode of an adjacent pixel is above the first transistor, and wherein the reflective electrode of the adjacent pixel overlaps with an active layer of the first transistor.

12. The liquid crystal display device according to claim 11, wherein the first transistor and the second transistor comprise an oxide semiconductor.

13. The liquid crystal display device according to claim 12, wherein the oxide semiconductor is an In—Ga—Zn—O-base oxide semiconductor.

14. The liquid crystal display device according to claim 12, wherein a hydrogen concentration of the oxide semiconductor is less than or equal to $5 \times 10^{19}/cm^3$.

15. The liquid crystal display device according to claim 11, wherein an off-state current density of the first transistor and the second transistor is less than or equal to 100 yA/μm.

16. The liquid crystal display device according to claim 1, wherein an interval between writings of image signals is 10 seconds or more when the monochrome still image is displayed.

17. The liquid crystal display device according to claim 6, wherein an interval between writings of image signals is 10 seconds or more when the monochrome still image is displayed.

18. The liquid crystal display device according to claim 11, wherein an interval between writings of image signals is 10 seconds or more when the monochrome still image is displayed.

* * * * *